US012756877B2

(12) United States Patent
Soroushian

(10) Patent No.: US 12,756,877 B2
(45) Date of Patent: *Oct. 6, 2026

(54) SYSTEMS AND METHODS FOR ENCODING AND STREAMING VIDEO ENCODED USING A PLURALITY OF MAXIMUM BITRATE LEVELS

(71) Applicant: DIVX, LLC, San Diego, CA (US)

(72) Inventor: Kourosh Soroushian, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,107

(22) Filed: Mar. 16, 2023

(65) Prior Publication Data

US 2023/0224519 A1 Jul. 13, 2023

Related U.S. Application Data

(63) Continuation of application No. 17/181,996, filed on Feb. 22, 2021, now Pat. No. 11,611,785, which is a (Continued)

(51) Int. Cl.

*H04N 19/184* (2014.01)
*H04N 7/01* (2006.01)

(Continued)

(52) U.S. Cl.

CPC ..... *H04N 21/234372* (2013.01); *H04N 7/013* (2013.01); *H04N 19/115* (2014.11);

(Continued)

(58) Field of Classification Search

CPC .... H04N 19/115; H04N 19/146; H04N 19/59; H04N 21/234372; H04N 21/23439

See application file for complete search history.

(56) References Cited

U.S. PATENT DOCUMENTS 3,609,227 A 9/1971 Kuljian
3,919,474 A 11/1975 Benson (Continued)

FOREIGN PATENT DOCUMENTS

AU 2010202963 A1 2/2012
AU 2010203605 B2 5/2015

(Continued)

OTHER PUBLICATIONS

Entone, "Hydra HD IP Video Gateway", 2008, 2 pgs.

(Continued)

*Primary Examiner* — Joseph G Ustaris
(74) *Attorney, Agent, or Firm* — KPPB LLP

(57) ABSTRACT

Systems and methods for streaming and playing back video having a variety of resolutions, frame rates, and/or sample aspect ratios, where the video streams are encoded at one of a number of maximum bit rate levels, in accordance with embodiments of the invention are disclosed. One embodiment includes a processor, and storage containing data relating combinations of resolution and frame rates to maximum bitrates, where a plurality of resolution and frame rates that are related to the same maximum bitrate form a maximum bitrate level. In addition, an encoding application configures the processor to encode a video stream as a plurality of video streams having different resolutions and frame rates, where the target maximum bitrate used during the encoding is selected based upon the maximum bitrate levels of the resolution and frame rate combinations indicated within the data relating combinations of resolution and frame rates to maximum bitrates.

21 Claims, 9 Drawing Sheets

Related U.S. Application Data continuation of application No. 16/789,303, filed on Feb. 12, 2020, now Pat. No. 10,931,982, which is a continuation of application No. 15/922,198, filed on Mar. 15, 2018, now Pat. No. 10,645,429, which is a continuation of application No. 13/600,046, filed on Aug. 30, 2012, now Pat. No. 9,955,195.

(60) Provisional application No. 61/529,201, filed on Aug. 30, 2011.

(51) Int. Cl.

| | |
|---|---|
| ***H04N 19/115*** | (2014.01) |
| ***H04N 19/146*** | (2014.01) |
| ***H04N 19/157*** | (2014.01) |
| ***H04N 19/59*** | (2014.01) |
| ***H04N 21/2343*** | (2011.01) |
| ***H04N 21/2662*** | (2011.01) |

(52) U.S. Cl.

CPC ......... *H04N 19/146* (2014.11); *H04N 19/157* (2014.11); *H04N 19/184* (2014.11); *H04N 19/59* (2014.11); *H04N 21/234381* (2013.01); *H04N 21/23439* (2013.01); *H04N 21/2662* (2013.01)

(56) References Cited

U.S. PATENT DOCUMENTS 4,009,331 A 2/1977 Goldmark et al.
4,694,357 A 9/1987 Rahman et al.
4,694,491 A 9/1987 Horne et al.
4,802,170 A 1/1989 Trottier
4,964,069 A 10/1990 Ely
4,974,260 A 11/1990 Rudak
5,119,474 A 6/1992 Beitel et al.
5,132,992 A 7/1992 Yurt et al.
5,274,758 A 12/1993 Beitel et al.
5,341,474 A 8/1994 Gelman et al.
5,361,332 A 11/1994 Yoshida et al.
5,396,497 A 3/1995 Veltman
5,400,401 A 3/1995 Wasilewski et al.
5,404,436 A 4/1995 Hamilton
5,420,801 A 5/1995 Dockter et al.
5,420,974 A 5/1995 Morris et al.
5,471,576 A 11/1995 Yee
5,477,263 A 12/1995 Ocallaghan et al.
5,477,272 A 12/1995 Zhang et al.
5,479,303 A 12/1995 Suzuki et al.
5,487,167 A 1/1996 Dinallo et al.
5,502,766 A 3/1996 Boebert et al.
5,509,070 A 4/1996 Schull
5,533,021 A 7/1996 Branstad et al.
5,537,408 A 7/1996 Branstad et al.
5,539,908 A 7/1996 Chen et al.
5,541,662 A 7/1996 Adams et al.
5,544,318 A 8/1996 Schmitz et al.
5,550,863 A 8/1996 Yurt et al.
5,574,785 A 11/1996 Ueno et al.
5,583,652 A 12/1996 Ware
5,589,993 A 12/1996 Naimpally et al.
5,600,721 A 2/1997 Kitazato
5,614,940 A 3/1997 Cobbley et al.
5,621,794 A 4/1997 Matsuda et al.
5,627,936 A 5/1997 Prasad
5,630,005 A 5/1997 Ort
5,633,472 A 5/1997 DeWitt et al.
5,642,171 A 6/1997 Baumgartner et al.
5,642,338 A 6/1997 Fukushima et al.
5,655,117 A 8/1997 Goldberg et al.
5,664,044 A 9/1997 Ware
5,675,382 A 10/1997 Bauchspies
5,675,511 A 10/1997 Prasad et al.
5,684,542 A 11/1997 Tsukagoshi
5,715,403 A 2/1998 Stefik
5,717,394 A 2/1998 Schwartz et al.
5,717,816 A 2/1998 Boyce et al.
5,719,786 A 2/1998 Nelson et al.
5,745,643 A 4/1998 Mishina
5,751,280 A 5/1998 Abbott
5,751,358 A 5/1998 Suzuki et al.
5,754,648 A 5/1998 Ryan et al.
5,757,968 A 5/1998 Ando
5,761,417 A 6/1998 Henley et al.
5,763,800 A 6/1998 Rossum et al.
5,765,164 A 6/1998 Prasad et al.
5,794,018 A 8/1998 Vrvilo et al.
5,805,228 A 9/1998 Proctor et al.
5,805,700 A 9/1998 Nardone et al.
5,813,010 A 9/1998 Kurano et al.
5,819,160 A 10/1998 Foladare et al.
5,822,524 A 10/1998 Chen et al.
5,828,370 A 10/1998 Moeller et al.
5,838,791 A 11/1998 Torii et al.
5,841,432 A 11/1998 Carmel et al.
5,844,575 A 12/1998 Reid
5,848,217 A 12/1998 Tsukagoshi et al.
5,852,664 A 12/1998 Iverson et al.
5,854,873 A 12/1998 Mori et al.
5,867,625 A 2/1999 McLaren
5,874,986 A 2/1999 Gibbon et al.
5,878,135 A 3/1999 Blatter et al.
5,887,110 A 3/1999 Sakamoto et al.
5,892,900 A 4/1999 Ginter et al.
5,892,915 A 4/1999 Duso et al.
5,903,261 A 5/1999 Walsh et al.
5,907,597 A 5/1999 Mark
5,907,658 A 5/1999 Murase et al.
5,912,710 A 6/1999 Fujimoto
5,923,869 A 7/1999 Kashiwagi et al.
5,946,446 A 8/1999 Yanagihara
5,956,729 A 9/1999 Goetz et al.
5,959,690 A 9/1999 Toebes, VIII et al.
5,970,147 A 10/1999 Davis
5,973,679 A 10/1999 Abbott et al.
5,990,955 A 11/1999 Koz
5,999,812 A 12/1999 Himsworth
6,002,834 A 12/1999 Hirabayashi et al.
6,005,621 A 12/1999 Linzer et al.
6,009,237 A 12/1999 Hirabayashi et al.
6,016,381 A 1/2000 Taira et al.
6,018,611 A 1/2000 Nogami et al.
6,031,622 A 2/2000 Ristow et al.
6,038,257 A 3/2000 Brusewitz
6,038,316 A 3/2000 Dwork et al.
6,044,469 A 3/2000 Horstmann
6,046,778 A 4/2000 Nonomura et al.
6,047,100 A 4/2000 McLaren
6,057,832 A 5/2000 Lev et al.
6,058,240 A 5/2000 McLaren
6,064,794 A 5/2000 McLaren et al.
6,065,050 A 5/2000 DeMoney
6,079,566 A 6/2000 Eleftheriadis et al.
6,097,877 A 8/2000 Katayama et al.
6,108,422 A 8/2000 Newby et al.
6,141,754 A 10/2000 Choy
6,151,632 A 11/2000 Chaddha et al.
6,151,634 A 11/2000 Glaser et al.
6,155,840 A 12/2000 Sallette
6,157,410 A 12/2000 Izumi et al.
6,169,242 B1 1/2001 Fay et al.
6,175,921 B1 1/2001 Rosen
6,192,075 B1 2/2001 Jeng et al.
6,192,154 B1 2/2001 Rajagopalan et al.
6,195,388 B1 2/2001 Choi et al.
6,199,107 B1 3/2001 Dujari
6,204,883 B1 3/2001 Tsukagoshi
6,222,981 B1 4/2001 Rijckaert
6,246,803 B1 6/2001 Gauch et al.
6,266,483 B1 7/2001 Okada et al.
6,282,320 B1 8/2001 Hasegawa et al.
6,282,653 B1 8/2001 Berstis et al.
6,289,450 B1 9/2001 Pensak et al.

(56) References Cited

U.S. PATENT DOCUMENTS

| | | | |
|---|---|---|---|
| 6,292,621 | B1 | 9/2001 | Tanaka et al. |
| 6,308,005 | B1 | 10/2001 | Ando et al. |
| 6,320,905 | B1 | 11/2001 | Konstantinides |
| 6,330,286 | B1 | 12/2001 | Lyons et al. |
| 6,347,145 | B2 | 2/2002 | Kato et al. |
| 6,351,538 | B1 | 2/2002 | Uz |
| 6,373,803 | B2 | 4/2002 | Ando et al. |
| 6,374,144 | B1 | 4/2002 | Viviani et al. |
| 6,389,218 | B2 | 5/2002 | Gordon et al. |
| 6,389,473 | B1 | 5/2002 | Carmel et al. |
| 6,395,969 | B1 | 5/2002 | Fuhrer |
| 6,397,230 | B1 | 5/2002 | Carmel et al. |
| 6,415,031 | B1 | 7/2002 | Colligan et al. |
| 6,418,270 | B1 | 7/2002 | Steenhof et al. |
| 6,430,354 | B1 | 8/2002 | Watanabe |
| 6,441,754 | B1 | 8/2002 | Wang et al. |
| 6,445,877 | B1 | 9/2002 | Okada et al. |
| 6,449,719 | B1 | 9/2002 | Baker |
| 6,453,115 | B1 | 9/2002 | Boyle |
| 6,453,116 | B1 | 9/2002 | Ando et al. |
| 6,466,671 | B1 | 10/2002 | Maillard et al. |
| 6,466,733 | B1 | 10/2002 | Kim |
| 6,481,012 | B1 | 11/2002 | Gordon et al. |
| 6,504,873 | B1 | 1/2003 | Vehvilaeinen |
| 6,510,513 | B1 | 1/2003 | Danieli |
| 6,510,554 | B1 | 1/2003 | Gordon et al. |
| 6,512,883 | B2 | 1/2003 | Shim et al. |
| 6,516,064 | B1 | 2/2003 | Osawa et al. |
| 6,532,262 | B1 | 3/2003 | Fukuda et al. |
| 6,535,920 | B1 | 3/2003 | Parry et al. |
| 6,578,200 | B1 | 6/2003 | Takao et al. |
| 6,587,506 | B1 | 7/2003 | Noridomi et al. |
| 6,594,699 | B1 | 7/2003 | Sahai et al. |
| 6,614,843 | B1 | 9/2003 | Gordon et al. |
| 6,621,979 | B1 | 9/2003 | Eerenberg et al. |
| 6,625,320 | B1 | 9/2003 | Nilsson et al. |
| 6,642,967 | B1 | 11/2003 | Saunders |
| 6,654,933 | B1 | 11/2003 | Abbott et al. |
| 6,658,056 | B1 | 12/2003 | Duruöz et al. |
| 6,665,835 | B1 | 12/2003 | Gutfreund et al. |
| 6,671,408 | B1 | 12/2003 | Kaku |
| 6,690,838 | B2 | 2/2004 | Zhou |
| 6,697,568 | B1 | 2/2004 | Kaku |
| 6,714,909 | B1 | 3/2004 | Gibbon et al. |
| 6,721,794 | B2 | 4/2004 | Taylor et al. |
| 6,724,944 | B1 | 4/2004 | Kalevo et al. |
| 6,725,281 | B1 | 4/2004 | Zintel |
| 6,742,082 | B1 | 5/2004 | Lango et al. |
| 6,751,623 | B1 | 6/2004 | Basso et al. |
| 6,771,703 | B1 | 8/2004 | Oguz et al. |
| 6,807,306 | B1 | 10/2004 | Girgensohn et al. |
| 6,810,031 | B1 | 10/2004 | Hegde et al. |
| 6,810,131 | B2 | 10/2004 | Nakagawa et al. |
| 6,810,389 | B1 | 10/2004 | Meyer |
| 6,813,437 | B2 | 11/2004 | Ando et al. |
| 6,819,394 | B1 | 11/2004 | Nomura et al. |
| 6,850,252 | B1 | 2/2005 | Hoffberg |
| 6,856,997 | B2 | 2/2005 | Lee et al. |
| 6,859,496 | B1 | 2/2005 | Boroczky et al. |
| 6,868,525 | B1 | 3/2005 | Szabo |
| 6,871,006 | B1 | 3/2005 | Oguz et al. |
| 6,912,253 | B1 | 6/2005 | Li et al. |
| 6,912,513 | B1 | 6/2005 | Candelore |
| 6,917,652 | B2 | 7/2005 | Lyu |
| 6,920,179 | B1 | 7/2005 | Anand et al. |
| 6,931,531 | B1 | 8/2005 | Takahashi |
| 6,931,543 | B1 | 8/2005 | Pang et al. |
| 6,944,621 | B1 | 9/2005 | Collart |
| 6,944,629 | B1 | 9/2005 | Shioi et al. |
| 6,956,901 | B2 | 10/2005 | Boroczky et al. |
| 6,957,350 | B1 | 10/2005 | Demos |
| 6,965,646 | B1 | 11/2005 | Firestone |
| 6,965,724 | B1 | 11/2005 | Boccon-Gibod et al. |
| 6,965,993 | B2 | 11/2005 | Baker |
| 6,970,564 | B1 | 11/2005 | Kubota et al. |
| 6,983,079 | B2 | 1/2006 | Kim |
| 6,985,588 | B1 | 1/2006 | Glick et al. |
| 6,988,144 | B1 | 1/2006 | Luken et al. |
| 7,006,757 | B2 | 2/2006 | Ando et al. |
| 7,007,170 | B2 | 2/2006 | Morten |
| 7,020,287 | B2 | 3/2006 | Unger |
| 7,023,924 | B1 | 4/2006 | Keller et al. |
| 7,023,992 | B1 | 4/2006 | Kubota et al. |
| 7,043,021 | B2 | 5/2006 | Graunke et al. |
| 7,043,473 | B1 | 5/2006 | Rassool et al. |
| 7,051,110 | B2 | 5/2006 | Hagai et al. |
| 7,054,968 | B2 | 5/2006 | Shrader et al. |
| 7,058,177 | B1 | 6/2006 | Trimberger et al. |
| 7,073,191 | B2 | 7/2006 | Srikantan et al. |
| 7,103,906 | B1 | 9/2006 | Katz et al. |
| 7,110,542 | B1 | 9/2006 | Tripathy |
| 7,120,250 | B2 | 10/2006 | Candelore |
| 7,124,303 | B2 | 10/2006 | Candelore et al. |
| 7,127,155 | B2 | 10/2006 | Ando et al. |
| 7,139,868 | B2 | 11/2006 | Parry et al. |
| 7,143,289 | B2 | 11/2006 | Denning et al. |
| 7,150,045 | B2 | 12/2006 | Koelle et al. |
| 7,151,832 | B1 | 12/2006 | Fetkovich et al. |
| 7,151,833 | B2 | 12/2006 | Candelore et al. |
| 7,165,175 | B1 | 1/2007 | Kollmyer et al. |
| 7,167,560 | B2 | 1/2007 | Yu |
| 7,181,438 | B1 | 2/2007 | Szabo |
| 7,185,363 | B1 | 2/2007 | Narin et al. |
| 7,188,183 | B1 | 3/2007 | Paul et al. |
| 7,191,335 | B1 | 3/2007 | Maillard |
| 7,197,234 | B1 | 3/2007 | Chatterton |
| 7,203,313 | B2 | 4/2007 | England et al. |
| 7,206,940 | B2 | 4/2007 | Evans et al. |
| 7,209,892 | B1 | 4/2007 | Galuten et al. |
| 7,212,726 | B2 | 5/2007 | Zetts |
| 7,231,132 | B1 | 6/2007 | Davenport |
| 7,231,516 | B1 | 6/2007 | Sparrell et al. |
| 7,233,669 | B2 | 6/2007 | Candelore |
| 7,233,948 | B1 | 6/2007 | Shamoon et al. |
| 7,237,061 | B1 | 6/2007 | Boic |
| 7,242,772 | B1 | 7/2007 | Tehranchi |
| 7,243,346 | B1 | 7/2007 | Seth et al. |
| 7,274,861 | B2 | 9/2007 | Yahata et al. |
| 7,295,673 | B2 | 11/2007 | Grab et al. |
| 7,302,490 | B1 | 11/2007 | Gupta et al. |
| 7,315,829 | B1 | 1/2008 | Tagawa et al. |
| 7,328,345 | B2 | 2/2008 | Morten et al. |
| 7,330,875 | B1 | 2/2008 | Parasnis et al. |
| 7,340,528 | B2 | 3/2008 | Noblecourt et al. |
| 7,346,163 | B2 | 3/2008 | Pedlow, Jr. et al. |
| 7,349,886 | B2 | 3/2008 | Morten et al. |
| 7,349,976 | B1 | 3/2008 | Glaser et al. |
| 7,352,956 | B1 | 4/2008 | Winter et al. |
| 7,356,143 | B2 | 4/2008 | Morten |
| 7,356,245 | B2 | 4/2008 | Belknap et al. |
| 7,363,647 | B1 | 4/2008 | Fakharzadeh |
| 7,366,788 | B2 | 4/2008 | Jones et al. |
| 7,376,233 | B2 | 5/2008 | Candelore et al. |
| 7,376,831 | B2 | 5/2008 | Kollmyer et al. |
| 7,382,879 | B1 | 6/2008 | Miller |
| 7,397,853 | B2 | 7/2008 | Kwon et al. |
| 7,400,679 | B2 | 7/2008 | Kwon et al. |
| 7,406,174 | B2 | 7/2008 | Palmer |
| 7,406,176 | B2 | 7/2008 | Zhu et al. |
| 7,418,132 | B2 | 8/2008 | Hoshuyama |
| 7,421,411 | B2 | 9/2008 | Kontio et al. |
| 7,443,449 | B2 | 10/2008 | Momosaki et al. |
| 7,454,780 | B2 | 11/2008 | Katsube et al. |
| 7,457,359 | B2 | 11/2008 | Mabey et al. |
| 7,457,415 | B2 | 11/2008 | Reitmeier et al. |
| 7,460,668 | B2 | 12/2008 | Grab et al. |
| 7,472,280 | B2 | 12/2008 | Giobbi |
| 7,478,325 | B2 | 1/2009 | Foehr |
| 7,484,103 | B2 | 1/2009 | Woo et al. |
| 7,493,018 | B2 | 2/2009 | Kim |
| 7,499,930 | B2 | 3/2009 | Naka et al. |
| 7,499,938 | B2 | 3/2009 | Collart |
| 7,515,710 | B2 | 4/2009 | Russell et al. |
| 7,526,450 | B2 | 4/2009 | Hughes et al. |

(56) References Cited

U.S. PATENT DOCUMENTS 7,539,213 B2 5/2009 Guillemot et al.
7,546,641 B2 6/2009 Robert et al.
7,577,980 B2 8/2009 Kienzle et al.
7,594,271 B2 9/2009 Zhuk et al.
7,610,365 B1 10/2009 Kraft et al.
7,623,759 B2 11/2009 Shimoda
7,624,337 B2 11/2009 Sull et al.
7,627,750 B1 12/2009 Chan
7,627,888 B2 12/2009 Ganesan et al.
7,639,921 B2 12/2009 Seo et al.
7,640,358 B2 12/2009 Deshpande
7,640,435 B2 12/2009 Morten
7,644,172 B2 1/2010 Stewart et al.
7,653,686 B2 1/2010 Yoneda
7,664,262 B2 2/2010 Haruki
7,664,872 B2 2/2010 Osborne et al.
7,676,555 B2 3/2010 Bushee et al.
7,689,510 B2 3/2010 Lamkin et al.
7,697,686 B2 4/2010 Puiatti et al.
7,702,925 B2 4/2010 Hanko et al.
7,711,052 B2 5/2010 Hannuksela et al.
7,711,647 B2 5/2010 Gunaseelan et al.
7,720,352 B2 5/2010 Belknap et al.
7,728,878 B2 6/2010 Yea et al.
7,734,806 B2 6/2010 Park
7,747,853 B2 6/2010 Candelore
7,756,270 B2 7/2010 Shimosato et al.
7,756,271 B2 7/2010 Zhu et al.
7,761,892 B2 7/2010 Ellis et al.
7,779,097 B2 8/2010 Lamkin et al.
7,787,622 B2 8/2010 Sprunk
7,788,271 B2 8/2010 Soma et al.
7,797,720 B2 9/2010 Gopalakrishnan et al.
7,817,608 B2 10/2010 Rassool et al.
7,840,693 B2 11/2010 Gupta et al.
7,853,980 B2 12/2010 Pedlow, Jr. et al.
7,864,186 B2 1/2011 Robotham et al.
7,869,691 B2 1/2011 Kelly et al.
7,873,740 B2 1/2011 Sitaraman et al.
7,877,002 B2 1/2011 Ikeda et al.
7,881,478 B2 2/2011 Derouet
7,882,034 B2 2/2011 Hug et al.
7,885,405 B1 2/2011 Bong
7,895,311 B1 2/2011 Juenger
7,907,833 B2 3/2011 Lee
7,913,277 B1 3/2011 Rahrer
7,945,143 B2 5/2011 Yahata et al.
7,949,703 B2 5/2011 Matsuzaki et al.
7,962,942 B1 6/2011 Craner
7,970,835 B2 6/2011 St, Jacques
7,974,714 B2 7/2011 Hoffberg
7,984,513 B1 7/2011 Kyne et al.
7,991,156 B1 8/2011 Miller
8,001,471 B2 8/2011 Shaver et al.
8,015,491 B2 9/2011 Shaver et al.
8,023,562 B2 9/2011 Zheludkov et al.
8,046,453 B2 10/2011 Olaiya
8,054,880 B2 11/2011 Yu et al.
8,065,708 B1 11/2011 Smyth et al.
8,069,260 B2 11/2011 Speicher et al.
8,073,900 B2 12/2011 Guedalia et al.
8,074,083 B1 12/2011 Lee et al.
8,078,644 B2 12/2011 Hannuksela
8,082,442 B2 12/2011 Keljo et al.
8,131,875 B1 3/2012 Chen
8,135,041 B2 3/2012 Ramaswamy
8,160,157 B2 4/2012 Lamy-Bergot et al.
8,169,916 B1 5/2012 Pai et al.
8,170,210 B2 5/2012 Manders et al.
8,195,714 B2 6/2012 Mckibben et al.
8,201,264 B2 6/2012 Grab et al.
8,213,607 B2 7/2012 Rose et al.
8,213,768 B2 7/2012 Morioka et al.
8,218,439 B2 7/2012 Deshpande
8,225,061 B2 7/2012 Greenebaum
8,233,768 B2 7/2012 Soroushian et al.
8,243,924 B2 8/2012 Chen et al.
8,245,124 B1 8/2012 Gupta
8,249,168 B2 8/2012 Graves
8,261,356 B2 9/2012 Choi et al.
8,265,168 B1 9/2012 Masterson et al.
8,270,473 B2 9/2012 Chen et al.
8,270,819 B2 9/2012 Vannier
8,275,871 B2 9/2012 Ram et al.
8,286,213 B2 10/2012 Seo
8,286,621 B2 10/2012 Halmone
8,289,338 B2 10/2012 Priyadarshi et al.
8,290,038 B1 * 10/2012 Wang .................... H04N 19/15
375/240.03
8,290,157 B2 10/2012 Candelore
8,291,460 B1 10/2012 Peacock
8,296,434 B1 10/2012 Miller et al.
8,311,094 B2 11/2012 Kamariotis et al.
8,311,111 B2 11/2012 Xu et al.
8,311,115 B2 11/2012 Gu et al.
8,312,079 B2 11/2012 Newsome et al.
8,321,556 B1 11/2012 Chatterjee et al.
8,325,800 B2 12/2012 Holcomb et al.
8,327,009 B2 12/2012 Prestenback et al.
8,341,715 B2 12/2012 Sherkin et al.
8,346,753 B2 1/2013 Hayes
8,365,235 B2 1/2013 Hunt et al.
8,369,421 B2 2/2013 Kadono et al.
8,380,041 B2 2/2013 Barton et al.
8,386,621 B2 2/2013 Park
8,396,114 B2 * 3/2013 Gu ...................... H04N 19/177
370/235
8,397,265 B2 3/2013 Henocq et al.
8,401,188 B1 3/2013 Swaminathan
8,401,900 B2 3/2013 Cansler et al.
8,407,753 B2 3/2013 Kuo
8,412,841 B1 4/2013 Swaminathan et al.
8,423,889 B1 4/2013 Zagorie et al.
8,452,110 B2 5/2013 Shoham et al.
8,456,380 B2 6/2013 Pagan
8,464,066 B1 6/2013 Price et al.
8,472,792 B2 6/2013 Butt
8,473,630 B1 6/2013 Galligan
8,484,368 B2 7/2013 Robert et al.
8,510,303 B2 8/2013 Soroushian et al.
8,510,404 B2 8/2013 Carmel et al.
8,514,926 B2 8/2013 Ro et al.
8,515,265 B2 8/2013 Kwon et al.
8,516,529 B2 8/2013 Lajoie et al.
8,526,610 B2 9/2013 Shamoon et al.
8,527,645 B1 9/2013 Proffit et al.
8,543,842 B2 9/2013 Ginter et al.
8,555,329 B2 10/2013 Fröjdh et al.
8,571,993 B2 10/2013 Kocher et al.
8,595,378 B1 11/2013 Cohn et al.
8,606,069 B2 12/2013 Okubo et al.
8,630,419 B2 1/2014 Mori
8,631,247 B2 1/2014 O'loughlin et al.
8,640,166 B1 1/2014 Craner et al.
8,649,669 B2 2/2014 Braness et al.
8,650,599 B2 2/2014 Shindo et al.
8,656,183 B2 2/2014 Russell et al.
8,677,428 B2 3/2014 Lewis et al.
8,681,866 B1 3/2014 Jia
8,683,066 B2 3/2014 Hurst et al.
8,689,267 B2 4/2014 Hunt
8,726,264 B1 5/2014 Allen et al.
8,731,193 B2 5/2014 Farkash et al.
8,731,369 B2 5/2014 Li et al.
RE45,052 E 7/2014 Li
8,767,825 B1 7/2014 Wang et al.
8,768,984 B2 7/2014 Priddle et al.
8,774,609 B2 7/2014 Drake et al.
8,781,122 B2 7/2014 Chan et al.
8,782,268 B2 7/2014 Pyle et al.
8,804,956 B2 8/2014 Hiriart
8,805,109 B2 8/2014 Shoham et al.
8,806,188 B2 8/2014 Braness et al.
8,818,171 B2 8/2014 Soroushian et al.

(56) References Cited

U.S. PATENT DOCUMENTS

| | | | |
|---|---|---|---|
| 8,818,896 | B2 | 8/2014 | Candelore |
| 8,819,116 | B1 | 8/2014 | Tomay et al. |
| 8,832,297 | B2 | 9/2014 | Soroushian et al. |
| 8,832,434 | B2 | 9/2014 | Apostolopoulos et al. |
| 8,843,586 | B2 | 9/2014 | Pantos et al. |
| 8,849,950 | B2 | 9/2014 | Stockhammer et al. |
| 8,850,205 | B2 | 9/2014 | Choi et al. |
| 8,850,498 | B1 | 9/2014 | Roach et al. |
| 8,856,218 | B1 | 10/2014 | Inskip |
| 8,897,370 | B1 | 11/2014 | Wang et al. |
| 8,908,984 | B2 | 12/2014 | Shoham et al. |
| 8,909,922 | B2 | 12/2014 | Kiefer et al. |
| 8,914,534 | B2 | 12/2014 | Braness et al. |
| 8,914,836 | B2 | 12/2014 | Shivadas et al. |
| 8,918,533 | B2 | 12/2014 | Chen et al. |
| 8,918,535 | B2 | 12/2014 | Ma et al. |
| 8,918,636 | B2 | 12/2014 | Kiefer |
| 8,918,908 | B2 | 12/2014 | Ziskind et al. |
| 8,948,249 | B2 | 2/2015 | Sun et al. |
| 8,964,977 | B2 | 2/2015 | Ziskind et al. |
| 8,997,161 | B2 | 3/2015 | Priyadarshi et al. |
| 8,997,254 | B2 | 3/2015 | Amidei et al. |
| 9,014,471 | B2 | 4/2015 | Shoham et al. |
| 9,015,782 | B2 | 4/2015 | Acharya et al. |
| 9,021,119 | B2 | 4/2015 | Van Der Schaar et al. |
| 9,025,659 | B2 | 5/2015 | Soroushian et al. |
| 9,038,116 | B1 | 5/2015 | Knox et al. |
| 9,038,121 | B2 | 5/2015 | Kienzle et al. |
| 9,042,670 | B2 | 5/2015 | Carmel et al. |
| 9,049,497 | B2 | 6/2015 | Chen et al. |
| 9,060,207 | B2 | 6/2015 | Scherkus et al. |
| 9,094,737 | B2 | 7/2015 | Shivadas et al. |
| 9,098,335 | B2 | 8/2015 | Muthiah et al. |
| 9,111,098 | B2 | 8/2015 | Smith et al. |
| 9,124,773 | B2 | 9/2015 | Chan et al. |
| 9,125,073 | B2 | 9/2015 | Oyman et al. |
| 9,184,920 | B2 | 11/2015 | Grab et al. |
| 9,191,151 | B2 | 11/2015 | Luby et al. |
| 9,191,457 | B2 | 11/2015 | Van der Schaar |
| 9,197,685 | B2 | 11/2015 | Soroushian |
| 9,197,944 | B2 | 11/2015 | Reisner |
| 9,201,922 | B2 | 12/2015 | Soroushian et al. |
| 9,203,816 | B2 | 12/2015 | Brueck et al. |
| 9,210,481 | B2 | 12/2015 | Braness et al. |
| 9,215,466 | B2 | 12/2015 | Zhai et al. |
| 9,247,311 | B2 | 1/2016 | Kiefer |
| 9,247,312 | B2 | 1/2016 | Braness et al. |
| 9,247,317 | B2 | 1/2016 | Shivadas et al. |
| 9,253,178 | B2 | 2/2016 | Blom et al. |
| 9,264,475 | B2 | 2/2016 | Shivadas et al. |
| 9,294,531 | B2 | 3/2016 | Zhang et al. |
| 9,313,510 | B2 | 4/2016 | Shivadas et al. |
| 9,343,112 | B2 | 5/2016 | Amidei et al. |
| 9,344,517 | B2 | 5/2016 | Shivadas et al. |
| 9,344,721 | B2 | 5/2016 | Dikvall |
| 9,350,990 | B2 | 5/2016 | Orton-Jay et al. |
| 9,357,210 | B2 | 5/2016 | Orton-Jay et al. |
| 9,380,096 | B2 | 6/2016 | Luby et al. |
| 9,386,064 | B2 | 7/2016 | Luby et al. |
| 9,467,708 | B2 | 10/2016 | Soroushian et al. |
| 9,479,805 | B2 | 10/2016 | Rothschild et al. |
| 9,485,469 | B2 | 11/2016 | Kahn et al. |
| 9,485,546 | B2 | 11/2016 | Chen et al. |
| 9,510,031 | B2 | 11/2016 | Soroushian et al. |
| 9,571,827 | B2 | 2/2017 | Su et al. |
| 9,584,557 | B2 | 2/2017 | Panje et al. |
| 9,584,847 | B2 | 2/2017 | Ma et al. |
| 9,615,061 | B2 | 4/2017 | Carney et al. |
| 9,621,522 | B2 | 4/2017 | Kiefer et al. |
| 9,628,536 | B2 | 4/2017 | Luby et al. |
| 9,661,049 | B2 | 5/2017 | Gordon |
| 9,667,684 | B2 | 5/2017 | Ziskind et al. |
| 9,672,286 | B2 | 6/2017 | Soroushian et al. |
| 9,674,254 | B2 | 6/2017 | Pare et al. |
| 9,686,332 | B1 | 6/2017 | Binns et al. |
| 9,706,259 | B2 | 7/2017 | Chan et al. |
| 9,712,890 | B2 | 7/2017 | Shivadas et al. |
| 9,761,274 | B2 | 9/2017 | Delpuch et al. |
| 9,798,863 | B2 | 10/2017 | Grab et al. |
| 9,813,740 | B2 | 11/2017 | Panje et al. |
| 9,832,540 | B2 | 11/2017 | Liao et al. |
| 9,866,878 | B2 | 1/2018 | Van der Schaar et al. |
| 9,883,204 | B2 | 1/2018 | Braness et al. |
| 9,906,785 | B2 | 2/2018 | Naletov et al. |
| 9,955,195 | B2 | 4/2018 | Soroushian |
| 9,967,189 | B2 | 5/2018 | Patel et al. |
| 9,967,305 | B2 | 5/2018 | Braness |
| 9,967,521 | B2 | 5/2018 | Kahn et al. |
| 10,148,989 | B2 | 12/2018 | Amidei et al. |
| 10,169,094 | B2 | 1/2019 | Iyer |
| 10,171,873 | B2 | 1/2019 | Krebs |
| 10,212,486 | B2 | 2/2019 | Chan et al. |
| 10,225,299 | B2 | 3/2019 | Van der Schaar et al. |
| 10,225,588 | B2 | 3/2019 | Kiefer et al. |
| 10,244,272 | B2 | 3/2019 | Kiefer et al. |
| 10,264,255 | B2 | 4/2019 | Naletov et al. |
| 10,321,168 | B2 | 6/2019 | Van der Schaar et al. |
| 10,341,698 | B2 | 7/2019 | Kiefer et al. |
| 10,368,096 | B2 | 7/2019 | Braness et al. |
| 10,382,785 | B2 | 8/2019 | Braness et al. |
| 10,437,896 | B2 | 10/2019 | Soroushian et al. |
| 10,452,715 | B2 | 10/2019 | Soroushian et al. |
| 10,462,537 | B2 | 10/2019 | Shivadas et al. |
| 10,595,070 | B2 | 3/2020 | Amidei et al. |
| 10,645,429 | B2 | 5/2020 | Soroushian |
| 10,708,587 | B2 | 7/2020 | Soroushian et al. |
| 10,715,806 | B2 | 7/2020 | Naletov et al. |
| 10,798,143 | B2 | 10/2020 | Soroushian et al. |
| 10,805,368 | B2 | 10/2020 | Van der Schaar et al. |
| 10,856,020 | B2 | 12/2020 | Kiefer et al. |
| 10,893,305 | B2 | 1/2021 | Van der Schaar et al. |
| 10,931,982 | B2 | 2/2021 | Soroushian |
| 10,992,955 | B2 | 4/2021 | Braness et al. |
| RE48,761 | E | 9/2021 | Shivadas et al. |
| 11,457,054 | B2 | 9/2022 | Soroushian et al. |
| 11,611,785 | B2 | 3/2023 | Soroushian |
| 2001/0021276 | A1 | 9/2001 | Zhou |
| 2001/0030710 | A1 | 10/2001 | Werner |
| 2001/0036355 | A1 | 11/2001 | Kelly et al. |
| 2001/0046299 | A1 | 11/2001 | Wasilewski et al. |
| 2001/0052077 | A1 | 12/2001 | Fung et al. |
| 2001/0052127 | A1 | 12/2001 | Seo et al. |
| 2001/0053222 | A1 | 12/2001 | Wakao et al. |
| 2001/0055337 | A1 | 12/2001 | Matsuzaki et al. |
| 2002/0026560 | A1 | 2/2002 | Jordan et al. |
| 2002/0034252 | A1 | 3/2002 | Owen et al. |
| 2002/0048450 | A1 | 4/2002 | Zetts |
| 2002/0051494 | A1 | 5/2002 | Yamaguchi et al. |
| 2002/0057739 | A1 | 5/2002 | Hasebe et al. |
| 2002/0057898 | A1 | 5/2002 | Normile |
| 2002/0062313 | A1 | 5/2002 | Lee et al. |
| 2002/0067432 | A1 | 6/2002 | Kondo et al. |
| 2002/0075572 | A1 | 6/2002 | Boreczky et al. |
| 2002/0076112 | A1 | 6/2002 | Devara |
| 2002/0085638 | A1 | 7/2002 | Morad et al. |
| 2002/0087569 | A1 | 7/2002 | Fischer et al. |
| 2002/0089523 | A1 | 7/2002 | Hodgkinson |
| 2002/0091665 | A1 | 7/2002 | Beek et al. |
| 2002/0093571 | A1 | 7/2002 | Hyodo |
| 2002/0094031 | A1 | 7/2002 | Ngai et al. |
| 2002/0107802 | A1 | 8/2002 | Philips |
| 2002/0110193 | A1 | 8/2002 | Yoo et al. |
| 2002/0114330 | A1 | 8/2002 | Cheung et al. |
| 2002/0116481 | A1 | 8/2002 | Lee |
| 2002/0118953 | A1 | 8/2002 | Kim |
| 2002/0120498 | A1 | 8/2002 | Gordon et al. |
| 2002/0120934 | A1 | 8/2002 | Abrahams et al. |
| 2002/0135607 | A1 | 9/2002 | Kato et al. |
| 2002/0136298 | A1 | 9/2002 | Anantharamu et al. |
| 2002/0141503 | A1 | 10/2002 | Kobayashi et al. |
| 2002/0143413 | A1 | 10/2002 | Fay et al. |
| 2002/0143547 | A1 | 10/2002 | Fay et al. |
| 2002/0147980 | A1 | 10/2002 | Satoda |
| 2002/0151992 | A1 | 10/2002 | Hoffberg et al. |

(56) References Cited

U.S. PATENT DOCUMENTS

2002/0154779 A1 10/2002 Asano et al.
2002/0159528 A1 10/2002 Graziani et al.
2002/0159598 A1 10/2002 Rubinstein et al.
2002/0161462 A1 10/2002 Fay
2002/0161797 A1 10/2002 Gallo et al.
2002/0164024 A1 11/2002 Arakawa et al.
2002/0169926 A1 11/2002 Pinckney et al.
2002/0169971 A1 11/2002 Asano et al.
2002/0180929 A1 12/2002 Tseng et al.
2002/0184159 A1 12/2002 Tadayon et al.
2002/0184515 A1 12/2002 Oho et al.
2002/0191112 A1 12/2002 Akiyoshi et al.
2002/0191959 A1 12/2002 Lin et al.
2002/0191960 A1 12/2002 Fujinami et al.
2003/0001964 A1 1/2003 Masukura et al.
2003/0002577 A1 1/2003 Pinder
2003/0002578 A1 1/2003 Tsukagoshi et al.
2003/0005442 A1 1/2003 Brodersen et al.
2003/0012275 A1 1/2003 Boice et al.
2003/0021296 A1 1/2003 Wee et al.
2003/0031178 A1 2/2003 Haeri
2003/0035488 A1 2/2003 Barrau
2003/0035545 A1 2/2003 Jiang
2003/0035546 A1 2/2003 Jiang et al.
2003/0041257 A1 2/2003 Wee et al.
2003/0043847 A1 3/2003 Haddad
2003/0044080 A1 3/2003 Frishman et al.
2003/0051237 A1 3/2003 Sako et al.
2003/0053541 A1 3/2003 Sun et al.
2003/0061305 A1 3/2003 Copley et al.
2003/0061369 A1 3/2003 Aksu et al.
2003/0063675 A1 4/2003 Kang et al.
2003/0065777 A1 4/2003 Mattila et al.
2003/0077071 A1 4/2003 Lin et al.
2003/0078891 A1 4/2003 Capitant
2003/0078930 A1 4/2003 Surcouf et al.
2003/0079222 A1 4/2003 Boykin et al.
2003/0081776 A1 5/2003 Candelore
2003/0093799 A1 5/2003 Kauffman et al.
2003/0123855 A1 7/2003 Okada et al.
2003/0128296 A1 7/2003 Lee
2003/0133506 A1 7/2003 Haneda
2003/0135633 A1 7/2003 Dror et al.
2003/0135742 A1 7/2003 Evans
2003/0142594 A1 7/2003 Tsumagari et al.
2003/0142872 A1 7/2003 Koyanagi
2003/0152224 A1 8/2003 Candelore et al.
2003/0152370 A1 8/2003 Otomo et al.
2003/0163824 A1 8/2003 Gordon et al.
2003/0165328 A1 9/2003 Grecia
2003/0174844 A1 9/2003 Candelore
2003/0185302 A1 10/2003 Abrams
2003/0185542 A1 10/2003 McVeigh et al.
2003/0206558 A1 11/2003 Parkkinen et al.
2003/0206717 A1 11/2003 Yogeshwar et al.
2003/0210821 A1 11/2003 Yogeshwar et al.
2003/0216922 A1 11/2003 Gonzales et al.
2003/0229900 A1 12/2003 Reisman
2003/0231863 A1 12/2003 Eerenberg et al.
2003/0231867 A1 12/2003 Gates et al.
2003/0233464 A1 12/2003 Walpole et al.
2003/0236836 A1 12/2003 Borthwick
2003/0236907 A1 12/2003 Stewart et al.
2004/0001594 A1 1/2004 Krishnaswamy et al.
2004/0003008 A1 1/2004 Wasilewski et al.
2004/0006701 A1 1/2004 Kresina
2004/0021684 A1 2/2004 Millner
2004/0022391 A1 2/2004 Obrien
2004/0024688 A1 2/2004 Bi et al.
2004/0025180 A1 2/2004 Begeja et al.
2004/0028227 A1 2/2004 Yu
2004/0031058 A1 2/2004 Reisman
2004/0037421 A1 2/2004 Truman
2004/0039916 A1 2/2004 Aldis et al.
2004/0047592 A1 3/2004 Seo et al.
2004/0047607 A1 3/2004 Seo et al.
2004/0047614 A1 3/2004 Green
2004/0049690 A1 3/2004 Candelore et al.
2004/0049694 A1 3/2004 Candelore
2004/0052501 A1 3/2004 Tam
2004/0071453 A1 4/2004 Valderas
2004/0073917 A1 4/2004 Pedlow et al.
2004/0076237 A1 4/2004 Kadono et al.
2004/0081333 A1 4/2004 Grab et al.
2004/0081434 A1 4/2004 Jung et al.
2004/0084035 A1 5/2004 Newton
2004/0088557 A1 5/2004 Malcolm et al.
2004/0093494 A1 5/2004 Nishimoto et al.
2004/0093618 A1 5/2004 Baldwin et al.
2004/0101059 A1 5/2004 Joch et al.
2004/0101142 A1 5/2004 Nasypny
2004/0105549 A1 6/2004 Suzuki et al.
2004/0107356 A1 6/2004 Shamoon et al.
2004/0114687 A1 6/2004 Ferris et al.
2004/0117347 A1 6/2004 Seo et al.
2004/0136698 A1 7/2004 Mock
2004/0139335 A1 7/2004 Diamand et al.
2004/0143760 A1 7/2004 Alkove et al.
2004/0146276 A1 7/2004 Ogawa
2004/0150747 A1 8/2004 Sita
2004/0158878 A1 8/2004 Ratnakar et al.
2004/0184534 A1 9/2004 Wang
2004/0184616 A1 9/2004 Morten et al.
2004/0202320 A1 10/2004 Amini et al.
2004/0208245 A1 10/2004 Macinnis et al.
2004/0213094 A1 10/2004 Suzuki
2004/0213547 A1 10/2004 Hayes
2004/0217971 A1 11/2004 Kim
2004/0243488 A1 12/2004 Yamamoto et al.
2004/0243714 A1 12/2004 Wynn et al.
2004/0255115 A1 12/2004 DeMello et al.
2004/0255236 A1 12/2004 Collart
2004/0267952 A1 12/2004 He et al.
2005/0004875 A1 1/2005 Kontio et al.
2005/0005025 A1 1/2005 Harville et al.
2005/0005143 A1 1/2005 Lang et al.
2005/0013494 A1 1/2005 Srinivasan et al.
2005/0015509 A1 1/2005 Sitaraman et al.
2005/0015797 A1 1/2005 Noblecourt et al.
2005/0038826 A1 2/2005 Bae et al.
2005/0052294 A1 3/2005 Liang et al.
2005/0055399 A1 3/2005 Savchuk
2005/0063541 A1 3/2005 Candelore
2005/0066063 A1 3/2005 Grigorovitch et al.
2005/0071280 A1 3/2005 Irwin et al.
2005/0076232 A1 4/2005 Kawaguchi
2005/0089091 A1 4/2005 Zhao et al.
2005/0102371 A1 5/2005 Aksu
2005/0108320 A1 5/2005 Lord et al.
2005/0114534 A1 5/2005 Lee
2005/0114896 A1 5/2005 Hug
2005/0120132 A1 6/2005 Hutter
2005/0132208 A1 6/2005 Hug et al.
2005/0138655 A1 6/2005 Zimler et al.
2005/0144468 A1 6/2005 Northcutt
2005/0149450 A1 7/2005 Stefik et al.
2005/0157948 A1 7/2005 Lee
2005/0177741 A1 8/2005 Chen et al.
2005/0180641 A1 8/2005 Clark
2005/0183120 A1 8/2005 Jain et al.
2005/0190911 A1 9/2005 Pare et al.
2005/0192904 A1 9/2005 Candelore
2005/0193070 A1 9/2005 Brown et al.
2005/0193322 A1 9/2005 Lamkin et al.
2005/0196147 A1 9/2005 Seo et al.
2005/0198364 A1 9/2005 Val et al.
2005/0204289 A1 9/2005 Mohammed et al.
2005/0207442 A1 9/2005 Zoest et al.
2005/0207578 A1 9/2005 Matsuyama et al.
2005/0210145 A1 9/2005 Kim et al.
2005/0216752 A1 9/2005 Hofmeyr et al.
2005/0227773 A1 10/2005 Lu et al.
2005/0243912 A1 11/2005 Kwon et al.
2005/0254508 A1 11/2005 Aksu et al.

(56) References Cited

U.S. PATENT DOCUMENTS

2005/0262257 A1 11/2005 Major et al.
2005/0265555 A1 12/2005 Pippuri
2005/0273695 A1 12/2005 Schnurr
2005/0275656 A1 12/2005 Corbin et al.
2006/0013568 A1 1/2006 Rodriguez
2006/0015580 A1 1/2006 Gabriel et al.
2006/0015813 A1 1/2006 Chung et al.
2006/0020825 A1 1/2006 Grab
2006/0026294 A1 2/2006 Virdi et al.
2006/0026302 A1 2/2006 Bennett et al.
2006/0026654 A1 2/2006 An et al.
2006/0036549 A1 2/2006 Wu
2006/0037057 A1 2/2006 Xu
2006/0039481 A1 2/2006 Shen et al.
2006/0052095 A1 3/2006 Vazvan
2006/0053080 A1 3/2006 Edmonson et al.
2006/0059223 A1 3/2006 Klemets et al.
2006/0064605 A1 3/2006 Giobbi
2006/0072672 A1 4/2006 Holcomb et al.
2006/0078301 A1 4/2006 Ikeda et al.
2006/0083302 A1* 4/2006 Han ...................... H04N 19/86 375/E7.199
2006/0093318 A1 5/2006 Cohen et al.
2006/0093320 A1 5/2006 Hallberg et al.
2006/0095472 A1 5/2006 Krikorian et al.
2006/0109856 A1 5/2006 Deshpande
2006/0120378 A1 6/2006 Usuki et al.
2006/0126717 A1 6/2006 Boyce et al.
2006/0129909 A1 6/2006 Butt et al.
2006/0165163 A1 7/2006 Burazerovic et al.
2006/0165233 A1 7/2006 Nonaka et al.
2006/0168298 A1 7/2006 Aoki et al.
2006/0168639 A1 7/2006 Gan et al.
2006/0173887 A1 8/2006 Breitfeld et al.
2006/0179239 A1 8/2006 Fluhr et al.
2006/0181965 A1 8/2006 Collart
2006/0182139 A1 8/2006 Bugajski et al.
2006/0210245 A1 9/2006 Mccrossan et al.
2006/0212370 A1 9/2006 Shear et al.
2006/0218251 A1 9/2006 Tanabe
2006/0235880 A1 10/2006 Qian
2006/0235883 A1 10/2006 Krebs
2006/0245727 A1 11/2006 Nakano et al.
2006/0259588 A1 11/2006 Lerman et al.
2006/0263056 A1 11/2006 Lin et al.
2006/0267986 A1 11/2006 Bae
2006/0274835 A1 12/2006 Hamilton et al.
2006/0294164 A1 12/2006 Armangau et al.
2007/0005333 A1 1/2007 Setiohardjo et al.
2007/0024706 A1 2/2007 Brannon, Jr. et al.
2007/0031110 A1 2/2007 Rijckaert
2007/0033419 A1 2/2007 Kocher et al.
2007/0044010 A1 2/2007 Sull et al.
2007/0047645 A1 3/2007 Takashima
2007/0047901 A1 3/2007 Ando et al.
2007/0053293 A1 3/2007 Mcdonald et al.
2007/0053444 A1 3/2007 Shibata et al.
2007/0053513 A1 3/2007 Hoffberg
2007/0055982 A1 3/2007 Spilo
2007/0058928 A1 3/2007 Naito et al.
2007/0067472 A1 3/2007 Maertens et al.
2007/0067622 A1 3/2007 Nakano et al.
2007/0083467 A1 4/2007 Lindahl et al.
2007/0083617 A1 4/2007 Chakrabarti et al.
2007/0086528 A1 4/2007 Mauchly et al.
2007/0100757 A1 5/2007 Rhoads
2007/0101271 A1 5/2007 Hua et al.
2007/0101387 A1 5/2007 Hua et al.
2007/0106863 A1 5/2007 Bonwick et al.
2007/0133603 A1 6/2007 Weaver
2007/0136817 A1 6/2007 Nguyen
2007/0140647 A1 6/2007 Kusunoki et al.
2007/0154165 A1 7/2007 Hemmeryckz-Deleersnijder et al.
2007/0156770 A1 7/2007 Espelien
2007/0157077 A1 7/2007 Gibson et al.
2007/0157267 A1 7/2007 Lopez-Estrada
2007/0162568 A1 7/2007 Gupta et al.
2007/0162981 A1 7/2007 Morioka et al.
2007/0166000 A1 7/2007 Nallur et al.
2007/0168541 A1 7/2007 Gupta et al.
2007/0168542 A1 7/2007 Gupta et al.
2007/0177812 A1 8/2007 Yang et al.
2007/0178933 A1 8/2007 Nelson
2007/0180051 A1 8/2007 Kelly et al.
2007/0180125 A1 8/2007 Knowles et al.
2007/0185982 A1 8/2007 Nakanowatari et al.
2007/0192810 A1 8/2007 Pritchett et al.
2007/0201502 A1 8/2007 Abramson
2007/0201695 A1 8/2007 Saarikivi
2007/0204003 A1 8/2007 Abramson
2007/0204011 A1 8/2007 Shaver et al.
2007/0204115 A1 8/2007 Abramson
2007/0217339 A1 9/2007 Zhao
2007/0217759 A1 9/2007 Dodd
2007/0220118 A1 9/2007 Loyer
2007/0234391 A1 10/2007 Hunter et al.
2007/0239839 A1 10/2007 Buday et al.
2007/0250536 A1 10/2007 Tanaka et al.
2007/0255940 A1 11/2007 Ueno
2007/0256141 A1 11/2007 Nakano et al.
2007/0271317 A1 11/2007 Carmel et al.
2007/0271385 A1 11/2007 Davis et al.
2007/0274679 A1 11/2007 Yahata et al.
2007/0277219 A1 11/2007 Toebes et al.
2007/0277234 A1 11/2007 Bessonov et al.
2007/0280298 A1 12/2007 Hearn et al.
2007/0288745 A1 12/2007 Kwan
2007/0292107 A1 12/2007 Yahata et al.
2007/0297422 A1 12/2007 Matsuo et al.
2007/0299754 A1 12/2007 Feller
2008/0005175 A1 1/2008 Bourke et al.
2008/0008319 A1 1/2008 Poirier
2008/0008455 A1 1/2008 De Lange et al.
2008/0022005 A1 1/2008 Wu et al.
2008/0030614 A1 2/2008 Schwab
2008/0043832 A1 2/2008 Barkley et al.
2008/0046718 A1 2/2008 Grab et al.
2008/0046925 A1 2/2008 Lee et al.
2008/0052306 A1 2/2008 Wang et al.
2008/0063051 A1 3/2008 Kwon et al.
2008/0066099 A1 3/2008 Brodersen et al.
2008/0066181 A1 3/2008 Haveson et al.
2008/0069204 A1 3/2008 Uchiike
2008/0077592 A1 3/2008 Brodie et al.
2008/0086456 A1 4/2008 Rasanen et al.
2008/0086570 A1 4/2008 Dey et al.
2008/0086747 A1 4/2008 Rasanen et al.
2008/0101466 A1 5/2008 Swenson et al.
2008/0101718 A1 5/2008 Yang et al.
2008/0104633 A1 5/2008 Noblecourt et al.
2008/0120330 A1 5/2008 Reed et al.
2008/0120342 A1 5/2008 Reed et al.
2008/0120389 A1 5/2008 Bassali et al.
2008/0120637 A1 5/2008 Deiss
2008/0126248 A1 5/2008 Lee et al.
2008/0131078 A1 6/2008 Jeong et al.
2008/0134043 A1 6/2008 Georgis
2008/0137541 A1 6/2008 Agarwal et al.
2008/0137736 A1 6/2008 Richardson et al.
2008/0137847 A1 6/2008 Candelore et al.
2008/0137848 A1 6/2008 Kocher et al.
2008/0151817 A1 6/2008 Fitchett
2008/0155615 A1 6/2008 Craner et al.
2008/0160911 A1 7/2008 Chou et al.
2008/0162949 A1 7/2008 Sato et al.
2008/0168516 A1 7/2008 Flick et al.
2008/0172441 A1 7/2008 Speicher et al.
2008/0177793 A1 7/2008 Epstein et al.
2008/0184119 A1 7/2008 Eyal et al.
2008/0187283 A1 8/2008 Takahashi
2008/0192818 A1 8/2008 DiPietro et al.
2008/0195664 A1 8/2008 Maharajh et al.
2008/0195743 A1 8/2008 Brueck et al.
2008/0195744 A1 8/2008 Bowra et al.

(56) References Cited

U.S. PATENT DOCUMENTS

| | | | |
|---|---|---|---|
| 2008/0196076 | A1 | 8/2008 | Shatz et al. |
| 2008/0201705 | A1 | 8/2008 | Wookey |
| 2008/0205860 | A1 | 8/2008 | Holtman |
| 2008/0209534 | A1 | 8/2008 | Keronen et al. |
| 2008/0219449 | A1 | 9/2008 | Ball et al. |
| 2008/0229025 | A1 | 9/2008 | Plamondon |
| 2008/0232456 | A1 | 9/2008 | Terashima et al. |
| 2008/0240144 | A1 | 10/2008 | Kruse et al. |
| 2008/0253454 | A1 | 10/2008 | Imamura et al. |
| 2008/0256105 | A1 | 10/2008 | Nogawa et al. |
| 2008/0263354 | A1 | 10/2008 | Beuque et al. |
| 2008/0266522 | A1 | 10/2008 | Weisgerber |
| 2008/0271102 | A1 | 10/2008 | Kienzle et al. |
| 2008/0279535 | A1 | 11/2008 | Haque et al. |
| 2008/0294453 | A1 | 11/2008 | Baird-Smith et al. |
| 2008/0298358 | A1 | 12/2008 | John et al. |
| 2008/0310454 | A1 | 12/2008 | Bellwood et al. |
| 2008/0310496 | A1 | 12/2008 | Fang |
| 2008/0313541 | A1 | 12/2008 | Shafton et al. |
| 2008/0320100 | A1 | 12/2008 | Pantos et al. |
| 2008/0320160 | A1 | 12/2008 | Sitaraman et al. |
| 2009/0010429 | A1 | 1/2009 | Kim et al. |
| 2009/0010622 | A1 | 1/2009 | Yahata et al. |
| 2009/0013195 | A1 | 1/2009 | Ochi et al. |
| 2009/0031220 | A1 | 1/2009 | Tranchant et al. |
| 2009/0037959 | A1 | 2/2009 | Suh et al. |
| 2009/0048852 | A1 | 2/2009 | Burns et al. |
| 2009/0055546 | A1 | 2/2009 | Jung et al. |
| 2009/0060452 | A1 | 3/2009 | Chaudhri |
| 2009/0064341 | A1 | 3/2009 | Hartung et al. |
| 2009/0066839 | A1 | 3/2009 | Jung et al. |
| 2009/0067367 | A1 | 3/2009 | Buracchini et al. |
| 2009/0077143 | A1 | 3/2009 | Macy, Jr. |
| 2009/0097644 | A1 | 4/2009 | Haruki |
| 2009/0106082 | A1 | 4/2009 | Senti et al. |
| 2009/0116821 | A1 | 5/2009 | Shibamiya et al. |
| 2009/0132599 | A1 | 5/2009 | Soroushian et al. |
| 2009/0132721 | A1 | 5/2009 | Soroushian et al. |
| 2009/0132824 | A1 | 5/2009 | Terada et al. |
| 2009/0136216 | A1 | 5/2009 | Soroushian et al. |
| 2009/0138570 | A1 | 5/2009 | Miura et al. |
| 2009/0150406 | A1 | 6/2009 | Giblin |
| 2009/0150557 | A1 | 6/2009 | Wormley et al. |
| 2009/0165148 | A1 | 6/2009 | Frey et al. |
| 2009/0168795 | A1 | 7/2009 | Segel et al. |
| 2009/0169001 | A1 | 7/2009 | Tighe et al. |
| 2009/0169181 | A1 | 7/2009 | Priyadarshi et al. |
| 2009/0172201 | A1 | 7/2009 | Carmel et al. |
| 2009/0178090 | A1 | 7/2009 | Oztaskent |
| 2009/0196139 | A1 | 8/2009 | Bates et al. |
| 2009/0201988 | A1 | 8/2009 | Gazier et al. |
| 2009/0217317 | A1 | 8/2009 | White et al. |
| 2009/0226148 | A1 | 9/2009 | Nesvadba et al. |
| 2009/0228395 | A1 | 9/2009 | Wegner et al. |
| 2009/0249081 | A1 | 10/2009 | Zayas |
| 2009/0265737 | A1 | 10/2009 | Issa et al. |
| 2009/0268905 | A1 | 10/2009 | Matsushima et al. |
| 2009/0276636 | A1 | 11/2009 | Grab et al. |
| 2009/0282162 | A1 | 11/2009 | Mehrotra et al. |
| 2009/0290706 | A1 | 11/2009 | Amini et al. |
| 2009/0290708 | A1 | 11/2009 | Schneider et al. |
| 2009/0292562 | A1 | 11/2009 | Michalowski et al. |
| 2009/0293116 | A1 | 11/2009 | DeMello |
| 2009/0300204 | A1 | 12/2009 | Zhang et al. |
| 2009/0303241 | A1 | 12/2009 | Priyadarshi et al. |
| 2009/0307258 | A1 | 12/2009 | Priyadarshi et al. |
| 2009/0307267 | A1 | 12/2009 | Chen et al. |
| 2009/0310673 | A1 | 12/2009 | Chung |
| 2009/0310819 | A1 | 12/2009 | Hatano |
| 2009/0310933 | A1 | 12/2009 | Lee |
| 2009/0313544 | A1 | 12/2009 | Wood et al. |
| 2009/0313564 | A1 | 12/2009 | Rottler et al. |
| 2009/0316783 | A1 | 12/2009 | Au et al. |
| 2009/0328124 | A1 | 12/2009 | Khouzam et al. |
| 2009/0328228 | A1 | 12/2009 | Schnell |
| 2010/0002069 | A1 | 1/2010 | Eleftheriadis et al. |
| 2010/0005393 | A1 | 1/2010 | Tokashiki et al. |
| 2010/0040351 | A1 | 2/2010 | Toma et al. |
| 2010/0057928 | A1 | 3/2010 | Kapoor et al. |
| 2010/0058405 | A1 | 3/2010 | Ramakrishnan et al. |
| 2010/0074324 | A1 | 3/2010 | Qian et al. |
| 2010/0074333 | A1 | 3/2010 | Au et al. |
| 2010/0083322 | A1 | 4/2010 | Rouse |
| 2010/0094969 | A1 | 4/2010 | Zuckerman et al. |
| 2010/0095121 | A1 | 4/2010 | Shetty et al. |
| 2010/0106968 | A1 | 4/2010 | Mori et al. |
| 2010/0107260 | A1 | 4/2010 | Orrell et al. |
| 2010/0111192 | A1 | 5/2010 | Graves |
| 2010/0138903 | A1 | 6/2010 | Medvinsky |
| 2010/0142915 | A1 | 6/2010 | Mcdermott et al. |
| 2010/0142917 | A1 | 6/2010 | Isaji |
| 2010/0146055 | A1 | 6/2010 | Hannuksela et al. |
| 2010/0158099 | A1 | 6/2010 | Kalva et al. |
| 2010/0158109 | A1 | 6/2010 | Dahlby et al. |
| 2010/0161825 | A1 | 6/2010 | Ronca et al. |
| 2010/0166060 | A1 | 7/2010 | Ezure et al. |
| 2010/0185854 | A1 | 7/2010 | Burns et al. |
| 2010/0186092 | A1 | 7/2010 | Takechi et al. |
| 2010/0189183 | A1 | 7/2010 | Gu et al. |
| 2010/0191859 | A1* | 7/2010 | Raveendran ............ H04L 69/08 709/231 |
| 2010/0195713 | A1 | 8/2010 | Coulombe et al. |
| 2010/0198943 | A1 | 8/2010 | Harrang et al. |
| 2010/0218208 | A1 | 8/2010 | Holden |
| 2010/0226582 | A1 | 9/2010 | Luo et al. |
| 2010/0228795 | A1 | 9/2010 | Hahn |
| 2010/0235472 | A1 | 9/2010 | Sood et al. |
| 2010/0235494 | A1 | 9/2010 | Sood et al. |
| 2010/0235528 | A1 | 9/2010 | Bocharov et al. |
| 2010/0250532 | A1 | 9/2010 | Soroushian et al. |
| 2010/0259690 | A1 | 10/2010 | Wang et al. |
| 2010/0262712 | A1 | 10/2010 | Kim et al. |
| 2010/0278271 | A1 | 11/2010 | MacInnis |
| 2010/0284473 | A1 | 11/2010 | Suh et al. |
| 2010/0290761 | A1 | 11/2010 | Drake et al. |
| 2010/0299522 | A1 | 11/2010 | Khambete et al. |
| 2010/0306249 | A1 | 12/2010 | Hill et al. |
| 2010/0313225 | A1 | 12/2010 | Cholas et al. |
| 2010/0313226 | A1 | 12/2010 | Cholas et al. |
| 2010/0316126 | A1 | 12/2010 | Chen et al. |
| 2010/0319014 | A1 | 12/2010 | Lockett et al. |
| 2010/0319017 | A1 | 12/2010 | Cook |
| 2010/0332595 | A1 | 12/2010 | Fullagar et al. |
| 2011/0002381 | A1 | 1/2011 | Yang et al. |
| 2011/0010466 | A1 | 1/2011 | Fan et al. |
| 2011/0016225 | A1 | 1/2011 | Park et al. |
| 2011/0022432 | A1 | 1/2011 | Ishida et al. |
| 2011/0035507 | A1 | 2/2011 | Brueck et al. |
| 2011/0035517 | A1 | 2/2011 | Minnick et al. |
| 2011/0047209 | A1 | 2/2011 | Lindholm et al. |
| 2011/0055585 | A1 | 3/2011 | Lee |
| 2011/0058675 | A1 | 3/2011 | Brueck et al. |
| 2011/0060808 | A1 | 3/2011 | Martin et al. |
| 2011/0066673 | A1 | 3/2011 | Outlaw |
| 2011/0067057 | A1 | 3/2011 | Karaoguz et al. |
| 2011/0078440 | A1 | 3/2011 | Feng et al. |
| 2011/0080940 | A1 | 4/2011 | Bocharov |
| 2011/0082914 | A1 | 4/2011 | Robert et al. |
| 2011/0082924 | A1 | 4/2011 | Gopalakrishnan |
| 2011/0083009 | A1 | 4/2011 | Shamoon et al. |
| 2011/0096828 | A1 | 4/2011 | Chen et al. |
| 2011/0099594 | A1* | 4/2011 | Chen .................. H04N 21/8455 725/105 |
| 2011/0103374 | A1 | 5/2011 | Lajoie et al. |
| 2011/0107379 | A1 | 5/2011 | Lajoie et al. |
| 2011/0116772 | A1 | 5/2011 | Kwon et al. |
| 2011/0126104 | A1 | 5/2011 | Woods et al. |
| 2011/0126191 | A1 | 5/2011 | Hughes et al. |
| 2011/0129011 | A1 | 6/2011 | Cilli et al. |
| 2011/0135090 | A1 | 6/2011 | Chan et al. |
| 2011/0138018 | A1 | 6/2011 | Raveendran et al. |
| 2011/0142415 | A1 | 6/2011 | Rhyu |
| 2011/0145726 | A1 | 6/2011 | Wei et al. |
| 2011/0145858 | A1 | 6/2011 | Philpott et al. |

(56) References Cited

U.S. PATENT DOCUMENTS

2011/0149753 A1 6/2011 Bapst et al.
2011/0150100 A1 6/2011 Abadir
2011/0153785 A1 6/2011 Minborg et al.
2011/0153835 A1 6/2011 Rimac et al.
2011/0158470 A1 6/2011 Martin et al.
2011/0164679 A1* 7/2011 Satou .................... H04N 19/61 375/240.03
2011/0164686 A1* 7/2011 Lu ........................ H04N 21/631 375/E7.027
2011/0170408 A1* 7/2011 Furbeck .................. H04L 47/10 370/230
2011/0170687 A1 7/2011 Hyodo et al.
2011/0173345 A1 7/2011 Knox et al.
2011/0179185 A1 7/2011 Wang et al.
2011/0184738 A1 7/2011 Kalisky et al.
2011/0191439 A1 8/2011 Dazzi et al.
2011/0191803 A1 8/2011 Baldwin et al.
2011/0197237 A1 8/2011 Turner
2011/0197261 A1 8/2011 Dong et al.
2011/0197267 A1 8/2011 Gravel et al.
2011/0213827 A1 9/2011 Kaspar et al.
2011/0222786 A1 9/2011 Carmel et al.
2011/0225302 A1 9/2011 Park et al.
2011/0225315 A1 9/2011 Wexler et al.
2011/0225417 A1 9/2011 Maharajh et al.
2011/0238789 A1 9/2011 Luby et al.
2011/0239078 A1 9/2011 Luby et al.
2011/0246616 A1 10/2011 Ronca et al.
2011/0246657 A1 10/2011 Glow
2011/0246659 A1 10/2011 Bouazizi
2011/0246661 A1 10/2011 Manzari et al.
2011/0252118 A1 10/2011 Pantos et al.
2011/0255535 A1 10/2011 Tinsman
2011/0264530 A1 10/2011 Santangelo et al.
2011/0268178 A1 11/2011 Park et al.
2011/0276555 A1 11/2011 Fiero
2011/0276695 A1 11/2011 Maldaner et al.
2011/0280307 A1 11/2011 MacInnis et al.
2011/0283012 A1 11/2011 Melnyk
2011/0291723 A1 12/2011 Hashimoto
2011/0296048 A1 12/2011 Knox et al.
2011/0302319 A1 12/2011 Ha et al.
2011/0305273 A1 12/2011 He et al.
2011/0310982 A1 12/2011 Yang et al.
2011/0314130 A1 12/2011 Strasman
2011/0314176 A1 12/2011 Frojdh et al.
2011/0314500 A1 12/2011 Gordon
2012/0005312 A1 1/2012 Mcgowan et al.
2012/0005368 A1 1/2012 Knittle et al.
2012/0017282 A1 1/2012 Kang et al.
2012/0023155 A1 1/2012 Myers et al.
2012/0023251 A1 1/2012 Pyle et al.
2012/0036365 A1 2/2012 Kyslov et al.
2012/0036544 A1 2/2012 Chen et al.
2012/0042090 A1 2/2012 Chen et al.
2012/0047542 A1 2/2012 Lewis et al.
2012/0066360 A1 3/2012 Ghosh
2012/0072493 A1 3/2012 Muriello et al.
2012/0093214 A1 4/2012 Urbach
2012/0105279 A1 5/2012 Brown et al.
2012/0110120 A1 5/2012 Willig et al.
2012/0114302 A1 5/2012 Randall
2012/0124191 A1 5/2012 Lyon
2012/0134496 A1 5/2012 Farkash et al.
2012/0137336 A1 5/2012 Applegate et al.
2012/0144117 A1 6/2012 Weare et al.
2012/0144445 A1 6/2012 Bonta et al.
2012/0147958 A1 6/2012 Ronca et al.
2012/0166633 A1 6/2012 Baumback et al.
2012/0167132 A1 6/2012 Mathews et al.
2012/0170642 A1 7/2012 Braness et al.
2012/0170643 A1 7/2012 Soroushian et al.
2012/0170906 A1 7/2012 Soroushian et al.
2012/0170915 A1 7/2012 Braness et al.
2012/0173751 A1 7/2012 Braness et al.
2012/0177101 A1 7/2012 Van Der Schaar
2012/0179834 A1 7/2012 Van Der Schaar et al.
2012/0188069 A1 7/2012 Colombo et al.
2012/0189069 A1 7/2012 Iannuzzelli et al.
2012/0201475 A1 8/2012 Carmel et al.
2012/0201476 A1 8/2012 Carmel et al.
2012/0203766 A1 8/2012 Hörnkvist et al.
2012/0233345 A1 9/2012 Hannuksela
2012/0240176 A1 9/2012 Ma et al.
2012/0254455 A1 10/2012 Adimatyam et al.
2012/0257678 A1 10/2012 Zhou et al.
2012/0260277 A1 10/2012 Kosciewicz
2012/0263434 A1 10/2012 Wainner et al.
2012/0265562 A1 10/2012 Daouk et al.
2012/0269275 A1 10/2012 Hannuksela
2012/0278496 A1 11/2012 Hsu
2012/0281767 A1 11/2012 Duenas et al.
2012/0289147 A1 11/2012 Raleigh et al.
2012/0294355 A1 11/2012 Holcomb et al.
2012/0297039 A1 11/2012 Acuna et al.
2012/0307883 A1 12/2012 Graves
2012/0311094 A1 12/2012 Biderman et al.
2012/0311174 A1 12/2012 Bichot et al.
2012/0314778 A1 12/2012 Salustri et al.
2012/0316941 A1 12/2012 Moshfeghi
2012/0317235 A1 12/2012 Nguyen et al.
2012/0331167 A1 12/2012 Hunt
2013/0003868 A1 1/2013 Sjoberg et al.
2013/0007200 A1 1/2013 van der Schaar et al.
2013/0007223 A1 1/2013 Luby et al.
2013/0013730 A1 1/2013 Li et al.
2013/0013803 A1 1/2013 Bichot et al.
2013/0019107 A1 1/2013 Grab et al.
2013/0019257 A1 1/2013 Tschernutter et al.
2013/0019273 A1 1/2013 Ma et al.
2013/0028534 A1 1/2013 Tatsuka et al.
2013/0041808 A1 2/2013 Pham et al.
2013/0044821 A1 2/2013 Braness et al.
2013/0046849 A1 2/2013 Wolf
2013/0046902 A1 2/2013 Villegas Nuñez et al.
2013/0051554 A1 2/2013 Braness et al.
2013/0051767 A1 2/2013 Soroushian et al.
2013/0051768 A1 2/2013 Soroushian et al.
2013/0054958 A1 2/2013 Braness et al.
2013/0055084 A1 2/2013 Soroushian et al.
2013/0058393 A1 3/2013 Soroushian
2013/0058480 A1 3/2013 Ziskind et al.
2013/0061040 A1 3/2013 Kiefer et al.
2013/0061045 A1 3/2013 Kiefer et al.
2013/0064466 A1 3/2013 Carmel et al.
2013/0066838 A1 3/2013 Singla et al.
2013/0080267 A1 3/2013 McGowan
2013/0091249 A1 4/2013 McHugh et al.
2013/0094565 A1 4/2013 Yang et al.
2013/0095855 A1 4/2013 Bort
2013/0097172 A1 4/2013 McIntosh
2013/0097309 A1 4/2013 Ma et al.
2013/0114944 A1 5/2013 Soroushian et al.
2013/0124859 A1 5/2013 Pestoni et al.
2013/0128962 A1 5/2013 Rajagopalan et al.
2013/0128970 A1 5/2013 Yu et al.
2013/0146658 A1 6/2013 Guerra
2013/0152767 A1 6/2013 Katz et al.
2013/0159633 A1 6/2013 Lilly
2013/0166580 A1 6/2013 Maharajh
2013/0166765 A1 6/2013 Kaufman
2013/0166906 A1 6/2013 Swaminathan et al.
2013/0169863 A1 7/2013 Smith
2013/0170561 A1 7/2013 Hannuksela
2013/0170764 A1 7/2013 Carmel et al.
2013/0173513 A1 7/2013 Chu et al.
2013/0179199 A1 7/2013 Ziskind et al.
2013/0179589 A1 7/2013 Mccarthy et al.
2013/0179992 A1 7/2013 Ziskind et al.
2013/0182952 A1 7/2013 Carmel et al.
2013/0191754 A1 7/2013 Rose
2013/0196292 A1 8/2013 Brennen et al.
2013/0212228 A1 8/2013 Butler et al.
2013/0223812 A1 8/2013 Rossi

(56) References Cited

U.S. PATENT DOCUMENTS

| | | | |
|---|---|---|---|
| 2013/0226578 | A1 | 8/2013 | Bolton et al. |
| 2013/0226635 | A1 | 8/2013 | Fisher |
| 2013/0227081 | A1 | 8/2013 | Luby et al. |
| 2013/0227111 | A1 | 8/2013 | Wright et al. |
| 2013/0227122 | A1 | 8/2013 | Gao et al. |
| 2013/0279810 | A1 | 10/2013 | Li et al. |
| 2013/0297602 | A1 | 11/2013 | Soroushian et al. |
| 2013/0301424 | A1 | 11/2013 | Kotecha et al. |
| 2013/0311670 | A1 | 11/2013 | Tarbox et al. |
| 2013/0329781 | A1 | 12/2013 | Su et al. |
| 2014/0003501 | A1 | 1/2014 | Soroushian et al. |
| 2014/0003516 | A1 | 1/2014 | Soroushian |
| 2014/0003523 | A1 | 1/2014 | Soroushian et al. |
| 2014/0019592 | A1 | 1/2014 | Arana et al. |
| 2014/0019593 | A1 | 1/2014 | Reznik et al. |
| 2014/0037620 | A1 | 2/2014 | Ferree et al. |
| 2014/0052823 | A1 | 2/2014 | Gavade et al. |
| 2014/0059156 | A1 | 2/2014 | Freeman, II et al. |
| 2014/0059243 | A1 | 2/2014 | Reisner |
| 2014/0096171 | A1 | 4/2014 | Shivadas et al. |
| 2014/0096269 | A1 | 4/2014 | Amidei et al. |
| 2014/0101722 | A1 | 4/2014 | Moore |
| 2014/0114951 | A1 | 4/2014 | Sasaki et al. |
| 2014/0115650 | A1 | 4/2014 | Zhang et al. |
| 2014/0119432 | A1 | 5/2014 | Wang et al. |
| 2014/0140253 | A1 | 5/2014 | Lohmar et al. |
| 2014/0140396 | A1 | 5/2014 | Wang et al. |
| 2014/0140417 | A1 | 5/2014 | Shaffer et al. |
| 2014/0143301 | A1 | 5/2014 | Watson et al. |
| 2014/0143431 | A1 | 5/2014 | Watson et al. |
| 2014/0143440 | A1 | 5/2014 | Ramamurthy et al. |
| 2014/0149557 | A1 | 5/2014 | Lohmar et al. |
| 2014/0177734 | A1 | 6/2014 | Carmel et al. |
| 2014/0189065 | A1 | 7/2014 | Van der Schaar et al. |
| 2014/0201382 | A1 | 7/2014 | Shivadas et al. |
| 2014/0211840 | A1 | 7/2014 | Butt et al. |
| 2014/0211859 | A1 | 7/2014 | Carmel et al. |
| 2014/0241420 | A1 | 8/2014 | Orton-jay et al. |
| 2014/0241421 | A1 | 8/2014 | Orton-Jay et al. |
| 2014/0247869 | A1 | 9/2014 | Su et al. |
| 2014/0250473 | A1 | 9/2014 | Braness et al. |
| 2014/0258714 | A1 | 9/2014 | Grab |
| 2014/0269927 | A1 | 9/2014 | Naletov et al. |
| 2014/0269936 | A1 | 9/2014 | Shivadas et al. |
| 2014/0280763 | A1 | 9/2014 | Grab et al. |
| 2014/0297804 | A1 | 10/2014 | Shivadas et al. |
| 2014/0297881 | A1 | 10/2014 | Shivadas et al. |
| 2014/0355668 | A1 | 12/2014 | Shoham et al. |
| 2014/0355958 | A1 | 12/2014 | Soroushian et al. |
| 2014/0359678 | A1 | 12/2014 | Shivadas et al. |
| 2014/0359679 | A1 | 12/2014 | Shivadas et al. |
| 2014/0359680 | A1 | 12/2014 | Shivadas et al. |
| 2014/0376720 | A1 | 12/2014 | Chan et al. |
| 2015/0006662 | A1 | 1/2015 | Braness |
| 2015/0019550 | A1 | 1/2015 | Maharajh et al. |
| 2015/0026677 | A1 | 1/2015 | Stevens et al. |
| 2015/0036758 | A1 | 2/2015 | Sato |
| 2015/0043554 | A1 | 2/2015 | Meylan et al. |
| 2015/0049957 | A1 | 2/2015 | Shoham et al. |
| 2015/0063693 | A1 | 3/2015 | Carmel et al. |
| 2015/0067715 | A1 | 3/2015 | Koat et al. |
| 2015/0104153 | A1 | 4/2015 | Braness et al. |
| 2015/0117836 | A1 | 4/2015 | Amidei et al. |
| 2015/0117837 | A1 | 4/2015 | Amidei et al. |
| 2015/0139419 | A1 | 5/2015 | Kiefer et al. |
| 2015/0188758 | A1 | 7/2015 | Amidei et al. |
| 2015/0188842 | A1 | 7/2015 | Amidei et al. |
| 2015/0188921 | A1 | 7/2015 | Amidei et al. |
| 2015/0189017 | A1 | 7/2015 | Amidei et al. |
| 2015/0189373 | A1 | 7/2015 | Amidei et al. |
| 2015/0229695 | A1 | 8/2015 | Kim et al. |
| 2015/0281310 | A1 | 10/2015 | Ziskind et al. |
| 2015/0288530 | A1 | 10/2015 | Oyman |
| 2015/0288996 | A1 | 10/2015 | Van Der Schaar et al. |
| 2015/0334435 | A1 | 11/2015 | Shivadas et al. |
| 2015/0373421 | A1 | 12/2015 | Chan et al. |
| 2016/0048593 | A1 | 2/2016 | Soroushian et al. |
| 2016/0070890 | A1 | 3/2016 | Grab et al. |
| 2016/0073176 | A1 | 3/2016 | Phillips et al. |
| 2016/0112382 | A1 | 4/2016 | Kiefer et al. |
| 2016/0127440 | A1 | 5/2016 | Gordon |
| 2016/0134881 | A1 | 5/2016 | Wang et al. |
| 2016/0149981 | A1 | 5/2016 | Shivadas et al. |
| 2016/0219303 | A1 | 7/2016 | Braness et al. |
| 2016/0323342 | A1 | 11/2016 | Luby et al. |
| 2017/0011055 | A1 | 1/2017 | Pitts |
| 2017/0026445 | A1 | 1/2017 | Soroushian et al. |
| 2017/0041372 | A1 | 2/2017 | Hosur |
| 2017/0041604 | A1 | 2/2017 | Soroushian et al. |
| 2017/0083474 | A1 | 3/2017 | Meswani et al. |
| 2017/0214947 | A1 | 7/2017 | Kiefer et al. |
| 2017/0223389 | A1 | 8/2017 | Soroushian et al. |
| 2017/0238030 | A1 | 8/2017 | Ziskind et al. |
| 2017/0280203 | A1 | 9/2017 | Chan et al. |
| 2017/0366833 | A1 | 12/2017 | Amidei et al. |
| 2018/0007451 | A1 | 1/2018 | Shivadas et al. |
| 2018/0027244 | A1 | 1/2018 | Chen et al. |
| 2018/0046949 | A1 | 2/2018 | Kahn et al. |
| 2018/0060543 | A1 | 3/2018 | Grab et al. |
| 2018/0081548 | A1 | 3/2018 | Barzik et al. |
| 2018/0131980 | A1 | 5/2018 | Van Der Schaar et al. |
| 2018/0137208 | A1 | 5/2018 | Ricker et al. |
| 2018/0220153 | A1 | 8/2018 | Braness et al. |
| 2018/0242015 | A1 | 8/2018 | Katsavounidis |
| 2018/0255366 | A1 | 9/2018 | Lockett et al. |
| 2018/0262757 | A1 | 9/2018 | Naletov et al. |
| 2018/0278975 | A1 | 9/2018 | Soroushian |
| 2018/0285261 | A1 | 10/2018 | Mandal et al. |
| 2018/0332094 | A1 | 11/2018 | Braness |
| 2019/0020907 | A1 | 1/2019 | Kiefer et al. |
| 2019/0020928 | A1 | 1/2019 | Chan et al. |
| 2019/0045219 | A1 | 2/2019 | Braness et al. |
| 2019/0045220 | A1 | 2/2019 | Braness et al. |
| 2019/0045234 | A1 | 2/2019 | Kiefer et al. |
| 2019/0082182 | A1 | 3/2019 | Naser et al. |
| 2019/0146951 | A1 | 5/2019 | Velmurugan et al. |
| 2019/0158553 | A1 | 5/2019 | Van Der Schaar et al. |
| 2019/0166410 | A1 | 5/2019 | Kirk et al. |
| 2019/0182524 | A1 | 6/2019 | Amidei et al. |
| 2019/0268596 | A1 | 8/2019 | Naletov et al. |
| 2019/0297364 | A1 | 9/2019 | Van der Schaar et al. |
| 2019/0342587 | A1 | 11/2019 | Kiefer et al. |
| 2019/0356928 | A1 | 11/2019 | Braness et al. |
| 2020/0059706 | A1 | 2/2020 | Shivadas et al. |
| 2020/0186854 | A1 | 6/2020 | Soroushian |
| 2020/0204834 | A1 | 6/2020 | Loheide et al. |
| 2020/0221152 | A1 | 7/2020 | Amidei et al. |
| 2020/0236376 | A1 | 7/2020 | Li et al. |
| 2020/0252689 | A1 | 8/2020 | Crowe |
| 2020/0322691 | A1 | 10/2020 | Hui |
| 2020/0396451 | A1 | 12/2020 | Soroushian et al. |
| 2020/0396454 | A1 | 12/2020 | Naletov et al. |
| 2021/0021662 | A1 | 1/2021 | Soroushian et al. |
| 2021/0076082 | A1 | 3/2021 | Kiefer et al. |
| 2021/0099504 | A1 | 4/2021 | Van Der Schaar et al. |
| 2021/0136429 | A1 | 5/2021 | Van Der Schaar et al. |
| 2021/0250608 | A1 | 8/2021 | Braness et al. |
| 2021/0250627 | A1 | 8/2021 | Soroushian |

FOREIGN PATENT DOCUMENTS

| | | | |
|---|---|---|---|
| CA | 2237293 | A1 | 7/1997 |
| CA | 2749170 | A1 | 7/2010 |
| CA | 2749170 | C | 6/2016 |
| CA | 2823829 | C | 1/2019 |
| CN | 1169229 | | 12/1997 |
| CN | 1221284 | A | 6/1999 |
| CN | 1235473 | A | 11/1999 |
| CN | 1629939 | A | 6/2005 |
| CN | 1662952 | A | 8/2005 |
| CN | 1684518 | A | 10/2005 |
| CN | 1723696 | | 1/2006 |
| CN | 1756359 | A | 4/2006 |
| CN | 1787422 | A | 6/2006 |

(56) References Cited

FOREIGN PATENT DOCUMENTS

| | | | |
|---|---|---|---|
| CN | 101252401 | A | 8/2008 |
| CN | 101461149 | A | 6/2009 |
| CN | 102138327 | A | 7/2011 |
| CN | 102549557 | A | 7/2012 |
| CN | 103858419 | A | 6/2014 |
| CN | 103875248 | A | 6/2014 |
| CN | 102549557 | B | 9/2015 |
| CN | 105072454 | A | 11/2015 |
| CN | 105359511 | A | 2/2016 |
| CN | 103875248 | B | 9/2018 |
| CN | 108989847 | A | 12/2018 |
| CN | 109314784 | A | 2/2019 |
| CN | 105072454 | B | 4/2019 |
| CN | 108989847 | B | 3/2021 |
| EP | 757484 | A2 | 2/1997 |
| EP | 813167 | A2 | 12/1997 |
| EP | 0818111 | A1 | 1/1998 |
| EP | 0936812 | A1 | 8/1999 |
| EP | 0818111 | B1 | 1/2000 |
| EP | 1056273 | A2 | 11/2000 |
| EP | 1158799 | A1 | 11/2001 |
| EP | 1187483 | A2 | 3/2002 |
| EP | 1335603 | A2 | 8/2003 |
| EP | 1420580 | A1 | 5/2004 |
| EP | 1453319 | A1 | 9/2004 |
| EP | 1536646 | A1 | 6/2005 |
| EP | 1553779 | A1 | 7/2005 |
| EP | 1657835 | A1 | 5/2006 |
| EP | 1283640 | B1 | 10/2006 |
| EP | 1718074 | A1 | 11/2006 |
| EP | 2180664 | A1 | 4/2010 |
| EP | 2360923 | A1 | 8/2011 |
| EP | 2384475 | A1 | 11/2011 |
| EP | 2486517 | A1 | 8/2012 |
| EP | 2486727 | A1 | 8/2012 |
| EP | 2507995 | A1 | 10/2012 |
| EP | 2564354 | A1 | 3/2013 |
| EP | 2616991 | | 7/2013 |
| EP | 2617192 | | 7/2013 |
| EP | 2661696 | A1 | 11/2013 |
| EP | 2661875 | A1 | 11/2013 |
| EP | 2661895 | A2 | 11/2013 |
| EP | 2486727 | A4 | 3/2014 |
| EP | 2564354 | A4 | 3/2014 |
| EP | 2616991 | A4 | 3/2014 |
| EP | 2617192 | A4 | 3/2014 |
| EP | 2716048 | A1 | 4/2014 |
| EP | 2721826 | A1 | 4/2014 |
| EP | 2486517 | | 6/2014 |
| EP | 2751990 | | 7/2014 |
| EP | 2807821 | | 12/2014 |
| EP | 2751990 | A4 | 4/2015 |
| EP | 2962461 | A1 | 1/2016 |
| EP | 3005689 | A1 | 4/2016 |
| EP | 3473005 | A1 | 4/2019 |
| EP | 2661875 | B1 | 11/2019 |
| EP | 2661696 | B1 | 5/2020 |
| EP | 3697096 | A1 | 8/2020 |
| EP | 3700219 | A1 | 8/2020 |
| EP | 3742740 | A1 | 11/2020 |
| EP | 3697096 | B1 | 1/2022 |
| EP | 3975574 | A1 | 3/2022 |
| EP | 3742740 | B1 | 5/2022 |
| FR | 2360923 | | 8/2011 |
| GB | 2398210 | A | 8/2004 |
| HK | 1125765 | A | 8/2009 |
| HK | 1195183 | B | 2/2018 |
| HK | 1260329 | A | 12/2019 |
| HK | 1263223 | A | 1/2020 |
| HK | 1260329 | B | 11/2021 |
| JP | 08046902 | A | 2/1996 |
| JP | 08111842 | A | 4/1996 |
| JP | 08163488 | A | 6/1996 |
| JP | 08287613 | A | 11/1996 |
| JP | 09037225 | A | 2/1997 |
| JP | H1175178 | A | 3/1999 |
| JP | 11164307 | A | 6/1999 |
| JP | 11275576 | A | 10/1999 |
| JP | 11328929 | A | 11/1999 |
| JP | 2000201343 | A | 7/2000 |
| JP | 02001043668 | A | 2/2001 |
| JP | 2001209726 | A | 8/2001 |
| JP | 2001346165 | A | 12/2001 |
| JP | 2002164880 | A | 6/2002 |
| JP | 2002170363 | A | 6/2002 |
| JP | 2002518898 | A | 6/2002 |
| JP | 2002218384 | A | 8/2002 |
| JP | 2003179597 | A | 6/2003 |
| JP | 2003250113 | A | 9/2003 |
| JP | 2004013823 | A | 1/2004 |
| JP | 2004515941 | A | 5/2004 |
| JP | 2004172830 | A | 6/2004 |
| JP | 2004187161 | A | 7/2004 |
| JP | 2004234128 | A | 8/2004 |
| JP | 2004304767 | A | 10/2004 |
| JP | 2004320707 | A | 11/2004 |
| JP | 2004328218 | A | 11/2004 |
| JP | 2005027153 | | 1/2005 |
| JP | 2005504480 | A | 2/2005 |
| JP | 2005080204 | A | 3/2005 |
| JP | 2005173241 | A | 6/2005 |
| JP | 2005284041 | A | 10/2005 |
| JP | 2005286881 | A | 10/2005 |
| JP | 2006155500 | A | 6/2006 |
| JP | 2006521035 | A | 9/2006 |
| JP | 2006524007 | A | 10/2006 |
| JP | 2007036666 | A | 2/2007 |
| JP | 2007174375 | A | 7/2007 |
| JP | 2007235690 | A | 9/2007 |
| JP | 2007535881 | A | 12/2007 |
| JP | 2008235999 | A | 10/2008 |
| JP | 2009508452 | A | 2/2009 |
| JP | 2009522887 | A | 6/2009 |
| JP | 2009530917 | A | 8/2009 |
| JP | 4516082 | B2 | 5/2010 |
| JP | 2010262255 | A | 11/2010 |
| JP | 2011029962 | A | 2/2011 |
| JP | 2012514951 | A | 6/2012 |
| JP | 2013026724 | A | 2/2013 |
| JP | 2013513298 | A | 4/2013 |
| JP | 5200204 | B2 | 6/2013 |
| JP | 2014506430 | A | 3/2014 |
| JP | 5681641 | | 1/2015 |
| JP | 5723888 | B2 | 5/2015 |
| JP | 2015167357 | A | 9/2015 |
| JP | 20165043 | A | 1/2016 |
| JP | 2016526336 | A | 9/2016 |
| JP | 6038805 | B2 | 12/2016 |
| JP | 6078574 | B2 | 2/2017 |
| JP | 2017063453 | | 3/2017 |
| JP | 2018160923 | A | 10/2018 |
| JP | 6453291 | B2 | 1/2019 |
| JP | 2019-526188 | A | 9/2019 |
| JP | 6657313 | B2 | 2/2020 |
| JP | 202080551 | A | 5/2020 |
| JP | 2021158694 | A | 10/2021 |
| JP | 7000475 | B2 | 12/2021 |
| KR | 100221423 | B1 | 9/1999 |
| KR | 2002013664 | | 2/2002 |
| KR | 1020020064888 | A | 8/2002 |
| KR | 20040039852 | A | 5/2004 |
| KR | 20060030164 | A | 4/2006 |
| KR | 20060106250 | A | 10/2006 |
| KR | 20060116967 | A | 11/2006 |
| KR | 100669616 | B1 | 1/2007 |
| KR | 20070005699 | A | 1/2007 |
| KR | 20070020727 | A | 2/2007 |
| KR | 20090016282 | A | 2/2009 |
| KR | 20100106418 | A | 10/2010 |
| KR | 20110051104 | A | 5/2011 |
| KR | 20110133024 | A | 12/2011 |
| KR | 20130133830 | | 12/2013 |
| KR | 20140056317 | A | 5/2014 |
| KR | 20160021141 | A | 2/2016 |

(56) References Cited

FOREIGN PATENT DOCUMENTS

| | | | |
|---|---|---|---|
| KR | 101635876 | B1 | 7/2016 |
| KR | 101823321 | B1 | 1/2018 |
| KR | 101874907 | B1 | 7/2018 |
| KR | 101917763 | B1 | 11/2018 |
| KR | 101928910 | B1 | 12/2018 |
| KR | 10-1936142 | B1 | 1/2019 |
| KR | 10-1981923 | B1 | 5/2019 |
| KR | 10-1988877 | B1 | 6/2019 |
| KR | 10-2020764 | B1 | 9/2019 |
| KR | 10-2072839 | | 1/2020 |
| KR | 10-2074148 | B1 | 1/2020 |
| KR | 10-2086995 | B1 | 3/2020 |
| KR | 10-2122189 | B1 | 6/2020 |
| KR | 10-2140339 | B1 | 7/2020 |
| KR | 10-2163151 | B1 | 9/2020 |
| KR | 10-2187792 | B1 | 12/2020 |
| KR | 10-2190364 | B1 | 12/2020 |
| KR | 10-2195414 | B1 | 12/2020 |
| KR | 102191317 | B1 | 12/2020 |
| KR | 10-2241867 | B1 | 4/2021 |
| KR | 10-2274290 | B1 | 7/2021 |
| KR | 10-2352043 | B1 | 1/2022 |
| KR | 10-2363764 | B1 | 2/2022 |
| KR | 10-2408120 | B1 | 6/2022 |
| KR | 10-2414735 | B1 | 6/2022 |
| KR | 102445689 | B1 | 9/2022 |
| MX | 2011007344 | A | 2/2012 |
| MX | 316584 | B | 12/2013 |
| RU | 2328040 | C2 | 6/2008 |
| SG | 146026 | | 12/2010 |
| WO | 1995015660 | A1 | 6/1995 |
| WO | 1996013121 | | 5/1996 |
| WO | 199800973 | A1 | 1/1998 |
| WO | 1997031445 | A3 | 4/1998 |
| WO | 199834405 | A1 | 8/1998 |
| WO | 1998047290 | | 10/1998 |
| WO | 1999010836 | A1 | 3/1999 |
| WO | 1999065239 | A2 | 12/1999 |
| WO | 2000049762 | A2 | 8/2000 |
| WO | 2000049763 | A1 | 8/2000 |
| WO | 0104892 | A1 | 1/2001 |
| WO | 2001031497 | A1 | 5/2001 |
| WO | 2001050732 | A2 | 7/2001 |
| WO | 2001065762 | A2 | 9/2001 |
| WO | 2002001880 | A1 | 1/2002 |
| WO | 2002008948 | A2 | 1/2002 |
| WO | 200223315 | A2 | 3/2002 |
| WO | 2003028293 | | 4/2002 |
| WO | 2002035832 | A2 | 5/2002 |
| WO | 2002037210 | A2 | 5/2002 |
| WO | 2002054196 | A2 | 7/2002 |
| WO | 2002054776 | | 7/2002 |
| WO | 2002073437 | A1 | 9/2002 |
| WO | 2002087241 | A1 | 10/2002 |
| WO | 2003030000 | A1 | 4/2003 |
| WO | 2003046750 | A1 | 6/2003 |
| WO | 2003047262 | A2 | 6/2003 |
| WO | 2003061173 | A2 | 7/2003 |
| WO | 2003096136 | A2 | 11/2003 |
| WO | 2004012378 | A2 | 2/2004 |
| WO | 2004054247 | A1 | 6/2004 |
| WO | 2004097811 | A1 | 11/2004 |
| WO | 2004100158 | A1 | 11/2004 |
| WO | 2004102571 | A1 | 11/2004 |
| WO | 2005008385 | A2 | 1/2005 |
| WO | 2005015935 | A1 | 2/2005 |
| WO | 2005050373 | A2 | 6/2005 |
| WO | 2005057906 | A2 | 6/2005 |
| WO | 2005109224 | A2 | 11/2005 |
| WO | 2005125214 | A2 | 12/2005 |
| WO | 2006018843 | A2 | 2/2006 |
| WO | 20060012398 | A2 | 2/2006 |
| WO | 2006018843 | A3 | 12/2006 |
| WO | 2007044590 | A2 | 4/2007 |
| WO | 2007072257 | A1 | 6/2007 |
| WO | 2007073347 | A1 | 6/2007 |
| WO | 2007093923 | A1 | 8/2007 |
| WO | 2007101182 | A2 | 9/2007 |
| WO | 2007113836 | A2 | 10/2007 |
| WO | 2008010275 | A1 | 1/2008 |
| WO | 2008032908 | A1 | 3/2008 |
| WO | 2008042242 | A2 | 4/2008 |
| WO | 2008086313 | A1 | 7/2008 |
| WO | 2008090859 | A1 | 7/2008 |
| WO | 2007113836 | A3 | 11/2008 |
| WO | 2008135932 | A2 | 11/2008 |
| WO | 2007113836 | B1 | 12/2008 |
| WO | 2009006302 | A1 | 1/2009 |
| WO | 2009065137 | A1 | 5/2009 |
| WO | 2009070770 | A1 | 6/2009 |
| WO | 2009109976 | A2 | 9/2009 |
| WO | 2010005673 | | 1/2010 |
| WO | 2010060106 | A1 | 5/2010 |
| WO | 2010080911 | A1 | 7/2010 |
| WO | 2010089962 | A1 | 8/2010 |
| WO | 2010108053 | A1 | 9/2010 |
| WO | 2010111261 | A1 | 9/2010 |
| WO | 2010122447 | A1 | 10/2010 |
| WO | 2010147878 | A1 | 12/2010 |
| WO | 2010150470 | A1 | 12/2010 |
| WO | 2011042898 | A1 | 4/2011 |
| WO | 2011042900 | A1 | 4/2011 |
| WO | 2011053658 | A1 | 5/2011 |
| WO | 2011059291 | A2 | 5/2011 |
| WO | 2011068668 | A1 | 6/2011 |
| WO | 2011086190 | A1 | 7/2011 |
| WO | 2011087449 | A1 | 7/2011 |
| WO | 2011093835 | A1 | 8/2011 |
| WO | 2011101371 | A1 | 8/2011 |
| WO | 2011102791 | A1 | 8/2011 |
| WO | 2011103364 | A1 | 8/2011 |
| WO | 2011132184 | A1 | 10/2011 |
| WO | 2011135558 | A1 | 11/2011 |
| WO | 2012035533 | A2 | 3/2012 |
| WO | 2012035534 | A2 | 3/2012 |
| WO | 2012035534 | A3 | 7/2012 |
| WO | 2012094171 | A1 | 7/2012 |
| WO | 20120094181 | A2 | 7/2012 |
| WO | 20120094189 | A1 | 7/2012 |
| WO | 2012035533 | A3 | 8/2012 |
| WO | 2012162806 | A1 | 12/2012 |
| WO | 2012171113 | A1 | 12/2012 |
| WO | 2013030833 | A1 | 3/2013 |
| WO | 2013032518 | A2 | 3/2013 |
| WO | 2013033334 | A1 | 3/2013 |
| WO | 2013033335 | A1 | 3/2013 |
| WO | 2013033458 | A2 | 3/2013 |
| WO | 2013033458 | A3 | 5/2013 |
| WO | 2013103986 | A2 | 7/2013 |
| WO | 2013111126 | A2 | 8/2013 |
| WO | 2013032518 | A3 | 9/2013 |
| WO | 2013144942 | A1 | 10/2013 |
| WO | 2014145901 | A1 | 9/2014 |
| WO | 2014190308 | A1 | 11/2014 |
| WO | 2014193996 | A2 | 12/2014 |
| WO | 2014193996 | A3 | 2/2015 |
| WO | 2015031982 | A1 | 3/2015 |
| WO | 2013111126 | A3 | 6/2015 |
| WO | 2017218095 | A1 | 12/2017 |

OTHER PUBLICATIONS

Eskicioglu et al., "An Integrated Approach to Encrypting Scalable Video", Proceedings IEEE International Conference on Multimedia and Expo, Aug. 26-29, 2002, Lausanne, Switzerland, 4 pgs.

Etsi, "Digital Video Broadcasting (DVB) Support for use of scrambling and Conditional Access (CA) within digital broadcasting systems", Oct. 1996, 13 pgs.

Etsi, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.

(56) References Cited

OTHER PUBLICATIONS

Fahmi et al., "Proxy Servers for Scalable Interactive Video Support", Computer, Sep. 2001, vol. 45, No. 9, pp. 54-60, https://doi.org/10.1109/2.947092.
Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI:10.1109/49.957315.
Garg et al., "An Experimental Study of Throughput for UDP and VoIP Traffic in IEEE 802.11b Networks", Wireless Communications and Networkings, Mar. 2003, pp. 1748-1753.
Gast, "When is 54 Not Equal to 54? A Look at 802.11a, b and g Throughput", Aug. 8, 2003, printed Oct. 30, 2008 from www.oreillynet.com/pub/a/wireless/2003/08/08/wireless_throughput.html, 4 pgs.
Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.
Ho, "Digital Video Broadcasting Conditional Access Architecture", Report prepared for CS265-Section 2, Fall 2002, Prof Stamp, 7 pgs.
Hunt, "Encoding for streaming", The Netflix Blog, Nov. 6, 2008, printed from https://web.archive.org/web/20081216044437/http:/blog.netflix.com/2008/11/encoding-for-streaming.htm., retrieved on Feb. 8, 2022, 28 pgs.
Hurtado Guzman, "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.
INCITS/ISO/IEC, "Information Technology—Generic Coding of Moving Pictures and Associated Audio Information: Video (Formerly ANSI/ISO/IEC 13818-Feb. 2000)", Second edition, Dec. 15, 2000, 220 pgs., (presented in two parts).
ISMA, "ISMA Encryption and Authentication, Version 1.1, AREA / Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to Itu-T J.89, Itu-T Recommendation J.96, Mar. 2001, 34 pgs.
Kabir, "Scalable and Interactive Multimedia Streaming Over the Internet", Thesis, 2005, 207 pgs.
Kaspar et al., "Using HTTP Pipelining to Improve Progressive Download over Multiple Heterogeneous Interfaces", IEEE ICC proceedings, 2010, 5 pgs.
Kim, "MPEG-2 ES/PES/TS/PSI", Kyung-Hee University, Oct. 4, 2010, 66 pages.
Kozintsev et al., "Improving last-hop multicast streaming video over 802.11", Workshop on Broadband Wireless Multimedia, Oct. 2004, pp. 1-10.
Krikor et al., "Image Encryption Using DCT and Stream Cipher", European Journal of Scientific Research, Jan. 2009, vol. 32, No. 1, pp. 48-58.
Lew et al., "Content-Based Multimedia Information Retrieval: State of the Art and Challenges", ACM Transactions on Multimedia Computing, Communications and Applications, Feb. 2006, vol. 2, No. 1, pp. 1-19.
Li et al., "Content-Aware Playout and Packet Scheduling for Video Streaming Over Wireless Links", IEEE Transactions on Multimedia, vol. 10, No. 5, Aug. 2008, pp. 885-895.
Lian et al., "Efficient video encryption scheme based on advanced video coding", Multimed. Tools Appl. vol. 38, 2008, pp. 75-89.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.
Lievaart, "Characteristics that differentiate CA Systems", Irdeto access, Nov. 2001, 5 pgs.
Lin et al., "Multipass Encoding for Reducing Pulsing Artifacts in Cloud Based Video Transcoding", IEEE International Conference on Image Processing (ICIP), Date of Conference Sep. 27, 30, 2015, Quebec City, QC, Canada, pp. 907-911.
Liu et al., "A Formal Framework for Component Deployment", OOPSLA 2006, Proceedings of the 21st Annual Acm Sigplan Conference on Object-Oriented Programming Systems, Language, and Applications, Portland, Oregon, Oct. 22-26, 2006, pp. 325-344.
Lloyd, "Supporting Trick Mode Playback Universally Across the Digital Television Industry", Thesis, 2005, 111 pgs.
Lomas et al., "Educause Learning Initiative, Collaboration Tools", Educause Learning Initiative, Aug. 2008, ELI Paper 2: 2008, 11 pgs.
MacAulay et al., "Whitepaper—IP Streaming of MPEG-4: Native RTP vs MPEG-2 Transport Stream", Envivio, Oct. 2005, 12 pgs.
Martin et al., "Privacy Protected Surveillance Using Secure Visual Object Coding", IEEE Transactions on Circuits and Systems for Video Technology, Aug. 2008, vol. 18, No. 8, pp. 1152-1162, DOI: 10.1109/TCSVT.2008.927110.
Matroska, "Diagram", Matroska, Technical/Info, Diagram, 2016, retrieved from https://www.matroska.org/technical/diagram/index.html on Jul. 20, 2017, 9 pages.
Matroska, "Specifications", Matroska, Technical/Info, Specifications, Jun. 25, 2017, retrieved from https://www.matroska.org/technical/specs/index.html on Jul. 20, 2017, 20 pages.
Meyer et al., "Security mechanisms for Multimedia-Data with the Example MPEG-I-Video", SECMPEG, 1992, 10 pgs.
Miras, "On Quality Aware Adaptation of Internet Video", University of London, PhD dissertation, May 2004, 181 pgs.
Molavi et al., "A Security Study of Digital TV Distribution Systems", Thesis, Jun. 2005, 112 pgs.
Montes, "Muusic: mashup de servicios web musicales", Ingenieria Tecnica en Informatica de Gestion, Nov. 2008, 87 pgs.
Moscoso, "Interactive Internet TV Architecture Based on Scalable Video Coding", Instituto Superior Techico, Universidad Technica de Lisboa, May 2011, 103 pgs.
Nelson, "The Data Compression Book", M&T Publishing, 1992, 533 pgs., (presented in two parts).
Nelson, "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
OIPF Open Forum, "OIPF Release 1 Specification, vol. 3, Content Metadata", OIPF, Oct. 8, 2009, vol. 1.1, 47 pgs.
OIPF Open Forum, "OIPF Release 1 Specification, vol. 7—Authentication, Content Protection and Service Protection", OIPF, Oct. 8, 2009, vol. 1.1, 88 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html.
Open IPTV Forum, "Functional Architecture", Jan. 16, 2008, vol. 1.1, 141 pgs.
Open IPTV Forum, "OIPF Release 1 Specification, vol. 1—Overview", OIPF, Oct. 8, 2009, vol. 1.1, 48 pgs.
Open IPTV Forum, "OIPF Release 1 Specification, vol. 2, Media Formats", OIPF, Oct. 8, 2009, vol. 1.1, 22 pgs.
Oyman et al, "Quality of Experience for HTTP Adaptive Streaming Services", IEEE Communications Magazine, Apr. 2012, vol. 50, No. 4, pp. 20-27, Doi: 10.1109/MCOM.2012.6178830.
Padiadpu, "Towards Mobile Learning: A Scorm Player for the Google Android Platform", Master Thesis, Hamburg University of Applied Sciences, 2008, 66 pgs.
Pantos, "HTTP Live Streaming: draft-pantos-http-live-streaming-06", Published by the Internet Engineering Task Force (IETF), Mar. 31, 2011, 24 pages.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Park et al., "An Efficient Encryption and Key Management Scheme for Layered Access Control of H.265/Scalable Video Coding",

(56) References Cited

OTHER PUBLICATIONS

IEICI Trans. Inf. & Syst., May 2009, vol. E92-D, No. 5, pp. 851-858, DOI: 1031587/transinf.E92.D.851.
Park et al., "Combined Scheme of Encryption and Watermarking in H.264/Scalable Video Coding", New Directions in Intelligent Interactive Multimedia, SCI 142, 2008, pp. 351-361.
Peek, "Consumer Distributed File Systems", Dissertation, Doctor of Philosophy, Computer Science and Engineering, The University of Michigan, 2009, 118 pgs.
Pereira, "Security on Over the Top TV Services", Thesis, Nov. 2011, 114 pgs.
Qiao et al., "Comparison of MPEG Encryption Algorithms", Comput. & Graphics, 1998, vol. 22, No. 4, pp. 437-448.
Raju et al., "Fast and Secure Real-Time Video Encryption", Sixth Indian Conference on Computer Vision, Graphics & Image Processing, Jan. 2009, pp. 257-264, doi:10.1109/ACVGIP.2008.100.
Rosenberg et al., "Indicating User Agent Capabilities in the Session Initiation Protocol (SIP)", Network Working Group, RFC 3840, Aug. 2004, 36 pgs.
Schulzrinne, "Real Time Streaming Protocol 2.0 (RTSP): draft-ietfmmusic-rfc2326bis-27", MMUSIC Working Group of the Internet Engineering Task Force (IETF), 296 pgs. (presented in two parts), Mar. 9, 2011, 296 pages.
Senoh et al., "DRM Renewability & Interoperability", IEEE Xplore, Conference: Consumer Communications and Networking Conference, 2004, Feb. 2004, pp. 424-429, DOI: 10.1109/CCNC.2004.1286899.
Sheu, Tsang-Ling et al., "Dynamic layer adjustments for SVC segments in P2P streaming networks", Computer Symposium (ICS), 2010, 2010 International, Tainan, Taiwan, R.O.C., pp. 793-798, 2010.
Shojania et al., "Experiences with MPEG-4 Multimedia Streaming", CiteSeer, Jan. 2001, 3 pgs., DOI: 10.1145/500141.500221.
Silvia, "Adaptive HTTP Streaming for Open Codecs", Oct. 9, 2010, [retrieved on: Mar. 2, 2018, https://gingertech.net/2010/10/09/adaptive-http-streaming-for-open-codecs/, 15 pgs.
Stockhammer, "MPEG's Dynamic Adaptive Streaming over http (Dash)—An Enabling Standard for Internet TV", Qualcomm Incorporated, Apr. 11, 2015, Retrieved from the Internet, https://www.w3.org/2011/09/webtv/slides/W3C-Workshop.pdf, 30 pgs.
Symes, "Video Compression Demystified", McGraw-Hill, 2001, 353 pgs., (presented in two parts).
Tan, Yap-Peng et al., "Video transcoding for fast forward/reverse video playback", IEEE ICIP, 2002, pp. I-713 to I-716.
Taymans et al., "GStreamer Application Development Manual (1.6.0)", 2007, 159 pgs.
Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP.2007.4379960.
Toscher et al., "The BigChaos Solution to the Netflix Prize 2008", Netflix Prize, Nov. 25, 2008, 17 pgs.
Tosun et al., "Efficient multi-layer coding and encryption of MPEG video streams", 2000 IEEE International Conference on Multimedia and Expo. ICME2000. Proceedings. Latest Advances in the Fast-Changing World of Multimedia (Cat. No.00TH8532), Jul. 30-Aug. 2, 2000, pp. 119-122, DOI: 10.1109/ICME.2000.869559.
Tripathi et al, "Improving Multimedia Streaming with Content-Aware Video Scaling", Retrieved from: http://digitalcommons.wpi.edu/computerscience-pubs/96, 2001, 17 pgs.
Um, "Selective Video Encryption of Distributed Video Coded Bitstreams and Multicast Security over Wireless Networks", Thesis, Aug. 2006, 142 pgs.
Van Grove, "Top 5 Ways to Share Videos on Twitter", Mashable, May 23, 2009, Retrieved from: https://mashable.com/2009/05/23/video-for-twitter/#Jvn9llYy6qqA, 6 pgs.
Venkatramani et al., "Securing Media for Adaptive Streaming", Multimedia 2003 Proceedings of the Eleventh ACM International Conference on Multimedia, Nov. 2-8, 2003, Berkeley, California, 4 pgs.
Wang, "Lightweight Encryption in Multimedia", Thesis, Jun. 2005, 184 pgs.
Wang et al., "Image Quality Assessment: From Error Visibility to Structural Similarity", IEEE Transactions on Image Processing, Apr. 2004, vol. 13, No. 4, pp. 600-612.
Weng, "A Multimedia Socail-Networking Community for Mobile Devices", 2007, 30 pgs.
Wong, "Web Client Programming with Perl", 1997, printed Jan. 8, 2021 from: https://www.oreilly.com/openbook-webclientch03.html, 31 pgs.
Wu, "A Fast MPEG Encryption Algorithm and Implementation of AES on CAM", Thesis, Oct. 6, 2003, 91 pgs.
Wu, Feng et al, "Next Generation Mobile Multimedia Communications: Media Codec and Media Transport Perspectives", In China Communications, Oct. 2006, pp. 30-44.
Yuksel, "Partial Encryption of Video for Communication and Storage", Thesis, Sep. 2003, 78 pgs.
Prosecution File History for U.S. Pat. No. 10,225,588, IPR filed Feb. 15, 2020, 2937 pgs., presented in 29 parts.
"Adobe Flash Video File Format Specification", Aug. 2010, Version 10.1, 89 pages.
"Broadcom BCM7413 Product Brief", Dec. 11, 2008, 2 pgs.
"Common Interface Specification for Conditional Access and other Digital Video Broadcasting Decoder Applications", European Standard, EN 50221, Feb. 1997, 86 pgs.
"Diagram | Matroska", Dec. 17, 2010, Retrieved from http://web.archive.org/web/201 01217114656/http:l/matroska.org/technical/diagram/index.html on Jan. 29, 2016, 5 pages, Dec. 17, 2010.
"Draft CR: Trick Mode for HTTP Streaming", 3GPP TSG-SA4 Meeting #58, Apr. 26-30, 2010, Vancouver, Canada, S4-100237, 3 pgs.
"Free music was never so cool before Grooveshark", Wayback Machine, Grooveshark, Startup Meme, May 31, 2008, printed Aug. 15, 2016 from https://web.archive.org/web/20080601173852/http://startupmeme.com/2008/05/31/free-music-was-never-so-wool-before-grooveshark/, 2 pgs.
"HTTP Live Streaming on the Leading Media CDN", Akamai website, retrieved from http://www.akamai.com/html/resources/http-live-streaming.html, 2015, accessed May 11, 2015, 5 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for . . .-a018239381, 6pg.
"Information Technology—Coding of audio-visual objects—Part 14: MP4 file format", International Standard, ISO/IEC 14496-14, First Edition, Nov. 15, 2003, 18 pages.
"Information technology—Generic coding of moving pictures and associated audio information: Systems", International Standard ISO/IEC 13818-1, Second Edition, Dec. 1, 2000, 174 pages (presented in two parts).
"Information-Technology—Generic coding of moving pictures and associated audio: Systems, Recommendation H.222.0", International Standard, ISO/IEC 13818-1, Draft 1209, Apr. 25, 1995, 151 pages.
"Information-Technology—Generic coding of moving pictures and associated audio: Systems, Recommendation H.222.0", International Standard, ISO/IEC 13818-1, Draft 1540, Nov. 13, 1994, 161 pages.
"Instantly convert songs into tiny URLs with TinySong", Wayback Machine, Startup Memo Technology Blog, printed Aug. 15, 2016 from https://seb.archive.org/web/20089191133853/http://startupmeme.com/instantly-convert-songs-into-tiny-urls-with-tinysong/, 4pgs.
"Matroska", Wikipedia, Jul. 10, 2017, retrieved from https://en.wikipedia.org/wiki/Matroska on Jul. 20, 2017, 3 pages.
"Matroska Streaming | Matroska", Retrieved from the Internet: URL:http://web.archive.org/web/201 0121711431 O.
"Media Delivery Solutions for Streaming Video and Software Delivery", Akamai website, Retrieved from http://www.akamai.com/html/solutions/media-delivery-solutions.html, 2015, Accessed May 11, 2015, 5 pgs.

(56) References Cited

OTHER PUBLICATIONS

"Microsoft Announces Breakthrough Technology Enabling Simple Access to Broad Set of Digital Content, Including Music, Games, Video, Ring Tones and Pictures", Microsoft, Feb. 12, 2017.
"MovieLabs Specification for Next Generation Video—Version 1.0", Motion Picture Laboratories, Inc., 2013, Retrieved from. http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pages.
"MPEG-4 File Format, Version 2", Sustainability of Digital Formats: Planning for Library of Congress Collections, Retrieved from: https://www.loc.gov/preservation/digital/formats/fdd/fdd000155.shtml, Last updated Feb. 21, 2017, 8 pgs.
"MPEG-4 Part 14", Wikipedia, Jul. 10, 2017, retrieved from https://en.wikipedia.org/wiki/MPEG-4_Part_14 on Jul. 20, 2017, 5 pages.
"OpenDML AVI File Format Extensions Version 1.02", OpenDMLAVI MJPEG File Format Subcommittee. Last revision: Feb. 28, 1996. Reformatting: Sep. 1997, 42 pgs.
"Pixel aspect ratio—Wikipedia", Nov. 24, 2010, pp. 1-8.
"SDMI Secure Digital Music Initiative", SDMI Portable Device Specification, Part 1, Version 1.0, Jul. 8, 1999, pp. 1-35.
"Series H: Audiovisual and Multimedia Systems Infrastructure of audiovisual services—Coding of moving video; High efficiency video coding", International Telecommunication Union, ITU-T H.265, Apr. 2015, 634 pages (presented in six parts).
"Server 'Trick Play' support for MPEG-2 Transport Stream Files", www.live555.com/liveMedia/transport-stream-trick-play.html, 2006, Dec. 31, 2020, 1 pg.
"Specifications | Matroska", Retrieved from the Internet: URL:http://web.archive.org/web/201 00706041303/http:/1www.matroska.org/technical/specs/index.html.
"Specifications Matroska", Dec. 17, 2010, [retrieved on Mar. 2, 2018], https://web.archive.org/web/20101217110959/http://matroska.org/technical/specs/index.html 12 pages.
"Supplementary European Search Report for Application No. EP 10834935, International Filing Date Nov. 15, 2010, Search Completed May 27, 2014, 9 pgs.".
"SWF and FLV File Format Specification", Adobe, Jun. 2007, Version 9, 298 pages.
"The LIVE555 Media Server", www.live555.com/mediaServer/#about, 2006, printed Dec. 31, 2020, 3 pgs.
"Twitpic's Future", Twitpic, Oct. 25, 2014, Retrieved from: https://web.archive.org/web/20150521043642/https://blog.twitpic.com/index.html, 12 pgs.
"Video File Format Specification", Adobe, Apr. 2008, Version 9, 46 pages.
"What is Fliggo?", Wayback Machine, printed Aug. 15, 2016 from https://web.archive.org/web/20080623065120/http://www.fliggo.com/about, 3 pgs.
U.S. Appl. No. 13/905,804, "Non-Final Office Action Received", U.S. Appl. No. 13/905,804, "Non-Final Office Action Received", Jul. 25, 2014, 15 pgs.
Adams et al, "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
ADB, "ADB-3800W Datasheet", 2007, 2 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Adzic et al, "Optimized Adaptive HTTP Streaming for Mobile Devices", International Society for Optics and Photonics, Applications of Digital Image Processing XXXIV, vol. 8135, Sep. 2011, p. 81350T.
Agi et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.
Arachchi et al., "Adaptation-aware encryption of scalable H.264/AVC for content security", Signal Processing: Image Communication, Jul. 2009, vol. 24, pp. 468-483, doi:10.1016/j.image.2009.02.004.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Jan. 24, 2007, USA, pp. 1-15.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pages.
Author Unknown, "Turbo-Charge Your Internet and PC Performance", printed Oct. 30, 2008 from Speedtest.net—The Global Broadband Speed Test, 1 pg.
Author Unknown, "White paper, The New Mainstream Wireless LAN Standard", Broadcom Corporation, Jul. 2003, 12 pgs.
Bell et al., "The BellKor 2008 Solution to the Netflix Prize", Netflix Prize, 2008, 21 pgs.
Bloom et al., "Copy Protection for DVD Video", Proceedings of the IEEE, vol. 87, No. 7, Jul. 1999, pp. 1267-1276.
Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013 (presented in three parts).
Catone, "10 Ways to Share Music on Twitter", Mashable, May 29, 2009, Retrieved from: https://mashable.com/2009/05/29/twitter-music/#vJCdrVzNOOqx, 5 pgs.
Chesler, "TinySong is like TinyURL for music", wire to the ear, Jun. 30, 2008, printed Aug. 15, 2016 from https://web.archive.org/web/20080907100459/http://www.wiretotheear.com/2008/06/30/tinysongis-like-tinyurl-for-music, 8 pgs.
Concolato et al., "Live HTTP Streaming of Video and Subtitles within a Browser", MMSys 2013, Feb. 26-Mar. 1, 2013, Oslo, Norway, 5 pgs.
Conklin et al., "Video coding for streaming media delivery on the Internet", IEEE Transactions on Circuits and Systems for Video Technology, Mar. 2001, vol. 11, No. 3, pp. 269-281.
De Cock et al., "Complexity-Based Consistent-Quality Encoding in the Cloud", IEEE International Conference on Image Processing (ICIP), Date of Conference Sep. 25-28, 2016, Phoenix, AZ, pp. 1484-1488.
Deshpande et al., "Scalable Streaming of JPEG2000 Images Using Hypertext Transfer Protocol", Multimedia '01: Proceedings of the Ninth ACM International Conference on Multimedia, Oct. 2001, pp. 372-381. https://doi.org/10.1145/500141.500197.
Entone, "Amulet High Definition IP Television Receiver User's Guide", 2008, 28 pgs.
Broadq—The Ultimate Home Entertainment Software, printed May 11, 2009 from ittp://web.srchive.org/web/20030401122010/www.broadq.com/qcasttuner/, 1 pg.
European Extended Search Report for EP Application 17813738.6, Search completed Oct. 18, 2019, Mailed Oct. 24, 2019, 9 pages.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP12828956.8, Report Completed Feb. 18, 2015, Mailed Mar. 2, 2015, 13 Pages.

(56) References Cited

OTHER PUBLICATIONS

Extended European Search Report for European Application No. 14800901.2, Search completed Dec. 2, 2016, Mailed Dec. 13, 2016, 13 Pgs.

Federal Computer Week, "Tool Speeds Info to Vehicles", Jul. 25, 1999, 5 pages.

HTTP Live Streaming Overview, Networking & Internet, Apple, Inc., Apr. 1, 2011, 38 pages.

IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.

Information Technology—MPEG Systems Technologies—Part 7: Common Encryption in ISO Base Media File Format Files (ISO/IEC 23001-7), Apr. 2015, 24 pgs.

Informationweek, "Internet on Wheels", InformationWeek: Front End: Daily Dose, Jul. 20, 1999, Printed on Mar. 26, 2014, 3 pgs.

International Preliminary Report on Patentability for International Application No. PCT/US2008/083816, issued May 18, 2010, 6 pgs.

International Preliminary Report on Patentability for International Application No. PCT/US2012/053052, Completed Mar. 4, 2014, 8 pgs.

International Preliminary Report on Patentability for International Application No. PCT/US2012/053223, Report Issued Mar. 4, 2014, 7 pgs.

International Preliminary Report on Patentability for International Application PCT/US2011/067167, Issued Feb. 25, 2014, 8 pgs.

International Preliminary Report on Patentability for International Application PCT/US2014/039425, Report Issued Nov. 24, 2015, Mailed Dec. 3, 2015, 6 Pgs.

International Preliminary Report on Patentability for International Application PCT/US2017/031114, Report issued Dec. 18, 2018, Mailed Dec. 27, 2018, 7 Pgs.

International Search Report and Written Opinion for International Application No. PCT/US09/46588, completed Jul. 13, 2009, mailed Jul. 23, 2009, 7 pgs.

International Search Report and Written Opinion for International Application No. PCT/US2004/041667, completed May 24, 2007, mailed Jun. 20, 2007, 6 pgs.

International Search Report and Written Opinion for International Application No. PCT/US2008/083816, completed Jan. 10, 2009, mailed Jan. 22, 2009, 7 pgs.

International Search Report and Written Opinion for International Application No. PCT/US2012/053052, International Filing Date Aug. 30, 2012, Report Completed Oct. 25, 2012, Mailed Nov. 16, 2012, 9 pgs.

International Search Report and Written Opinion for International Application No. PCT/US2012/053223, International Filing Date Aug. 30, 2012, Report Completed Dec. 7, 2012, Mailed Mar. 7, 2013, 10 pgs.

International Search Report and Written Opinion for International Application No. PCT/US2017/031114, Search completed Jun. 29, 2017, Mailed Jul. 19, 2017, 11 Pgs.

International Search Report and Written Opinion for International Application PCT/US2011/066927, completed Apr. 3, 2012, Mailed Apr. 20, 2012, 14 pgs.

International Search Report and Written Opinion for International Application PCT/US2011/067167, completed Jun. 19, 2012, Mailed Jul. 2, 2012, 11 pgs.

International Search Report and Written Opinion for International Application PCT/US2012/053053, search completed Oct. 23, 2012, mailed Nov. 13, 2012, 11 pgs.

International Search Report for International Application No. PCT/SE2011/050166, Search completed Mar. 30, 2011, Mailed Mar. 30, 2011, 5 Pgs.

ISO/IEC 14496-12 Information technology—Coding of audio-visual objects—Part 12: ISO base media file format, Feb. 2004 ("MPEG-4 Part 12 Standard"), 62 pgs.

ISO/IEC 14496-12:2008(E) Informational Technology—Coding of Audio-Visual Objects Part 12: ISO Base Media File Format, Oct. 2008, 120 pgs.

ISO/IEC FCD 23001-6 MPEG systems technologies Part 6: Dynamic adaptive streaming over http (DASH), Jan. 28, 2011, 86 pgs.

ITS International, "Fleet System Opts for Mobile Server", Aug. 26, 1999, Printed on Oct. 21, 2011 from http://www.itsinternational.com/News/article.cfm?recordID=547, 2 pgs.

Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.

Linksys, KISS DP-500, printed May 4, 2007 from http://www.kiss-technology.com/?p=dp500, 2 pgs.

Linksys® : "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.

Microsoft Corporation, "Chapter 8, Multimedia File Formats" 1991, Microsoft Windows Multimedia Programmer's Reference, 3 cover pgs., pp. 8-1 to 8-20.

Microsoft Corporation, Advanced Systems Format (ASF) Specification, Revision 01.20.03, Dec. 2004, 121 pgs.

Microsoft Media Platform: Player Framework, "Microsoft Media Platform: Player Framework v2.5 (formerly Silverlight Media Framework)", May 3, 2011, 2 pages.

Microsoft Media Platform: Player Framework, "Silverlight Media Framework v1.1", Jan. 2010, 2 pages.

Microsoft Windows® XP Media Center Edition 2005, Frequently asked Questions, printed May 4, 2007 from http://www.microsoft.com/windowsxp/mediacenter/evaluation/faq.mspx.

Microsoft Windows® XP Media Center Edition 2005: Features, printed May 9, 2007, from http://www.microsoft.com/windowsxp/mediacenter/evaluation/features.mspx, 4 pgs.

MPEG-DASH presentation at Streaming Media West 2011, Nov. 2011, 14 pgs.

Multiview Video Coding (MVC), ISO/IEC 14496-10, 2008 Amendment.

Open DML AVI-M-JPEG File Format Subcommittee, "Open DML AVI File Format Extensions", Version 1.02, Feb. 28, 1996, 29 pgs.

PC world.com, Future Gear: PC on the HiFi, and the TV, from http://www.pcworld.com/article/id,108818-page,1/article.html, printed May 4, 2007, from IDG Networks, 2 pgs.

Pomelo, LLC Tech Memo, Analysis of Netflix's Security Framework for 'Watch Instantly' Service, Mar.-Apr. 2009, 18 pgs.

Qtv—About BroadQ, printed May 11, 2009 from http://www.broadq.com/en/about.php, 1 pg.

Server-Side Stream Repackaging (Streaming Video Technologies Panorama, Part 2), Jul. 2011, 15 pgs.

Supplementary European Search Report for Application No. EP 04813918, Search Completed Dec. 19, 2012, 3 pgs.

Text of ISO/IEC 23001-6: Dynamic adaptive streaming over HTTP (DASH), Oct. 2010, 71 pgs.

Universal Mobile Telecommunications System (UMTS), ETSI TS 126 233 V9.1.0 (Jun. 2011) 3GPP TS 26.233 version 9.1.0 Release 9, 18 pgs.

Universal Mobile Telecommunications Systems (UMTS); ETSI TS 126 244 V9.4.0 (May 2011) 3GPP TS 26.244 version 9.4.0 Release 9, 58 pgs.

Windows Media Center Extender for Xbox, printed May 9, 2007 from http://www.xbox.com/en-US/support/systemuse/xbox/console/mediacenterextender.htm, 2 pgs.

Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.

International Search Report and Written Opinion for International Application PCT/US14/39425, International Filing Date Mar. 23, 2014, Report Completed Sep. 15, 2014, Mailed Oct. 17, 2014, 9 Pgs., Oct. 17, 2014.

"Adaptive HTTP Streaming in PSS—Client Behaviour", S4-AHI129, 3GPP TSG-SA4 Ad-Hoc Meeting, Dec. 14-16, 2009, Paris, France; section 12.6.1.

(56) References Cited

OTHER PUBLICATIONS

"Adaptive HTTP Streaming in PSS—Data Formats for HTTP-Streaming excluding MPD", S4-AHI128, 3GPP TSGSA4 Ad-Hoc Meeting, Dec. 14-16, 2009, Paris, France; sections 12.2.1 and 12.2.4.2.1.
"Adaptive HTTP Streaming in PSS—Discussion on Options", S4-AHI130, 3GPP TSG-SA4 Ad-Hoc Meeting, Dec. 14-16, 2009, Paris, France; sections 1, 2.7-2.8, and 2.16-2.19.
"Adaptive Streaming Comparison", Jan. 28, 2010, 5 pgs.
"Apple HTTP Live Streaming specification", Aug. 2017, 60 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Data Encryption Decryption using AES Algorithm, Key and Salt with Java Cryptography Extension", Available at https://www.digizol.com/2009/10/java-encrypt-decrypt-jce-salt.html, October 200, 6 pgs.
"Delivering Live and On-Demand Smooth Streaming", Microsoft Silverlight, 2009, 28 pgs.
"DVD—MPeg differences", printed Jul. 2, 2009 from http://dvd.sourceforge.net/dvdinfo/dvdmpeg.html, 1 pg.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"Fragmented Time Indexing of Representations", S4-AHI126, 3GPP TSG-SA4 Ad-Hoc Meeting, Dec. 14-16, 2009, Paris, France, 4 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information Technology-Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
KISS Players, "KISS DP-500", retrieved from http://www.kiss-technology.com/?p=dp500 on May 4, 2007, 1 pg.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"MPEG ISO/IEC 13818-1", Information Technology—Generic Coding of Moving Pictures and Associated Audio: Systems, Apr. 25, 1995, 151 pages.
"MPEG-4, Part 14, ISO/IEC 14496-14", Information technology—Coding of audio-visual objects, 18 pgs., Nov. 15, 2003.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"QCast Tuner for PS2", printed May 11, 2009 from http://web.archive.org/web/20030210120605/www.divx.com/software/detail.php?ie=39, 2 pgs.
"Single-Encode Streaming for Multiple Screen Delivery", Telestream Wowza Media Systems, 2009, 6 pgs.
"Smooth Streaming Client", The Official Microsoft IIS Site, Sep. 24, 2010, 4 pages.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"The MPEG-DASH Standard for Multimedia Streaming Over the Internet", IEEE MultiMedia, vol. 18, No. 4, 2011, 7 pgs.
"Thread: SSME (Smooth Streaming Medial Element) config.XML review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Transparent end-to-end packet switched streaming service (PSS); 3GPP file format (3GP) (Release 9)", 3GPP TS 26.244 V9.0.0 (Dec. 2009),sections 7.1-7.4.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
"Windows Media Player 9", Microsoft, Mar. 23, 2017, 3 pgs.
"DVD-Mpeg differences", printed on Jul. 2, 2009, http://dvd.sourceforge.net/dvdinfo/dvdmpeg.html, 1 pg.
U.S. Appl. No. 13/224,298, "Final Office Action Received", May 19, 2014, 26 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Akhshabi et al., "An Experimental Evaluation of Rate-Adaptation Algorithms in Adaptive Streaming over HTTP", MMSys'11, Feb. 23-25, 2011, 12 pgs.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Anonymous, "Method for the encoding of a compressed video sequence derived from the same video sequence compressed at a different bit rate without loss of data", ip.com, ip.com No. IPCOM000008165D, May 22, 2002, pp. 1-9.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Blasiak, "Video Transrating and Transcoding: Overview of Video Transrating and Transcoding Technologies", Ingenient Technologies, TI Developer Conference, Aug. 6-8, 2002, 22 pgs.
Bocharov et al, "Portable Encoding of Audio-Video Objects, The Protected Interoperable File Format (PIFF)", Microsoft Corporation, First Edition Sep. 8, 2009, 30 pgs.

(56) References Cited

OTHER PUBLICATIONS

Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Casares et al., "Simplifying Video Editing Using Metadata", DIS2002, 2002, pp. 157-166.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Diamantis et al., "Real Time Video Distribution using Publication through a Database", Proceedings SIBGRAPI'98. International Symposium on Computer Graphics, Image Processing, and Vision (Cat. No.98EX237), Oct. 1990, 8 pgs.
Ding, Li-Fu et al., "Content-Aware Prediction Algorithm With Inter-View Mode Decision for Multiview Video Coding", IEEE Transactions on Multimedia, vol. 10, No. 8, Dec. 2008., Dec. 8, 2008, 12 Pages.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010,15 pgs.
Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
I-O Data, "Innovation of technology arrived", Nov. 2004, Retrieved from http://www.iodata.com/catalogs/AVLP2DVDLA_Flyer200505.pdf, 2 pgs.
Jain et al., U.S. Appl. No. 61/522,623, filed Aug. 11, 2011, 44 pgs.
Jeannin, Sylvie et al., "Video Motion Representation for Improved Content Access", IEEE Transactions on Consumer Electronics, vol. 46, No. 3., Aug. 2004, 11 Pages.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Karouia et al., "Video Similarity Measurement Based on Attributed Relational Graph Matching", N.T. Nguyen, R. Katarzyniak (Eds.): New Challenges in Applied Intelligence Technologies, SCI 134, pp. 173-182, 2008., 2008, 10 Pages.
Kim, Seon H. et al., "Design and implementation of geo-tagged video search framework", Journal of Visual Communication and Image Representation, 2010, vol. 21 (2010), pp. 773-786.
Kim et al, "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Levkov, "Mobile Encoding Guidelines for Android Powered Devices", Adobe Systems Inc., Addendum B, Dec. 22, 2010, 42 pgs.
Lewis, "H.264/MPEG-4 AVC CABAC overview", Oct. 25, 2012, printed Jun. 24, 2013 from http://www.web.archive.org/web/20121025003926/www.theonlineoasis.co.uk/notes.html, 3 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Long et al., "Silver: Simplifying Video Editing with Metadata", Demonstrations, CHI 2003: New Horizons, Apr. 5-10, 2003, pp. 628-629.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.

(56) References Cited

OTHER PUBLICATIONS

Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Newton et al., "Preserving Privacy by De-identifying Facial Images", Carnegie Mellon University School of Computer Science, Technical Report, CMU-CS-03-119, Mar. 2003, 26 pgs.
Noboru, "Play Fast and Fine Video on Web! codec", Co.9 No. 12, Dec. 1, 2003, pp. 178-179.
Noe, "Matroska File Format (Under Construction!)", Internet Citation, Jun. 24, 2007, XP002617671, 51pgs. Retrieved from the Internet: URL:http://web.archive.org/web/20070821155146/www.matroska.org/technical/specs/matroska.pdf [retrieved on Jan. 19, 2011], Jun. 24, 2007, 1-51.
Noe, Alexander "AVI File Format", http://www.alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 2013, 2 pages.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Ozer, Jan "Adaptive Streaming in the Field", Streaming Media, Dec. 2010-Jan. 2011, pp. 36-47.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Richardson, "H.264 and MPEG-4 Video Compression", Wiley, 2003, 306 pgs. (presented in 2 parts).
Schulzrinne et al., "Real Time Streaming Protocol (RTSP)", Internet Engineering Task Force, RFC 2326, Apr. 1998, 80 pgs.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AV LP2/DVDLA&ts=2&tsc, 1 pg.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, 1999-9, pp. 1-22.
Unknown, "MPEG-4 Video Encoder: Based on International Standard ISO/IEC 14496-2", Patni Computer Systems, Ltd., publication date unknown, 15 pgs.
Van Deursen et al., "On Media Delivery Protocols in the Web", 2010 IEEE International Conference on Multimedia and Expo, Jul. 19-23, 2010, 6 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Watson, Mark "Input for Dash EE#1 (CMP): Pixel Aspect Ratio", 94. MPEG Meeting; Oct. 11, 2010-Oct. 15, 2010; Guangzhou; (Motion Picture Expert Group or ISO/IEC JTC1/SC29/WG11), No. M18498, Oct. 28, 2010 (Oct. 28, 2010), XP030047088,, Oct. 2, 2010, 4 Pages.
Westerink et al., "Two-pass MPEG-2 variable-bit-rate encoding", IBM Journal of Research and Development, International Business Machines Corporation, New York, NY, US, XP002395114, ISSN: 0018-8646, vol. 43, No. 4, Jul. 4, 1999, pp. 471-488.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Wu et al., "A Hierarchical Reliability-Driven Scheduling for Cloud Video Transcoding", International Conference on Machine Learning and Cybernetics Jul. 12, 2015 pp. 456-457.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Zambelli, "IIS Smooth Streaming Technical Overview", Microsoft Corporation, Mar. 31, 2009, XP055009366, Retrieved from the Internet: URL:http://img.prodek.It/documents/IIS_Smooth_Streaming_Technical_Overview.pdf, 17pgs.
"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
Written Opinion for International Application No. PCT/US2007/063950 filed Mar. 14, 2007, report completed Mar. 1, 2008; report mailed Mar. 19, 2008, 6 pgs.
International Standard, Information technology—Generic coding of moving pictures and associated audio information: Systems, ISO/IEC 13818-1:2000(E), Dec. 1, 2000 174 pgs. (presented in 2 parts).
U.S. Appl. No. 13/905,804, "Notice of Allowance," Aug. 12, 2015, 8 pgs.
3GPP TS 26.247, V10.1.0, 3rd Generation Partnership Project; Technical Specification Group Services and System Aspects Transparent End-to-end Packet-switches Streaming Services (PSS); Nov. 2011, 112 pages.
Chinese Patent Application 201180060590.1 office action dated Aug. 6, 2015, 11 pgs.

(56) References Cited

OTHER PUBLICATIONS

Cloakware Corporation, "Protecting Digital Content Using Cloakware Code Transformation Technology", Version 1.2, May 2002, pp. 1-10.
Decision Granting Institution of Inter Partes Review 35 U.S.C. § 314, IPR2020-00558, U.S. Pat. No. 10,225,588, 46 pgs.
Decision Granting Petitioner's Request on Rehearing 37 C.F.R. § 42.71(d) Granting Institution of Inter Partes Review 35 U.S.C. § 314, IPR2020-00614 U.S. Pat. No. 7,295,673, 29 pgs.
Declaration of Patrick McDaniel, Ph.D., Inter Partes Review of U.S. Pat. No. 10,225,588, IPR filed Feb. 15, 2020, 211 pgs.
EP11774529 Supplementary European Search Report, completed Jan. 31, 2014, 2 pgs.
European Search Report Application No. EP 08870152, Search Completed May 19, 2011, Mailed May 26, 2011, 9pgs.
Examination report for GB1308663.2, dated May 18, 2016, 3 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, Mailed Oct. 5, 2016, 9 Pgs.
Extended European Search Report for European Application No. 19211286.0, Search completed Jul. 3, 2020, Mailed Jul. 13, 2020, 9 Pgs.
Extended European Search Report for European Application No. 19211291.0, Search completed Jul. 6, 2020, Mailed Jul. 14, 2020, 12 Pgs.
Extended European Search Report for European Application No. 21208230.9, Search completed Feb. 18, 2022, Mailed Mar. 1, 2022, 15 Pgs.
Extended European Search Report for European Application No. 20172313.7 Search completed Aug. 19, 2020 Mailed Aug. 27, 2020, 11 Pgs.
Filed Application and Filing Receipt for U.S. Appl. No. 61/359,748, Application filed Jun. 29, 2010, Receipt mailed Jul. 13, 2010, 38 pages.
Final draft ETSI ES 202 109, V1.1.1, ETSI Standard, Terrestrial Trunked Radio (TETRA); Security; Synchronization mechanism for end-to-end encryption, Oct. 2002, 17 pgs.
First Amended Complaint for Patent Infringement, *DivX, LLC* v. *Netflix, Inc*., No. 2:19-cv-1602-PSG, Am. Compl. (C.D. Cal Aug. 21, 2019), 229 pgs, IPR filed Feb. 15, 2020.
Great Britain Application GB1308663.2 search report dated Jan. 5, 2017, 1 pg.
Information Technology—MPEG Systems Technologies—Part 6 Dynamic Adaptive Streaming Over HTTP (DASH) (Oct. 2010).
International Preliminary Report for Application No. PCT/US2011/066927, Filed Dec. 22, 2011, Report Issued Jul. 10, 2013, 13 pgs.
International Preliminary Report for International Application No. PCT/US2011/067243, International Filing Date Dec. 23, 2011, Issued Jul. 10, 2013, 7 pgs.
International Preliminary Report on Patentability for International Application PCT/US14/30747, Report Issued Sep. 15, 2015, Mailed Sep. 24, 2015, 6 Pgs.
International Preliminary report on Patentability for International Application No. PCT/US2005/025845, report issued on Jun. 19, 2007, 6 pgs.
International Preliminary Report on Patentability for International Application No. PCT/US2007/063950, Report Completed Dec. 18, 2009, 3 pgs.
International Preliminary Report on Patentability for International Application No. PCT/US2010/56733, Issued Jun. 5, 2012, 5 pgs.
International Preliminary Report on Patentability for International Application No. PCT/US2011/068276, issue Mar. 4, 2014, 23 pgs.
International Preliminary Report on Patentability for International Application PCT/US2013/043181, issued Dec. 31, 2014, Mailed Jan. 8, 2015, 11 Pgs.
International Preliminary Report on Patentability for International Application PCT/US2014/039852, issued Dec. 1, 2015, mailed Dec. 5, 2015, 8 Pgs.
International Preliminary Report on Patentability for International Application PCT/US2010/020372, Completed Oct. 6, 2011, 6 Pgs.
International Search Report and Written Opinion for International Application No. PCT/US07/63950, completed Feb. 19, 2008; mailed Mar. 19, 2008, 9 pgs.
International Search Report and Written Opinion for International Application No. PCT/US08/87999, completed Feb. 7, 2009, mailed Mar. 19, 2009, 6 pgs.
International Search Report and Written Opinion for International Application No. PCT/US2005/025845, completed Feb. 5, 2007 and mailed May 10, 2007, 8 pgs.
International Search Report and Written Opinion for International Application No. PCT/US2010/020372, Completed Feb. 10, 2009, Mailed Mar. 1, 2010, 8 pgs.
International Search Report and Written Opinion for International Application No. PCT/US2010/56733, Completed Jan. 3, 2011, Mailed Jan. 14, 2011, 9 pgs.
International Search Report and Written Opinion for International Application No. PCT/US2011/067243, International Filing Date Dec. 23, 2011, Search Completed Apr. 24, 2012, Mailed May 8, 2012, 8 pgs.
International Search Report and Written Opinion for International Application No. PCT/US2013/043181, completed Nov. 27, 2013, mailed Dec. 6, 2013, 12 pgs.
International Search Report and Written Opinion for International Application PCT/US14/30747, completed Jul. 30, 2014, Mailed Aug. 22, 2014, 7 Pgs.
International Search Report and Written Opinion for International Application PCT/US14/39852, completed Oct. 21, 2014, mailed Dec. 5, 2014, 11 pgs.
International Search Report and Written Opinion for International Application PCT/US2011/068276, completed Jun. 19, 2013, Mailed Jul. 8, 2013, 24 pgs.
International Search Report and Written Opinion for PCT/US2013/020572, International Filing Date Jan. 7, 2013, Search Completed Mar. 19, 2013, Mailed Apr. 29, 2013, 10 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ISO/IEC 14496-12 Information technology—Coding of audio-visual objects—Part 12: ISO base media file format, Amendment 3: DASH support and RTP reception hint track processing, 2011, 44 pgs.
ISO/IEC CD 23001-6 MPEG systems technologies Part 6: Dynamic adaptive streaming over HTTP (DASH), Oct. 15, 2010, 70 pgs.
ISO/IEC DIS 23009-1, Information technology—Dynamic adaptive streaming over HTTP (DASH)—Part 1: Media presentation description and segment formats, dated Aug. 30, 2011, 132 pgs.
ISO/IEC JTC1/SC29/WG11, MPEG/M18620, Oct. 2010, Text of ISO/IEC 23001-6: Dynamic adaptive streaming over HTTP (DASH), 72 pgs.
ISO/IEC JTC1/SC29/WG11, MPEG/N11578, Text of ISO/IEC 23001-6: Dynamic adaptive streaming over HTTP (DASH), Oct. 2010, 70 pgs.
ISO/IEC JTC1/SC29-WG11—Coding of Moving Pictures and Audio, MPEG2010/M18692, Jan. 2010, 10 pgs.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Office Action for Chinese Patent Application No. CN200880127596.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Petition for Inter Partes Review of U.S. Pat. No. 10,225,588, IPR2020-00558, 96 pgs, IPR filed Feb. 15, 2020.

(56) References Cited

OTHER PUBLICATIONS

Power of Attorney—Hulu, LLC (IPR2020-00558), 4 pgs, IPR filed Feb. 15, 2020.
Power of Attorney—Netflix, Inc. (IPR2020-00558), 4 pgs, IPR filed Feb. 15, 2020.
Proceedings of the Second KDD Workshop on Large-Scale Recommender Systems and the Netflix Prize Competition, Las Vegas, Nevada, Aug. 24, 2008, 34 pgs.
Prosecution File History for U.S. Appl. No. 13/340,623 to Kiefer et al. ("Kiefer"), IPR filed Feb. 15, 2020, 1249 pgs., presented in 6 parts.
Search Report for Canadian patent application 2,816,621, dated Oct. 30, 2014, 6 pgs.
Search report for European Patent Application 11838186.2, dated Jul. 13, 2017, 6 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Supplementary European Search Report for European Application No. 07758499.3, Report Completed Jan. 25, 2013, 8 pgs.
U.S. Appl. No. 61/530,305, filed Sep. 1, 2011, 6 pgs.
Wayback Machine, Grooveshark—Features, All Your Music in One Place, printed Aug. 15, 2016 from https://web.archive.org/web/20081013115837/http://www,grooveshark.com/features, 6 pgs.
3GPP TS 26.247, V1.3.0, 3rd Generation Partnership Project; Technical Specification Group Services and System Aspects Transparent end-to-end Packet-switches Streaming Services (PSS); Progressive Download and Dynamic Adaptive Streaming over HTTP (3GP-DASH) (Release 10), Mar. 2011, 72 pgs.
Written Opinion for International Application No. PCT/US2009/046588, completed Jul. 14, 2009, mailed Jul. 23, 2009, 5 pgs.
Written Opinion for International Application No. PT/US2005/025845 filed Jul. 21, 2005, report completed Feb. 5, 2007 and mailed May 10, 2007, 5 pgs.
Written Opinion for International Application No. PCT/US2004/041667, Filing Date Dec. 8, 2004, Report Completed May 24, 2007, Mailed Jun. 20, 2007, 4 pgs.
Written Opinion for International Application No. PCT/US2005/025845, completed Feb. 5, 2007 and mailed May 10, 2007, 6 pgs.
"Apple HTTP live streaming and Caringo content storage video", YouTube, Retrieved from: https://www.youtube.com/watch?v=sJInUlw0Lfl, Oct. 20, 2009.
"Delivering content to Apple iPhone, iPod Touch and iPad using RealNetworks", real, Jun. 29, 2010, Retrieved: https://web.archive.org/web/20110626111358/http://www.realnetworks.com/uploadedFiles/Helix/Resource-Library/Whitepaper-iPhone.pdf, Archived Jun. 26, 2011, 17 pgs.
"Encoding Best Practices", Telestream, Retrieved: https://web.archive.org/web/20110703155835/https://www.telestream.net/pdfs/technical/encoding-best-practices-q&a.pdf, Archived Jul. 3, 2011, 13 pgs.
"Helix Server Powerful Multi-Format Streaming Software", real, Retrieved: https://web.archive.org/web/20110627045621/http://www.realnetworks.com/uploadedFiles/helix/resource-library/Datasheet-Helix-Server.pdf, archived Jun. 27, 2011, 5 pgs.
"History of Move Networks", Move Networks, Retrieved: https://web.archive.org/web/20100328233035/http://movenetworks.com/history.html, archived Mar. 28, 2010, 1 pg.
"HTTP Live Streaming Overview", Apple, Retrieved from: https://web.archive.org/web/20090625150104/http://developer.apple.com/iphone/library/documentation/NetworkingInternet/Conceptual/StreamingMediaGuide/iPhoneStreamingMediaOverview/iPhoneStreamingMediaOverview.html#//apple _ref/doc/uid/TP40008332-CH100-SW3 2, Archived Jun. 25, 2009, last updated May 22, 2009, 3 pgs.
"Information technology—MPEG systems technologies, Part 6: Dynamic adaptive streaming over HTTP (DASH)", Draft International Standard, ISO/IEC DIS 23001-6, Feb. 15, 2011, 86 pgs.
"Move Networks Awarded Fundamental Patent on Adaptive Video Streaming", Move Networks, Sep. 15, 2010, Retrieved: https://web.archive.org/web/20101009233852/http://movenetworks.com/press/2010-09-15.html, archived Oct. 9, 2010, 1 pg.
"Move Networks is Delivering the Next Generation of Television", Move Networks, Retrieved from: https://web.archive.org/web/20100327210059/http://www.movenetworks.com/, archived Mar. 27, 2010, 1 pg.
"MPEG-4 Multi-Rate Coding and Envivio Implementation", Envivio, Inc, Jan. 2004, 8 pgs.
"Progressive Download and Dynamic Adaptive Streaming over HTTP (3GP-DASH) (Release 10 v1.0.0)", 3GPP, Sep. 2010.
"Progressive Download and Dynamic Adaptive Streaming over HTTP (3GP-DASH) (Release 10 v2.0.0)", 3GPP, Jun. 2011.
"Using HTTP Live Streaming", Apple, Retrieved from: https://web.archive.org/web/20100117183930/http://developer.apple.com/iphone/library/documentation/NetworkingInternet/Conceptual/StreamingMediaGuide/UsingHTTPLiveStreaming/UsingHTTPLiveStreaming.html#//apple_ref/doc/uid/TP40008332-CH102-SW1 1, Archived Jan. 17, 2010, last updated Nov. 17, 2009, 1 pg.
"What is Move?", Move Networks, Retrieved: https://web.archive.org/web/20100328233045/http://www.movenetworks.com/about.html, archived Mar. 28, 2010, 1 pg.
De Cicco et al., "Feedback Control for Adaptive Live Video Streaming", MMSys '11: Proceedings of the second annual ACM conference on Multimedia systems, Feb. 23-25, 2011, pp. 145-156.
Knowlton, Chris, "Live Streaming with Microsoft Silverlight and Windows Server", Microsoft Corporation, 2010, 84 pgs.
Ozer, Jan, "Video Compression for Flash, Apple Devices and HTML5", Doceo Publishing, 2011.
Pantos, "HTTP Live Streaming draft-pantos-http-livestreaming—04", Jun. 5, 2010, 22 pgs.
"Amazon's Initial Invalidity Contentions", *DIVX, LLCv. amazon.com, Inc, and Amazon Web Services, Inc*, Case No. 1:24-cv-02061-CMH-LRV, Aug. 15, 2025, 86 pages.
"FFmpeg Documentation", Retrieved from: FFmpeg.org, The Wayback Machine: https://web.archive.org/web/20110726054531/http://www.ffmpeg.org/ffmpeg.html, Jul. 26, 2011, 58 pages.
Hervouet et al., "Video Quality Optimization • Multi-rate Video Encoding", envivio., Jul. 2010, 14 pages.
Moldovan, Arghir-Nicolae, "Personalised Multimedia Educational Content for M-learning Environments", National College of Ireland, School of Computing, Thesis submitted to the Higher Education and Training Awards Council, Sep. 2010, 159 pages.
Ozcelebi et al., "Delay-Distortion Optimization for Content- Adaptive Video Streaming", IEEE Transactions on Multimedia, Jun. 2007, 10 pages.
Wang et al., "Towards Optimal Rate Control: A Study of the Impact of Spatial Resolution, Frame Rate, and Quantization on Subjective Video Quality and Bit Rate", Proceedings of SPIE, Visual Communications and Image Processing, vol. 51050, 2003, 12 pages.
Request for Ex Parte Reexamination for Patent No. 11,611,785, Reexamination No. U.S. Appl. No. 90/015,467, filed Aug. 22, 2025, 127 pgs.
Request for Ex Parte Reexamination for Patent No. 11,611,785, Reexamination No. U.S. Appl. No. 90/015,530, filed Sep. 19, 2025, 119 pgs.
Petition for Inter Partes Review of U.S. Pat. No. 11,611,785, IPR2025-01223, IPR filed Jun. 30, 2025, 100 pgs.
Decision Denying Institution of Inter Partes Review, *Advanced Bionics, LLC*, Petitioner, v. *MED-EL Elektromedizinische Geräte GMBH*, U.S. Pat. No. 8,634,909 B2, Case IPR2019-01469, Paper No. 6, Feb. 13, 2020, 23 pgs.
Reexam Petition Decision received for U.S. Appl. No. 90/014,801, mailed on Aug. 31, 2022, 10 pgs.
Decision Denying Institution of Inter Partes Review, *Becton, Dickinson and Companyv. B. Braun Melsungen AG*, U.S. Pat. No. 8,328,762 B2, Case IPR2017-01586, Paper No. 8, Dec. 15, 2017, 39 pgs.
"Amazon's Complaint for Patent Infringement", *DIVX, LLCv. amazon.com, Inc, and Amazon Web Services, Inc*, Case No. 3:24-cv-00818, Nov. 15, 2024, 91 pgs.

(56) References Cited

OTHER PUBLICATIONS

"Exhibit 1002: Prosecution File History for U.S. Pat. No. 11,611,785, filed on Feb. 22, 2021", Inter Partes Review of U.S. Pat. No. 11,611,785, IPR2025-01223, IPR filed Jun. 30, 2025, 1073 pgs. (presented in 4 parts).
"Exhibit 1003: Declaration of Hari Kalva, Ph.D.", Inter Partes Review of U.S. Pat. No. 11,611,785, IPR2025-01223, IPR filed Jun. 30, 2025, 145 pgs.
"Exhibit 1003: Declaration of Immanuel Freedman, Ph.D.", Ex Parte Reexamination of U.S. Pat. No. 11,611,785 filed on Aug. 22, 2025, 101 pgs.
"Exhibit 1004: Curriculum Vitae of Hari Kalva, Ph.D.", Inter Partes Review of U.S. Pat. No. 11,611,785, IPR2025-01223, IPR filed Jun. 30, 2025, 27 pgs.
"Exhibit 1008: IEEE Biographical Webpage for BitDetect, Retrieved from internet: < https://ieeexplore.ieee.org/abstract/document/6196187>, Retrieved on Jul. 21, 2025", Ex Parte Reexamination of U.S. Pat. No. 11,611,785 filed on Aug. 22, 2025, 3 pgs.
"Exhibit 1009: Declaration of Gordon MacPherson regarding public availability of BitDetect", Ex Parte Reexamination of U.S. Pat. No. 11,611,785 filed on Aug. 22, 2025, 17 pgs.
"Exhibit 1010: Declaration of Ingrid Hsieh-Yee, Ph.D.", Ex Parte Reexamination of U.S. Pat. No. 11,611,785 filed on Aug. 22, 2025, 39 pgs.
"Exhibit 1011: IEEE Biographical Webpage for MediaMTool, Retrieved from internet: < https://ieeexplore.ieee.org/document/5954907>, Retrieved on Jul. 21, 2025", Ex Parte Reexamination of U.S. Pat. No. 11,611,785 filed on Aug. 22, 2025, 3 pgs.
"Exhibit 1012: Comparison Document Comparing Claims of Patent No. 11,611,785", Ex Parte Reexamination of U.S. Pat. No. 11,611,785 filed on Aug. 22, 2025, 4 pgs.
"Exhibit 1013: U.S. Appl. No. 61/529,201, filed Aug. 30, 2011", Ex Parte Reexamination of U.S. Pat. No. 11,611,785 filed on Aug. 22, 2025, 5 pgs.
"Exhibit 1014: Specification, Claims, Abstract, and Drawings of U.S. Appl. No. 13/221,682", Ex Parte Reexamination of U.S. Pat. No. 11,611,785 filed on Aug. 22, 2025, 56 pgs.
"Exhibit 1015: Specification, Claims, Abstract, and Drawings of U.S. Appl. No. 13/600,046", Ex Parte Reexamination of U.S. Pat. No. 11,611,785 filed on Aug. 22, 2025, 29 pgs.
"Exhibit 1017: Adaptive Bitrate Streaming", Wikipedia, Retrieved from internet, Retrieved on Jun. 11, 2025 <https://en.wikipedia.org/wiki/Adaptive_bitrate_streaming>, Inter Partes Review of U.S. Pat. No. 11,611,785, IPR2025-01223, IPR filed Jun. 30, 2025, 10 pgs.
"Exhibit 1017: Specification, Claims, Abstract, and Drawings of U.S. Appl. No. 13/432,521", Ex Parte Reexamination of U.S. Pat. No. 11,611,785 filed on Aug. 22, 2025, 37 pgs.
"Exhibit 1019: The History of Streaming Told Through Protocols", Retrieved from internet: < https://www.servers.com/news/whitepapers/history-of-streaming-through-protocols>, Inter Partes Review of U.S. Pat. No. 11,611,785, IPR2025-01223, IPR filed Jun. 30, 2025, 29 pgs.
"Exhibit 1020: Definition of Container", Retrieved from internet: <https://www.afterdawn.com/glossary/term.cfm/container>, Retrieved on Jun. 13, 2025, Inter Partes Review of U.S. Pat. No. 11,611,785, IPR2025-01223, IPR filed Jun. 30, 2025, 13 pgs.
"Exhibit 1023: Declaration of Sylvia D. Hall-Ellis, Ph.D.", Inter Partes Review of U.S. Pat. No. 11,611,785, IPR2025-01223, IPR filed Jun. 30, 2025, 31 pgs.
"Exhibit 1024: MARC record regarding 'Exhibit 1005: Video compression for Flash, Apple Devices, and HTML 5", Inter Partes Review of U.S. Pat. No. 11,611,785, IPR2025-01223, IPR filed Jun. 30, 2025, 2pgs.
"Exhibit 1024: Prosecution File History for U.S. Patent No. 9,955,195, filed on Aug. 3, 2012", Ex Parte Reexamination of U.S. Pat. No. 11,611,785 filed on Aug. 22, 2025, 977 pgs. (presented in 3 parts).
"Exhibit 1025: Prosecution File History for U.S. Pat. No. 10,645,429, filed on Mar. 15, 2018", Ex Parte Reexamination of U.S. Pat. No. 11,611,785 filed on Aug. 22, 2025, 1136 pgs. (presented in 4 parts).
"Exhibit 1025: Video compression, Library of Congress Authorities, MARC Display, LC control No. sh93007921, Retrieved on Jun. 11, 2025", Inter Partes Review of U.S. Pat. No. 11,611,785, IPR2025-01223, IPR filed Jun. 30, 2025, 2 pgs.
"Exhibit 1026: Handbooks, vade-mecums, etc, Library of Congress Authorities, MARC Display, LC control No. sh85058659, Retrieved on Jun. 11, 2025", Inter Partes Review of U.S. Pat. No. 11,611,785, IPR2025-01223, IPR filed Jun. 30, 2025, 2 pgs.
"Exhibit 1026: Prosecution File History for U.S. Pat. No. 10,931,982, filed on Feb. 12, 2020", Ex Parte Reexamination of U.S. Pat. No. 11,611,785 filed on Aug. 22, 2025, 3048 pgs. (presented in 10 parts).
"Exhibit 1027: Web publishing, Library of Congress Authorities, MARC Display, LC control No. sh96009077, Retrieved on Jun. 11, 2025", Inter Partes Review of U.S. Pat. No. 11,611,785, IPR2025-01223, IPR filed Jun. 30, 2025, 2 pgs.
"Exhibit 1028: Streaming video, Library of Congress Authorities, MARC Display, LC control No. sh2005005237, Retrieved on Jun. 11, 2025", Inter Partes Review of U.S. Pat. No. 11,611,785, IPR2025-01223, IPR filed Jun. 30, 2025, 2 pgs.
"Exhibit 1029: Streaming technology (Telecommunications), Library of Congress Authorities, MARC Display, LC control No. sh99000996, Retrieved on Jun. 11, 2025", Inter Partes Review of U.S. Pat. No. 11,611,785, IPR2025-01223, IPR filed Jun. 30, 2025, 2 pgs.
"Exhibit 1030: Amazon's Motion to Withdraw Petitioner for Inter Partes Review, IPR2025-01223 received for U.S. Pat. No. 11,611,785, issued on Aug. 21, 2025", Ex Parte Reexamination of U.S. Pat. No. 11,611,785 filed on Aug. 22, 2025, 10 pgs.
"Exhibit 1030: Webcasting, Library of Congress Authorities, MARC Display, LC control No. sh97008674, Retrieved on Jun. 11, 2025", Inter Partes Review of U.S. Pat. No. 11,611,785, IPR2025-01223, IPR filed Jun. 30, 2025, 2 pgs.
"Exhibit 1031: Declaration of Mina Ching", Inter Partes Review of U.S. Pat. No. 11,611,785, IPR2025-01223, IPR filed Jun. 30, 2025, 13 pgs.
"Exhibit 1031: Dismissal Prior to Institution of Trial received for U.S. Pat. No. 11,611,785, IPR2025-01223, issued on Aug. 21, 2025", Ex Parte Reexamination of U.S. Pat. No. 11,611,785 filed on Aug. 22, 2025, 5 pgs.
"Exhibit 1032: Curriculum Vitae of Sylvia D. Hall-Ellis, Ph.D., Updated: Jun. 2024", Inter Partes Review of U.S. Pat. No. 11,611,785, IPR2025-01223, IPR filed Jun. 30, 2025, 52 pgs.
"Exhibit 1034: Structural Similarity Index Measure", Wikipedia, Retrieved from internet <https://en.wikipedia.org/wiki/Structural_similarity_index_measure>, Retrieved on Jun. 27, 2025, Inter Partes Review of U.S. Pat. No. 11,611,785, IPR2025-01223, IPR filed Jun. 30, 2025, 9 pgs.
"Exhibit 1036: Term: Pixel Aspect Ratio (PAR), Federal Agencies Digitization Guidelines Initiative,", Retrieved from internet: <https://www.digitizationguidelines.gov/term.php?term=par>, Retrieved on Jun. 30, 2025, Inter Partes Review of U.S. Pat. No. 11,611,785, IPR2025-01223, IPR filed Jun. 30, 2025, 1 pg.
"Exhibit 1037: Terminal Disclaimer received for U.S. Appl. No. 17/181,996, mailed on Aug. 11, 2022", Ex Parte Reexamination of U.S. Pat. No. 11,611,785 filed on Aug. 22, 2025, 2 pgs.
Cermak et al., "Exhibit 1021: The Relationship Among Video Quality, Screen Resolution, and Bit Rate", IEEE Transactions on Broadcasting, Mar. 14, 2011, vol. 57, No. 2, doi: 10.1109/TBC2011.2121650, Inter Partes Review of U.S. Pat. No. 11,611,785, IPR2025-01223, IPR filed Jun. 30, 2025, pp. 258-262.
Moldovan et al., "Exhibit 1005: Subjective Assessment of BitDetect-A Mechanism for Energy-Aware Multimedia Content Adaptation", IEEE Transactions on Broadcasting, Sep. 2012, vol. 58, No. 3, doi: 10.1109/TBC2012.2191688, Ex Parte Reexamination of U.S. Pat. No. 11,611,785 filed on Aug. 22, 2025, pp. 480-492.
Moldovan et al., "Exhibit 1006: MediaMTool: Multimedia Content Management Tool", IEEE International Symposium on Broadband Multimedia Systems and Broadcasting, 2011, doi: 10.1109/BMSB.2011.5954907, Ex Parte Reexamination of U.S. Pat. No. 11,611,785 filed on Aug. 22, 2025, 7 pgs.
Ozer, "Exhibit 1033: The Essential Key to Producing High Quality Streaming Video", Retrieved from internet: < https://streaminglearningcenter.com/blogs/the-essential-key-toproducing-

(56) References Cited

OTHER PUBLICATIONS high-quality-streaming-video.html>, Retrieved on Jun. 27, 2025, Inter Partes Review of U.S. Pat. No. 11,611,785, IPR2025- 01223, IPR filed Jun. 30, 2025, 4 pgs.

Reed et al., "Exhibit 1013: Optimal Multidimensional Bit-Rate Control for Video Communication", IEEE Transactions on Image Processing, vol. 11, No. 8, Aug. 2002, doi: 10.1109/TIP.2002.801122, Inter Partes Review of U.S. Pat. No. 11,611,785, IPR2025-01223, IPR filed Jun. 30, 2025, pp. 873-885.

* cited by examiner

500

| Actual Resolution | DivX Plus Bitrate | Final Resolution | Frames Per Second | Level | Average Bitrate for Level | Maximum Profile Bitrate |
|---|---|---|---|---|---|---|
| 1920x1080 | 8969 | 1920x1080 | 30 | 9 | 8435 | 8400 |
| 1920x1080 | 8482 | 1920x1080 | 25 | | | |
| 1920x1040 | 7854 | 1920x1040 | 24 | | | |
| 1440x1080 | 5747 | 1920x1080 | 30 | 8 | 5378 | 5300 |
| 1440x1080 | 5438 | 1920x1080 | 25 | | | |
| 1920x816 | 5406 | 1920x816 | 24 | | | |
| 1920x800 | 5248 | 1920x800 | 24 | | | |
| 1440x1040 | 5053 | 1920x1040 | 24 | | | |
| 1440x816 | 3557 | 1920x816 | 24 | 7 | 3508 | 3500 |
| 1440x800 | 3459 | 1920x800 | 24 | | | |
| 1280x720 | 2736 | 1920x1080 | 30 | 6 | 2666 | 2400 |
| 1280x720 | 2596 | 1920x1080 | 25 | | | |
| 960x720 | 1895 | 1920x1080 | 30 | 5 | 1742 | 1750 |
| 1152x624 | 1860 | 1920x1040 | 24 | | | |
| 960x720 | 1802 | 1920x1080 | 25 | | | |
| 1280x544 | 1789 | 1920x816 | 24 | | | |
| 1152x480 | 1366 | 1920x800 | 24 | | | |
| 960x544 | 1281 | 1920x816 | 24 | 4 | 1144 | 1200 |
| 960x520 | 1220 | 1920x1040 | 24 | | | |
| 960x400 | 931 | 1920x800 | 24 | | | |
| 768x432 | 857 | 1920x1080 | 30 | 3 | 796 | 800 |
| 768x432 | 822 | 1920x1080 | 25 | | | |
| 768x416 | 783 | 1920x1040 | 24 | | | |
| 720x408 | 720 | 1920x816 | 24 | | | |
| 768x320 | 600 | 1920x800 | 24 | 2 | 600 | 600 |
| 576x312 | 456 | 1920x1040 | 24 | 1 | 418 | 400 |
| 640x272 | 445 | 1920x816 | 24 | | | |
| 512x288 | 407 | 1920x1080 | 30 | | | |
| 512x288 | 400 | 1920x1080 | 25 | | | |
| 576x240 | 382 | 1920x800 | 24 | | | |

FIG. 5

600

| Streaming Bitrate | Aspect Ratio, Frames Per Second | | | | |
|---|---|---|---|---|---|
| | 16:9, 29.97 or 30 | 16:9, 25 | 1.85:1, 23.976 or 24 | 2.35:1, 23.976 or 24 | 2.4:1, 23.976 or 24 |
| 400 | 768x432 | 768x432 | 768x416 | 768x328 | 768x320 |
| 600 | 768x432 | 768x432 | 768x416 | 768x328 | 768x320 |
| 800 | 768x432 | 768x432 | 768x416 | 768x328 | 768x320 |
| 1200 | 768x432 | 768x432 | 768x416 | 768x328 | 768x320 |
| 1750 | 1280x720 | 1280x720 | 1152x624 | 1280x544 | 1152x480 |
| 2400 | 1280x720 | 1280x720 | 1152x624 | 1280x544 | 1152x480 |
| 3500 | 1920x1080 | 1920x1080 | 1920x1040 | 1920x816 | 1920x800 |
| 5300 | 1920x1080 | 1920x1080 | 1920x1040 | 1920x816 | 1920x800 |
| 8400 | 1920x1080 | 1920x1080 | 1920x1040 | 1920x816 | 1920x800 |

FIG. 6

SYSTEMS AND METHODS FOR ENCODING AND STREAMING VIDEO ENCODED USING A PLURALITY OF MAXIMUM BITRATE LEVELS

CROSS-REFERENCE TO RELATED APPLICATIONS

The current application is a continuation of U.S. patent application Ser. No. 17/181,996, filed Feb. 22, 2021, which is a continuation of U.S. patent application Ser. No. 16/789,303, filed Feb. 12, 2020 and issued Feb. 23, 2021 as U.S. Pat. No. 10,931,982, which is a continuation of U.S. patent application Ser. No. 15/922,198, filed Mar. 15, 2018 and issued May 5, 2020 as U.S. Pat. No. 10,645,429, which is a continuation of U.S. patent application Ser. No. 13/600,046, filed Aug. 30, 2012, and issued Apr. 24, 2018 as U.S. Pat. No. 9,955,195, which claims priority to U.S. Provisional Patent Application No. 61/529,201, filed Aug. 30, 2011, the disclosures of which are incorporated herein by reference.

FIELD OF THE INVENTION

The present invention relates to the delivery of multimedia content, specifically streaming video content encoded at a variety of recommended maximum bitrates optimized for a variety of scaled display resolutions and network connection maximum data rates of playback devices receiving the streams.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth and CPU capacity) in real time and adjusting the quality of the streamed media accordingly.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by Divx, LLC of San Diego, California utilizes an extension of the Matroska container format, including elements that are not specified within the Matroska format.

SUMMARY OF THE INVENTION

Systems and methods in accordance with embodiments of the invention stream and play back video having a variety of resolutions, frame rates, and/or sample aspect ratios, where the video streams are encoded at one of a limited number of maximum bit rate levels. One embodiment includes a processor, and storage containing an encoding application and data relating combinations of resolution and frame rates to maximum bitrates, where a plurality of resolution and frame rates that are related to the same maximum bitrate form a maximum bitrate level. In addition, the encoding application configures the processor to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates.

In a further embodiment, the resolution and frame rates within a maximum bitrate level have optimal target maximum bitrates that are within a predetermined percentage of the highest optimal target maximum bitrate of a resolution and frame rate combination within the maximum bitrate level.

In another embodiment, the optimal target maximum bitrate of a resolution and frame rate combination is determined using a formula.

In a still further embodiment, the optimal target maximum bitrate of a resolution and frame rate combination is determined using experimentation.

In still another embodiment, the resolution and frame rates within a maximum bitrate level have optimal target maximum bitrates that are within a predetermined percentage of the optimal target maximum bitrate of at least one other resolution and frame rate combination within the maximum bitrate level.

In a yet further embodiment, the data relating combinations of resolution and frame rates to maximum bitrate levels relates the resolution and frame rates to maximum bitrates in the manner illustrated in FIG. 5.

Yet another embodiment includes a plurality of playback devices, where the playback devices have different display aspect ratios and utilize different types of network connections, and a streaming system comprising a plurality of servers on which a plurality of video streams are stored, where the plurality of video streams are encoded at different resolutions and frame rates. In addition, video streams stored on the streaming system are encoded using one of a plurality of maximum bitrate levels, where video streams having different resolutions and frame rates are encoded at the same maximum bitrate level, the playback devices are configured to support playback of video data encoded at maximum bitrates corresponding to a plurality of the maximum bitrate levels, the playback devices are configured to request video data from at least one video stream from the streaming system encoded at a maximum bitrate level supported by the playback device, and the playback devices are configured to playback video data encoded at a supported maximum bitrate level received from the streaming system.

A further embodiment again also includes a source encoder including storage containing data relating combinations of resolution and frame rates to maximum bitrate levels. In addition, the source encoder is configured to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates levels.

In another embodiment again, the data relating combinations of resolution and frame rates to maximum bitrate levels relates the resolution and frame rates to maximum bitrate levels in the manner illustrated in FIG. 5.

A further additional embodiment includes a machine readable medium containing processor instructions, where execution of the instructions by a processor causes the processor to perform a process for determining a set of maximum bitrate levels for encoding video data for use in a streaming system including playback devices having different display aspect ratios and network connections. In addition, the process includes selecting a set of resolution and frame rate combinations, determining the optimal target maximum bitrate for encoding a stream of video data at each resolution and frame rate combination, grouping the resolution and frame rate combinations into maximum bitrate levels based upon the optimal target maximum bitrates of the resolution and frame rate combinations utilizing at least one grouping criterion, and determining a target maximum bitrate for the resolution and frame rate combinations in a maximum bitrate level.

In another additional embodiment, the optimal target maximum bitrate of a resolution and frame rate combination is determined using a formula.

In a still yet further embodiment, the optimal target maximum bitrate of a resolution and frame combination is determined using experimentation.

In still yet another embodiment, the at least one grouping criterion groups resolution and frame rates within a maximum bitrate level that have optimal target maximum bitrates that are within a predetermined percentage of the highest optimal target maximum bitrate of a resolution and frame rate combination within the maximum bitrate level.

In a still further embodiment again, the at least one grouping criterion groups resolution and frame rates within a maximum bitrate level that have optimal target maximum bitrates that are within a predetermined percentage of the optimal target maximum bitrate of at least one other resolution and frame rate combination within the maximum bitrate level.

In still another embodiment again, determining a target maximum bitrate for the resolution and frame rate combinations in a maximum bitrate level includes selecting the maximum optimal target bitrate of a resolution and frame rate combination within the maximum bitrate level.

In a still further additional embodiment, determining a target maximum bitrate for the resolution and frame rate combinations in a maximum bitrate level includes selecting the minimum optimal target bitrate of a resolution and frame rate combination within the maximum bitrate level.

In still another additional embodiment, determining a target maximum bitrate for the resolution and frame rate combinations in a maximum bitrate level includes selecting the average optimal target bitrate of the resolution and frame rate combinations within the maximum bitrate level.

A yet further embodiment again also includes rounding the average optimal target bitrate using a predetermined rounding function.

In yet another embodiment again, determining a target maximum bitrate for the resolution and frame rate combinations in a maximum bitrate level includes selecting one of a plurality known network data rates based upon the optimal target data rate of at least one of the resolution and frame rate combinations within the maximum bitrate level.

BRIEF DESCRIPTION OF THE DRAWINGS

FIG. 5 is a table illustrating an example of a set of resolutions with encoded bitrates matched to maximum profile bitrates in accordance with an embodiment of the invention.

FIG. 6 is a table illustrating an example of sets of resolutions for different aspect ratios, where the resolutions in each set are encoded so that each aspect ratio is encoded at a resolution falling within each of the maximum bitrate levels in accordance with an embodiment of the invention.

DETAILED DISCLOSURE OF THE INVENTION

Figure 1:
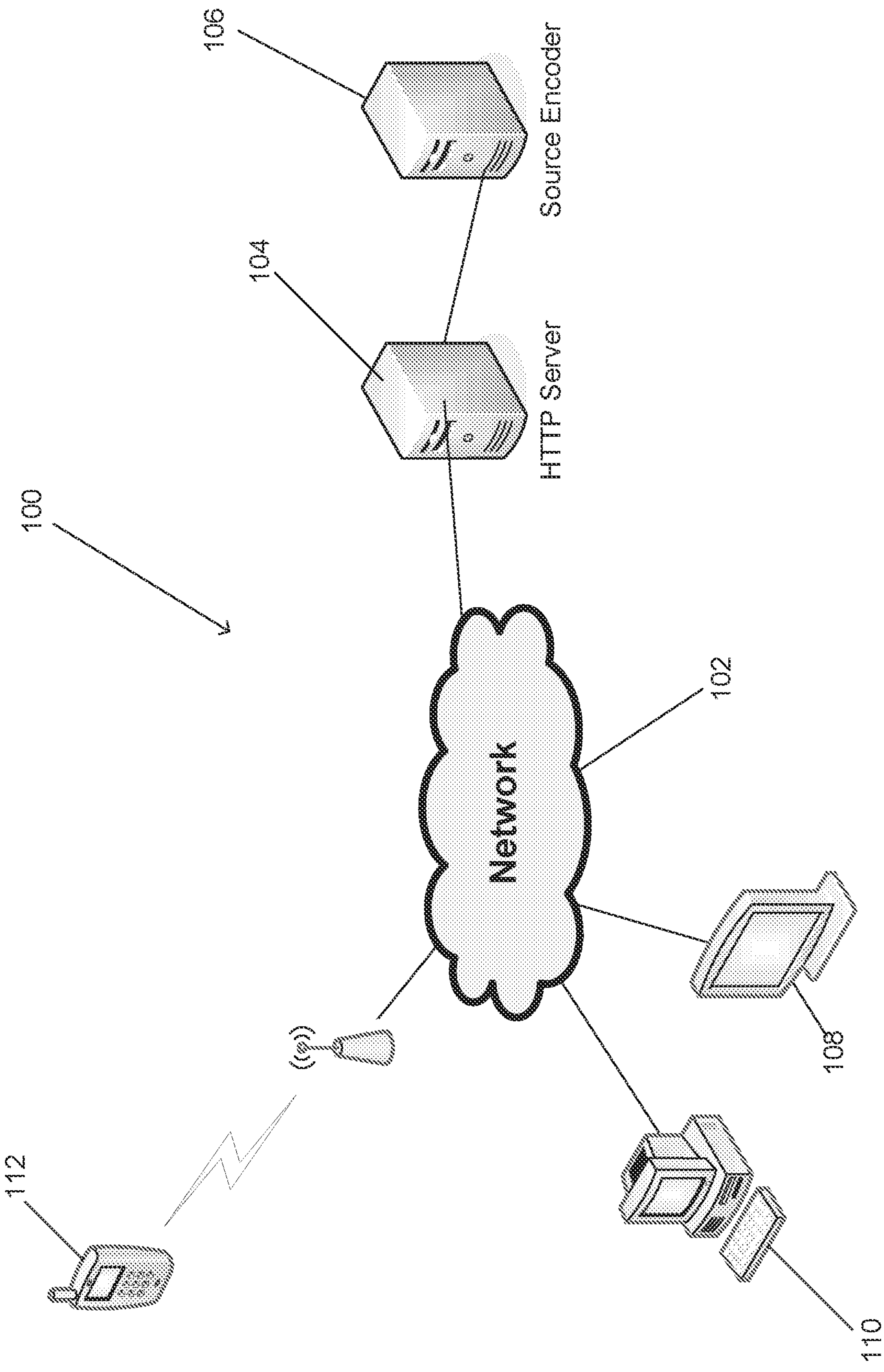
FIG. 1 is a network diagram of a level bitrate adaptive streaming system in accordance with an embodiment of the invention.

Turning now to the drawings, systems and methods for streaming and playing back video having a variety of resolutions, frame rates, and/or sample aspect ratios, where the video streams are encoded at one of a limited number of maximum bit rate levels, in accordance with embodiments of the invention are illustrated. Video data is typically encoded to achieve a target maximum bitrate. The quality of video encoded with a specific resolution, and frame rate typically does not improve appreciably beyond a specific maximum bitrate threshold. Beyond that threshold, increasing the resolution of the encoded video can increase video quality. A formula can be used to recommend an optimal target maximum bitrate at which to encode video content at a specific resolution and frame rate efficiently and with the highest video quality achievable at the selected resolution. Alternatively, the bitrate threshold at which video quality does not appreciably improve can be determined through testing. While it can be beneficial to determine the optimal maximum bitrate at which to encode a specific piece of video content to efficiently achieve the highest quality video at a specific resolution and frame rate, the delivery of a large number of streams of video content to a large variety of playback devices can be simplified by specifying a limited number of maximum bitrates at which video can be encoded irrespective of the optimal target maximum bitrate for a specific frame rate and resolution combination. The ability of a specific type of playback device to playback video encoded at a specific maximum bitrate is typically confirmed via testing. Therefore, the smaller the number of maximum bitrate levels supported by a streaming system, the simpler the process of testing each playback device to confirm its ability to playback video encoded at supported target maximum bitrates. Accordingly, streaming systems can utilize a set of maximum bitrate levels to simply the process of certifying playback devices for use within the streaming system. When video is encoded for distribution via the streaming system at a number of different resolutions and frame rates, the maximum bitrate levels appropriate to each of the specific resolution and frame combinations can be selected and used as the target maximum bitrates when encoding the streams of video data.

In several embodiments, the process of selecting a set of maximum bitrate levels to use when encoding video for distribution via a streaming system involves determining the most popular aspect ratios and frame rates for video content and then determining all of the streaming resolutions and frame rates at which the video content will be encoded. When the most likely resolution and frame rate combinations are identified, the optimal target maximum bitrates for each resolution and frame rate combination can be determined using an appropriate bitrate formula or testing. Bitrate formulas that can be utilized to determine a optimal target maximum bitrate at which to encode video at a specified resolution and frame rate are discussed in U.S. patent application Ser. No. 13/432,521 entitled "Systems and Methods for Encoding Alternative Streams of Video for Playback on Playback Devices having Predetermined Display Aspect Ratios and Network Connection Maximum Data Rates", to Soroushian et al., filed Mar. 28, 2012 (the disclosure of which is incorporated by reference herein in its entirety). The optimal target maximum bitrates can then be grouped into levels and a maximum bitrate determined for each level.

In several embodiments, the resolution and frame rate combinations can be grouped into levels based upon their corresponding optimal target maximum bitrates so that all optimal target maximum bitrates within a group are within a predetermined percentage of the highest optimal target maximum bitrate within the group. In many embodiments, the resolution and frame rate combinations can be grouped into levels based upon their corresponding optimal target maximum bitrates so that each optimal target maximum bitrate within the group is within a predetermined percentage of the next highest optimal target maximum bitrate within the group. In other embodiments, any of a variety of grouping criteria can be utilized in accordance with embodiments of the invention including criteria that group resolution and frame rate combinations into a predetermined number of groups based upon their optimal target maximum bitrates.

The maximum bitrate that is assigned to the resolution and frame rate combinations at a level can be determined in any number of different ways including (but not limited to) the average bitrate of the optimal target maximum bitrates included in the group, the minimum bitrate of the optimal target maximum bitrates included in the level, and/or a typical network connection data rate that is close to one or more of the target maximum bitrates in the level. The maximum bitrate determined for each level can then be used to encode content at the resolution and frame rate combinations within the level. In several embodiments, the process of determining the maximum bitrate levels is performed in a first process and the maximum bit rate levels and the resolution and frame rate combinations that fall within each level can be provided to a source encoding system for use in the encoding of video content.

In many embodiments, the streaming system is an adaptive bitrate streaming system. Adaptive bitrate streaming systems can stream alternative streams of video data encoded at maximum bitrates. In order to provide the highest quality video experience independent of the network data rate, the adaptive bitrate streaming systems switch between the available streams of video data throughout the delivery of the video data according to a variety of factors, including, but not limited to, the available network data rate and video decoder performance. Systems and methods for switching between video streams during playback are disclosed in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated by reference herein in its entirety. In adaptive bitrate streaming systems, a number of alternative streams are likely to be encoded having the same aspect ratio, but different resolutions. Systems and methods for selecting the resolutions at which to encode alternative streams of video for use in adaptive bitrate streaming systems are described in U.S. patent application Ser. No. 13/430,032 entitled "Selection of Resolutions for Seamless Resolution Switching of Multimedia Content" to Soroushian et al., filed Mar. 26, 2012 (the disclosure of which is incorporated by reference herein in its entirety). Although much of the discussion that follows references adaptive bitrate streaming systems, systems and methods in accordance with embodiments of the invention can be utilized in streaming systems that are non-adaptive. Systems and methods for streaming video at a plurality of resolution and frame rates using a smaller set of maximum bit rate levels in accordance with embodiments of the invention are discussed further below.

System Overview

A streaming system in accordance with an embodiment of the invention is illustrated in FIG. 1. The streaming system 100 includes a source encoder 106 configured to encode source video as a number of alternative video streams. Alternative streams are streams that encode the same media content in different ways. In many instances, alternative streams encode media content (such as but not limited to video) at different resolution and sample aspect ratio combinations and different maximum bitrates. In a number of embodiments, alternative video streams form sets of alternative video streams encoded with the same aspect ratio corresponding to the display aspect ratio of a set of playback devices. In many embodiments, the source encoder possesses a lookup table that indexes resolution and frame rate combinations to a predetermined set of maximum bitrate levels. The source encoder uses the lookup table to determine the target maximum bitrate at which to encode video at a specific resolution and frame rate combination.

In many embodiments, the streaming system is an adaptive bitrate streaming system and the source encoder encodes each alternative stream into a separate container file and generates a top level index file describing each of the streams contained within the container files. The top level index file and the container files are uploaded to an HTTP server 104. In other embodiments, the container files are uploaded to an HTTP server 104 and the top level index file is dynamically generated in response to a request for a specific piece of content by a playback device. In the illustrated embodiment, the source encoder is a server. In other embodiments, the source encoder can be any processing device including a processor and sufficient resources to perform the transcoding of source media (including but not limited to video, audio, and/or subtitles).

In the illustrated embodiment, playback devices include personal computers 110, CE players 108, and mobile phones 112. In other embodiments, playback devices can include consumer electronics devices such as DVD players, Blu-ray players, televisions, set top boxes, video game consoles, tablets, and other devices that are capable of connecting to a server via HTTP and playing back encoded media. In the illustrated embodiment, a variety of playback devices use HTTP or another appropriate stateless protocol to request portions of a top level index file and the container files via a network 102 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive streaming process.

Once playback of content from the initial set of streams commences, the playback device utilizes the top level index to perform adaptive bitrate streaming of the content in response to changes in streaming conditions. In many adaptive bitrate streaming systems, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions results in a stream switch to a set of streams at a lower resolution utilizing less bandwidth and resulting in the playback device transitioning to a phase in which the playback device assumes unstable operating conditions, buffers less content, and responds rapidly to variations in streaming conditions.

Source Encoders

Figure 2:
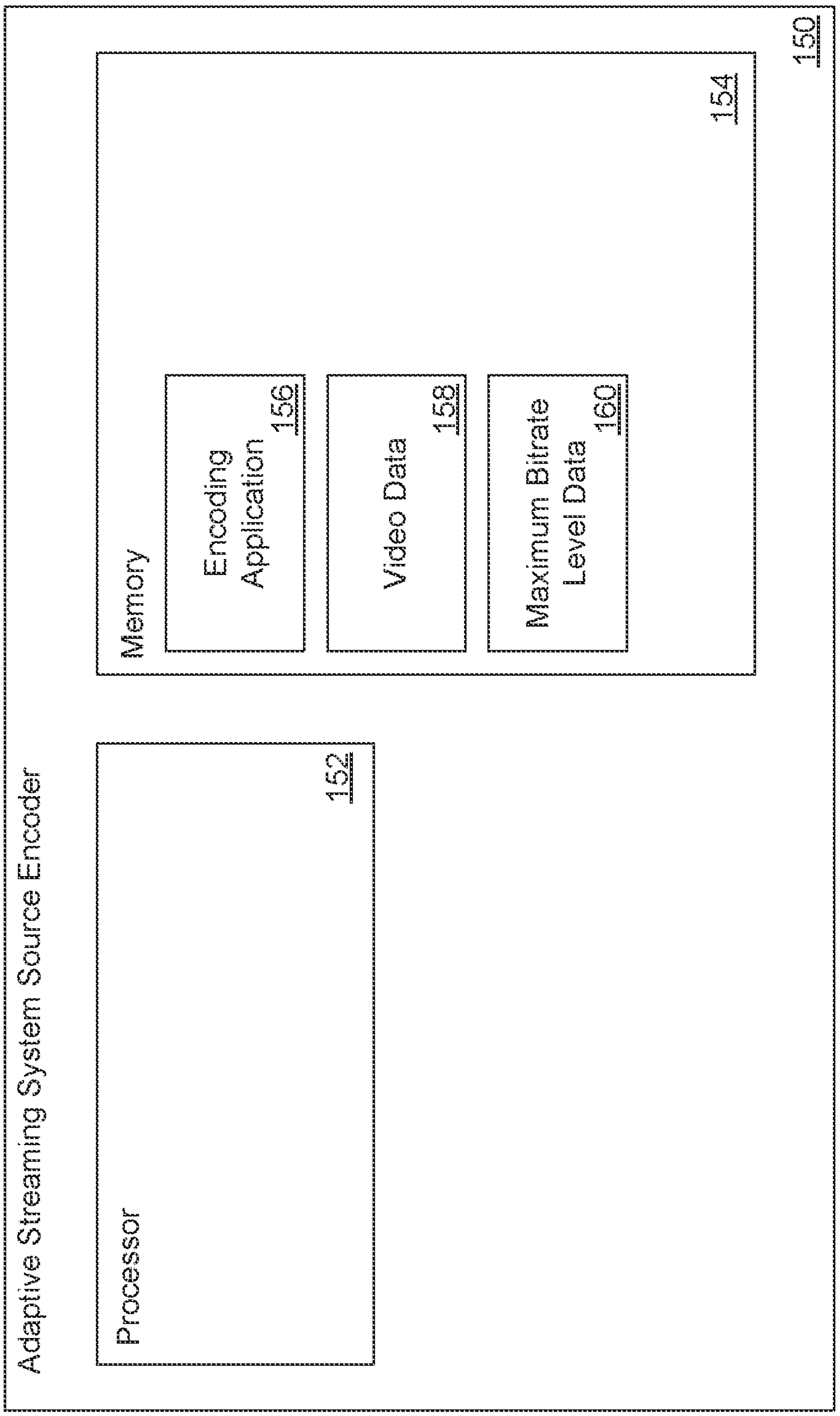
FIG. 2 conceptually illustrates a playback device configured to deliver video data encoded utilizing target maximum bitrate levels in accordance with an embodiment of the invention.

Source encoders in accordance with embodiments of the invention are utilized to encode source content at any of a number of resolutions and frame rates at target maximum bitrates determined using a set of predetermined maximum bitrate levels. The basic architecture of a source encoder in accordance with an embodiment of the invention is illustrated in FIG. 2. The source encoder 150 includes a processor 152 in communication with memory 154. In the illustrated embodiment, the memory 154 includes an encoding application 156, video data 158, which can include (but is not limited to) source video data and encoded alternative streams of video data, and data describing the target maximum bitrates at which to encode a plurality of resolution and frame rate combinations 160. In many embodiments, the target maximum bitrates are selected from a set of predetermined maximum bitrate levels that includes a number of levels that is smaller than the number of resolution and frame rate combinations. In certain embodiments, a plurality of resolution and frame rate combinations is associated with each of a plurality of maximum bitrate levels. In several embodiments, the data concerning target maximum bitrate levels is a lookup table that is indexed by resolution and frame rate combinations and associates specific maximum bitrate levels with specific resolution and frame rate combinations. In other embodiments, any of a variety of data structures can be utilized to identify a target maximum bitrate from a predetermined set of target maximum bitrates to utilize in the encoding of a specific resolution and frame rate combination.

Although a specific architecture is illustrated in FIG. 2, any of a variety of architectures including architectures where the application and/or set of predetermined maximum bitrate levels are located on disk or some other form of storage and is loaded into memory at runtime can be utilized to implement a source encoder in accordance with an embodiment of the invention. Furthermore, any of a variety of system architectures including (but not limited) to the system architecture illustrated in FIG. 1 can be utilized to perform video delivery in accordance with embodiments of the invention. Systems and methods for determining a predetermined set of maximum bitrate levels at which to encode video at a plurality of resolution and frame combinations in accordance with embodiments of the invention are discussed further below.

Determining Target Maximum Bitrates

The initial step in determining a set of predetermined bitrates at which to encode video is determining the characteristics of the video that is likely to be streamed by a streaming system. Once the resolution and frame rate combinations of the video that is likely to be streamed are identified, the optimal target maximum bitrate of each resolution and frame rate combination can be calculated and the results used to determine a set of maximum bitrate levels at which video can be encoded for different resolution and frame rate combinations. The term optimal target maximum bitrate can be used to describe the maximum bitrate beyond which video quality at a specific resolution and frame rate does not appreciably increase. Stated another way, the optimal target maximum bitrate is the lowest bitrate at which the highest quality video can be achieved at a given resolution and frame rate. In using a term such as optimal target maximum bitrate, there is typically an acknowledgement that video quality is subjective. Therefore, there is no concept of a "true" optimal target maximum bitrate. The optimal target maximum bitrate is simply a value that can be determined through subjective experimentation. In many instances, observations concerning target maximum bitrates have resulted in the definition of functions that can be utilized to calculate an optimal target maximum bitrate based upon the resolution and frame rate. As is discussed further below, the technique for determining an optimal target maximum bitrate is not as important as the manner in which that maximum bitrates are utilized to select maximum bitrate levels.

Figure 3:
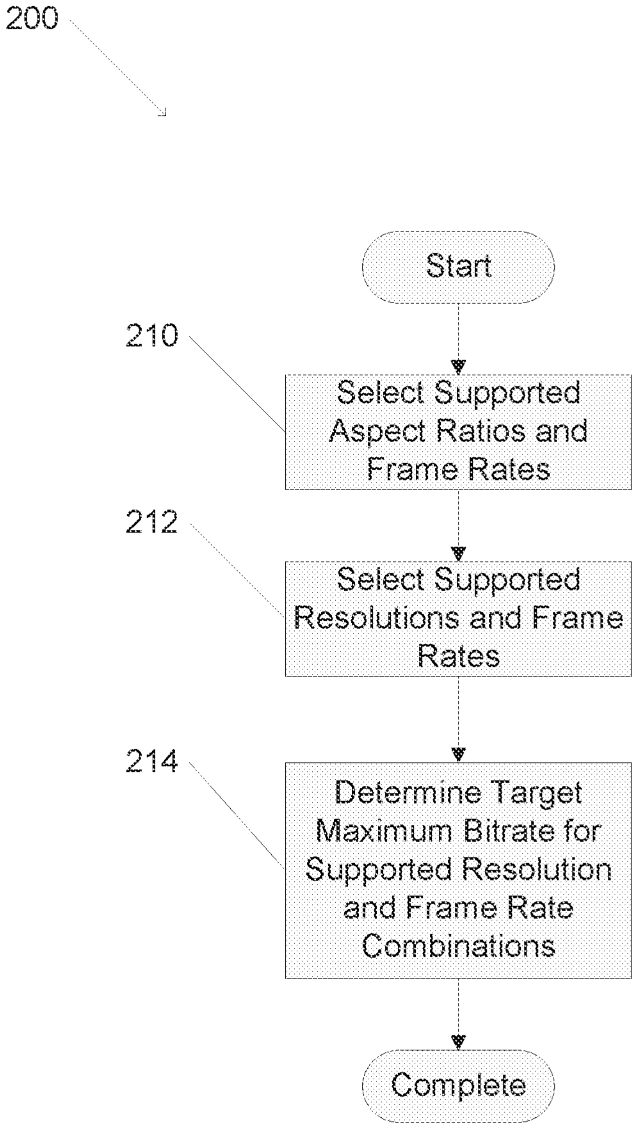
FIG. 3 is a flow chart illustrating a process for determining a set of bitrates given video data in accordance with an embodiment of the invention.

A process for determining optimal target maximum bitrates for video streamed within an adaptive bitrate streaming system in accordance with embodiments of the invention is illustrated in FIG. 3. The process 200 commences by selecting 210 display aspect ratios and frame rates supported by the streaming system. The display aspect ratios and frame rates are typically determined based upon popular display aspect ratios and frame rates supported by playback devices that are likely to be used to stream video within the streaming system. Resolutions can be determined 212 based upon the selected display aspect ratios and, in many instances, based upon anticipated maximum data rates supported within the streaming system. Processes for determining resolutions at which to encode alternative video streams based upon the display aspect ratio of a playback device are described in U.S. patent application Ser. No. 13/430,032 entitled "Selection of Resolutions for Seamless Resolution Switching of Multimedia Content" to Soroushian et al., filed Mar. 26, 2012 (incorporated by reference above).

An optimal target maximum bitrate is determined (214) for each selected frame rate and resolution combination. In several embodiments, maximum bitrate targets are determined 214 utilizing a bitrate formula where the bitrate formula may utilize various aspects of the video data, including frame rate, resolution, and other pertinent information as input. Examples of appropriate bitrate formulas are described in U.S. Patent Application No. "Systems and Methods for Encoding Alternative Streams of Video for Playback on Playback Devices having Predetermined Display Aspect Ratios and Network Connection Maximum Data Rates", to Soroushian et al., filed Mar. 28, 2012 (incorporated by reference above). In a number of embodiments, the determination (214) of the optimal target maximum bitrate for a specific resolution and frame rate combination may involve subjective or objective quality evaluation methods of the video data encoded at the target maximum bitrate. Once the optimal target maximum bitrates for each of the resolution and frame rate combinations is determined, a process can then be performed to identify a set of maximum bitrate can be selected based upon the optimal target maximum bitrates. Processes for determining a set of maximum bitrate levels based upon a set of optimal target maximum bitrates associated with specific resolution and frame rate combinations in accordance with embodiments of the invention are discussed below.

Generating Sets of Maximum Bitrate Levels

Figure 4:
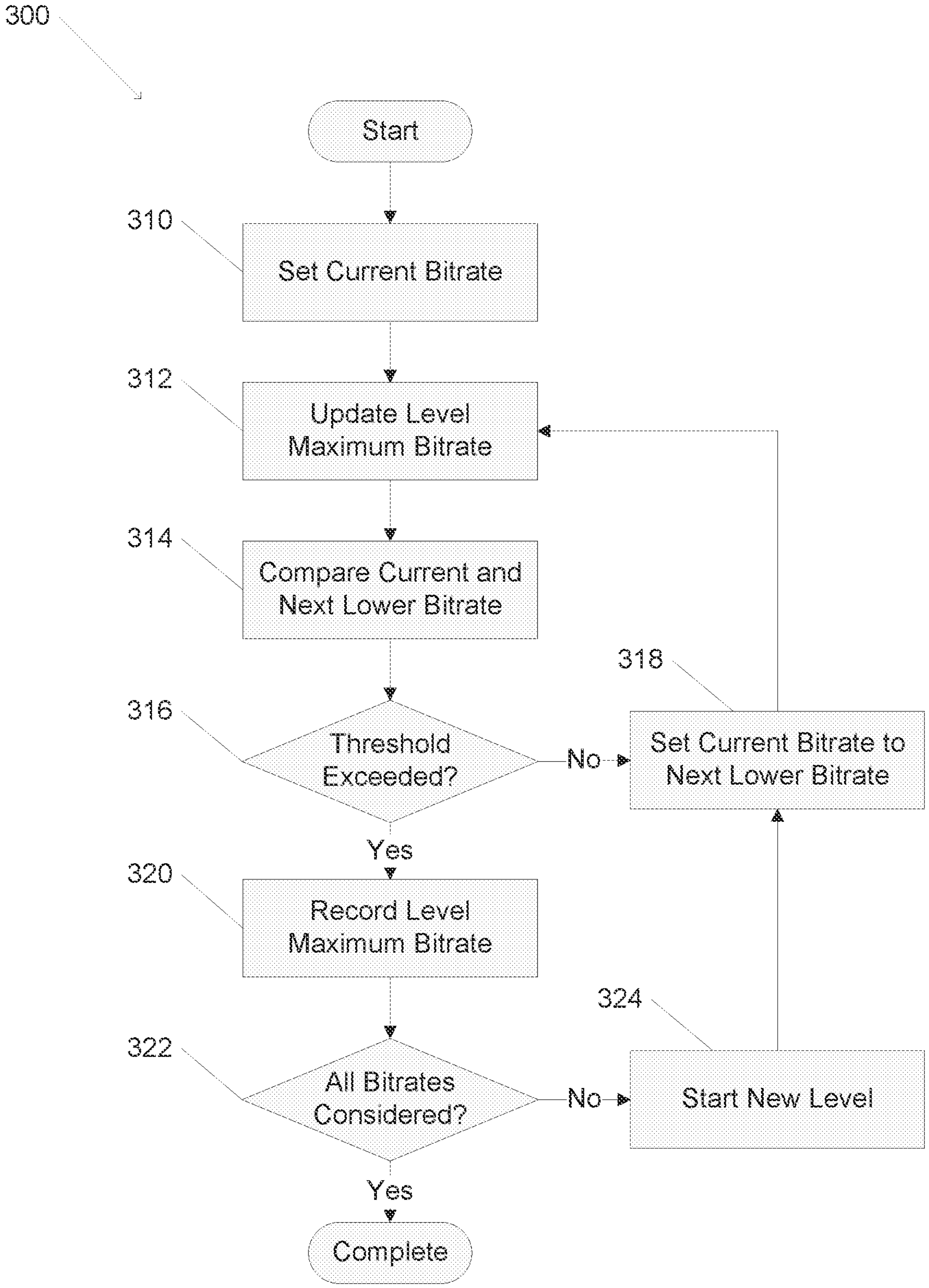
FIG. 4 is a flow chart illustrating a process for determining a set of encoding maximum bitrate levels in accordance with an embodiment of the invention.

A process for determining a set of maximum bitrate levels based upon a set of optimal target maximum bitrates associated with specific resolution and frame rate combinations in accordance with an embodiment of the invention is illustrated in FIG. 4. The process 300 involves setting (310) the current bitrate to the highest optimal target maximum bitrate from a set of optimal target maximum bitrates. The level maximum bitrate is updated (312) utilizing the current bitrate. In many embodiments, the level maximum bitrate may be set to the average, median, minimum, or maximum combination of the bitrates in the current bitrate level. In a number of embodiments, the level average bitrate is a linear or non-linear combination of the bitrates in the current bitrate level. In other embodiments, the level maximum bitrate can be determined after all of the levels are identified.

The current bitrate is compared (314) to the next lower optimal target maximum bitrate in the input set of optimal target maximum bitrates. A decision (316) is then made. Given a threshold value, if the difference between the current bitrate and the next lower optimal target maximum bitrate does not exceed the threshold value, the current bitrate is included in the optimal maximum bitrate level. In other embodiments, any of a variety of criteria can be utilized to determine whether to include a specific resolution and frame rate combination in a level based upon the optimal target maximum bitrate for the resolution and frame combination. Accordingly, the current bitrate is set (318) to the next lower optimal target maximum bitrate and the process loops back to updating (312) the level maximum bitrate. In several embodiments, the threshold value is a percentage difference between consecutive bitrate levels, such as 10%. In several embodiments, the threshold value is a fixed value or is related in a non-linear manner to the value of the current bitrate. If the threshold value is exceeded, the level maximum bitrate is recorded (320) in the set of maximum bitrate levels. In several embodiments, the level bitrate level is rounded to the closest whole number. Another decision (322) is made. If target maximum bitrates remain to be considered, a new level bitrate is started (324), the current bitrate is set (318) to the next highest optimal target maximum bitrate, and the process continues updating (312) the level maximum bitrate of the new level. The process 300 is complete when all bitrates have been considered.

In a number of embodiments, the maximum bitrate levels and the resolutions and frame rates assigned to specific groups can be modified in accordance with the requirements of a specific application. For example, the optimal maximum bitrate at each level can be rounded down (or up) to the closest whole-number multiple of 10, 100 or 1000. Although a specific process is illustrated in FIG. 4, any of a variety of processes can be utilized including a process that groups resolution and frame rate combinations into a predetermined number of levels based upon one or more criteria including (but not limited to) maximizing the similarity of the optimal target maximum bitrates of the resolution and frame combinations at each level.

An example of a grouping of a set of maximum bitrate levels defined based on the resolution, and frame rate of encoded video in accordance with an embodiment of the invention is illustrated in FIG. 5.

For example, in many embodiments of the invention 1440×816 is a sub-resolution for video data having a primary resolution of 1920×816 at 24 frames per second with a sample aspect ratio of 4:3. Likewise, the resolution 1440×800 is a sub-resolution for video data having a primary resolution of 1920×800 at 24 frames per second with a sample aspect ratio of 4:3. The encoded maximum bitrate of the 1440×816 video is 3,557 Kbps and the encoded maximum bitrate of the 1440×800 video is 3,459 Kbps. In several embodiments, 1440×816 and 1440×800 are within a threshold value of each other and no other resolutions are within the threshold value. The average bitrate for these resolutions is 3,508 Kbps, rounded to 3,500 Kbps. In accordance with an embodiment of the invention, 3,500 Kbps will be one maximum bitrate in the set of maximum profile bitrates.

In order to stream video content at each maximum bitrate level, a variety of resolutions may be utilized depending on the sample aspect ratio and frame rate of the source content. An example profile of recommended resolutions based on the frame rate and primary aspect ratio of the video content for various maximum bitrates is illustrated in FIG. 6. In many embodiments of the invention, the same resolution may be utilized for multiple frame rates and sample aspect ratios in order to maximize the subjective and/or objective quality of the streamed video data.

Although the present invention has been described in certain specific aspects, many additional modifications and variations would be apparent to those skilled in the art. It is therefore to be understood that the present invention may be practiced otherwise than specifically described, including playback devices where the set of streaming switching conditions utilized by the playback device are continuously changing, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

File Structure

Figure 7:
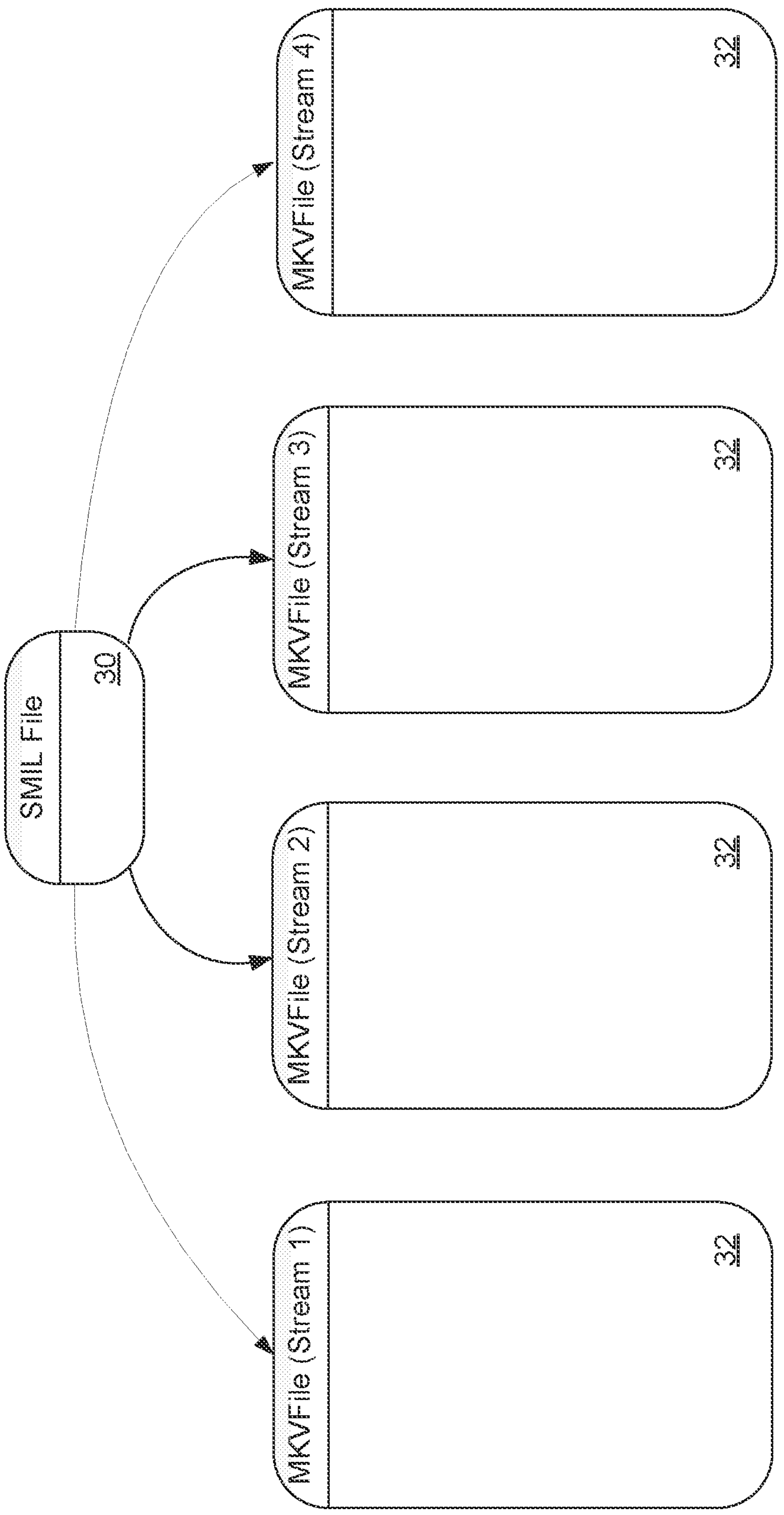
FIG. 7 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 7. The files utilized in the adaptive bitrate streaming of the source media include a top level index 30 and a plurality of container files 32 that each contain at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single stream. For example, the stream could be one of a number of alternate video streams, an audio stream, one of a number of alternate audio streams, a subtitle stream, one of a number of alternate subtitle streams, a trick play stream, or one of a number of alternate trick play streams. In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each include an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

Top Level Index SMIL Files

In a number of embodiments, the top level index file utilized in the adaptive bitrate streaming of media is a SMIL file, which is an XML file that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams available for use in adaptive bitrate streaming and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML: LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is follows:

```
<param
  name="header-request"
  value="1026"
  valuetype="data"/>
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
  name="mime"
  value="V_MPEG4/ISO/AVC"
  valuetype="data"/>
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
  name="vbv"
  value="1000"
  valuetype="data"/>
```

An example of VIDEO element including the attributes discussed above is as follows:

```
<video
  src="http://cnd.com/video1_620 kbps.mkv"
  systemBitrate="620"
  width="480"
  height="270">
  <param
    name="vbv"
    value="1000"
    valuetype="data"/>
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system a VIDEO element that references a trick play track is indicated by the systemProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
  src="http://cnd.com/video_test2_600 kbps.mkv"
  systemProfile="DivXPlusTrickTrack"
  width="480"
  height="240">
  <param name="vbv" value="1000"
    valuetype="data"/>
  <param name="header-request" value="1000"
    valuetype="data"/>
  </video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
  src="http://cnd.com/audio_test1_277 kbps.mkv"
  xml:lang="gem"
<param
  name="reservedBandwidth"
  value="128"
  valuetype="data"/>
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
  src="http://end.com/text_stream_ger.mkv"
  xml:lang="gem"
<param
  name="reservedBandwidth"
  value="32"
  valuetype="data"/>
/>
```

In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
  <video src="http://cnd.com/video_test1_300
    kbps.mkv"/>
  <video src="http://cnd.com/video_test2_900
    kbps.mkv"/>
  <video src="http://cnd.com/video_test3_1200
    kbps.mkv"/>
</switch>
```

The SWTICH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
  <audio
    src="http://cnd.com/english-audio.mkv"
    xml: lang="eng"/>
  <audio
    src="http://cnd.com/french-audio.mkv"
    xml.lang="fre"/>
</excl>
```

An example of a top level index SMIL file that defines the attributes and parameters of two alternative video levels, an audio stream and a subtitle stream in accordance with an embodiment of the invention is as follows:

```
<?xml version="1.0" encoding="utf-8"?>
<smil xmlns="http://www.w3.org/ns/SMIL" ver-
  sion="3.0" baseProfile="Language">
  <head>
  </head>
  <body>
    <par>
      <switch>
        <video
        src="http://cnd.com/video_test1_300
        kbps.mkv"
        SystemBitrate="300"
        vbv="600"
        width="320"
        height="240">
        <param
        name="vbv"
        value="600"
        valuetype="data"/>
        <param
        name="header-request"
        value="1000"
        valuetype="data"/>
```

```
      </video>
      <video
      src="http://cnd.com/video_test2_600
      kbps.mkv"
      SystemBitrate="600"
      vbv="900"
      width="640"
      height="480">
      <param
      name="vbv"
      value="1000"
      valuetype="data"/>
      <param
      name="header-request"
      value="1000"
      valuetype="data"/>
      </video>
    </switch>
    <audio
      src="http://cnd.com/audio.mkv"
      xml:lang="eng">
      <param
      name="header-request"
      value="1000"
      valuetype="data"/>
      <param             name="reservedBandwidth"
      value="128" valuetype="data"/>
    </audio>
    <textstream
      src="http://cnd.com/subtitles.mkv"
      xml: lang="eng">
      <param
      name="header-request"
      value="1000"
      valuetype="data"/>
      <param             name="reservedBandwidth"
      value="32" valuetype="data"/>
    </textstream>
  </par>
 </body>
</smil>
```

The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. The use of top level index files to enable playback of encoded media using adaptive bitrate streaming in accordance with embodiments of the invention is discussed further below.

Storing Media in Matroska Files for Adaptive Bitrate Streaming

Figure 8:
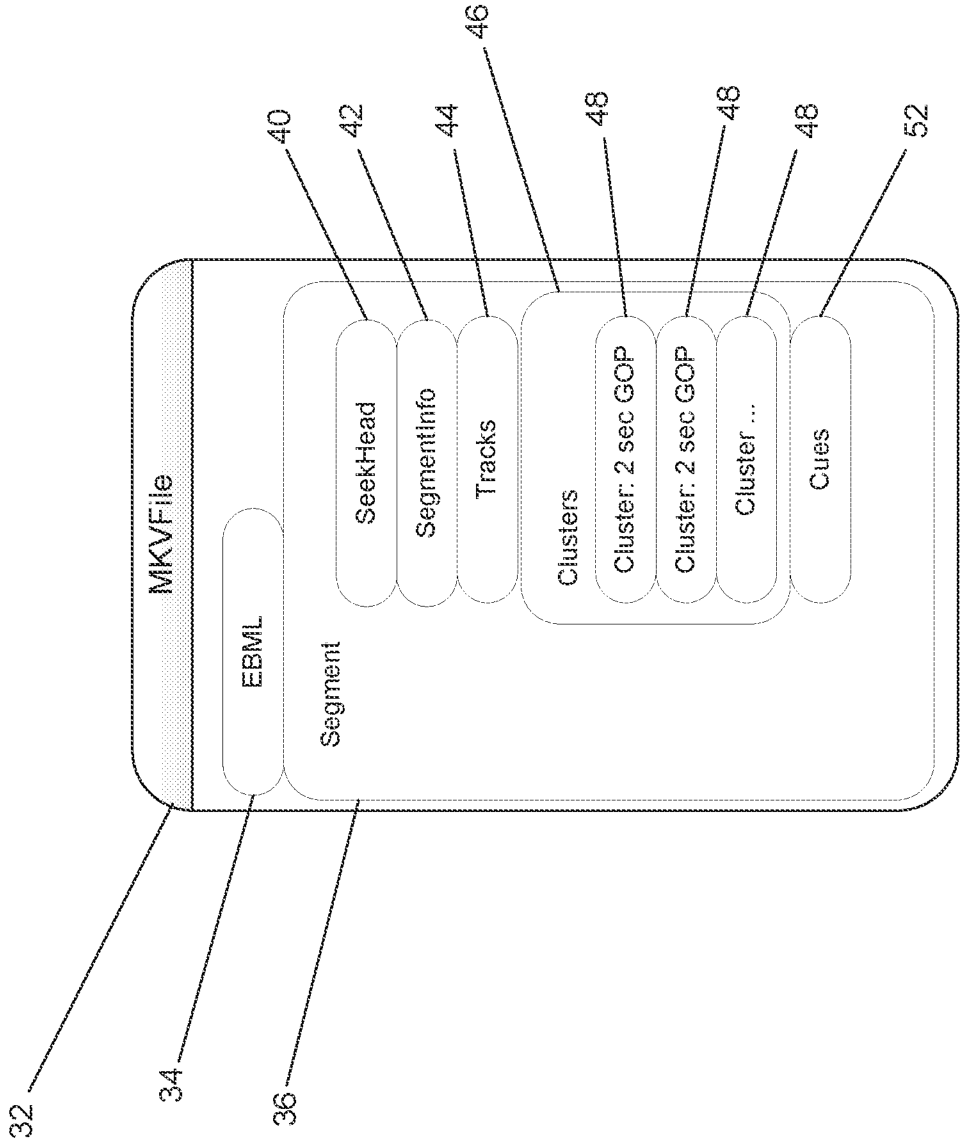
FIG. 8 conceptually illustrates a specialized Matroska container file incorporating a modified Cues element in accordance with an embodiment of the invention.

A Matroska container file used to store encoded video in accordance with an embodiment of the invention is illustrated in FIG. 8. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44. These standard elements describe the media contained within the Matroska container file. The Segment element 36 also includes a standard Clusters element 46. As is described below, the manner in which encoded media is inserted within individual Cluster elements 48 within the Clusters element 46 is constrained to improve the playback of the media in an adaptive streaming system. In many embodiments, the constraints imposed upon the encoded video are consistent with the specification of the Matroska container file format and involve encoding the video so that each cluster includes at least one closed GOP commencing with an IDR frame. In addition to the above standard elements, the Segment element 36 also includes a modified version of the standard Cues element 52. As is discussed further below, the Cues element includes specialized CuePoint elements (i.e. non-standard CuePoint elements) that facilitate the retrieval of the media contained within specific Cluster elements via HTTP.

The constraints imposed upon the encoding of media and the formatting of the encoded media within the Clusters element of a Matroska container file for adaptive bitrate streaming and the additional index information inserted within the container file in accordance with embodiments of the invention is discussed further below.

Encoding Media for Insertion in Cluster Elements

An adaptive bitrate streaming system provides a playback device with the option of selecting between different streams of encoded media during playback according to the streaming conditions experienced by the playback device. In many embodiments, switching between streams is facilitated by separately pre-encoding discrete portions of the source media in accordance with the encoding parameters of each stream and then including each separately encoded portion in its own Cluster element within the stream's container file. Furthermore, the media contained within each cluster is encoded so that the media is capable of playback without reference to media contained in any other cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

Encoding Source Media for Adaptive Bitrate Streaming

Figure 9:
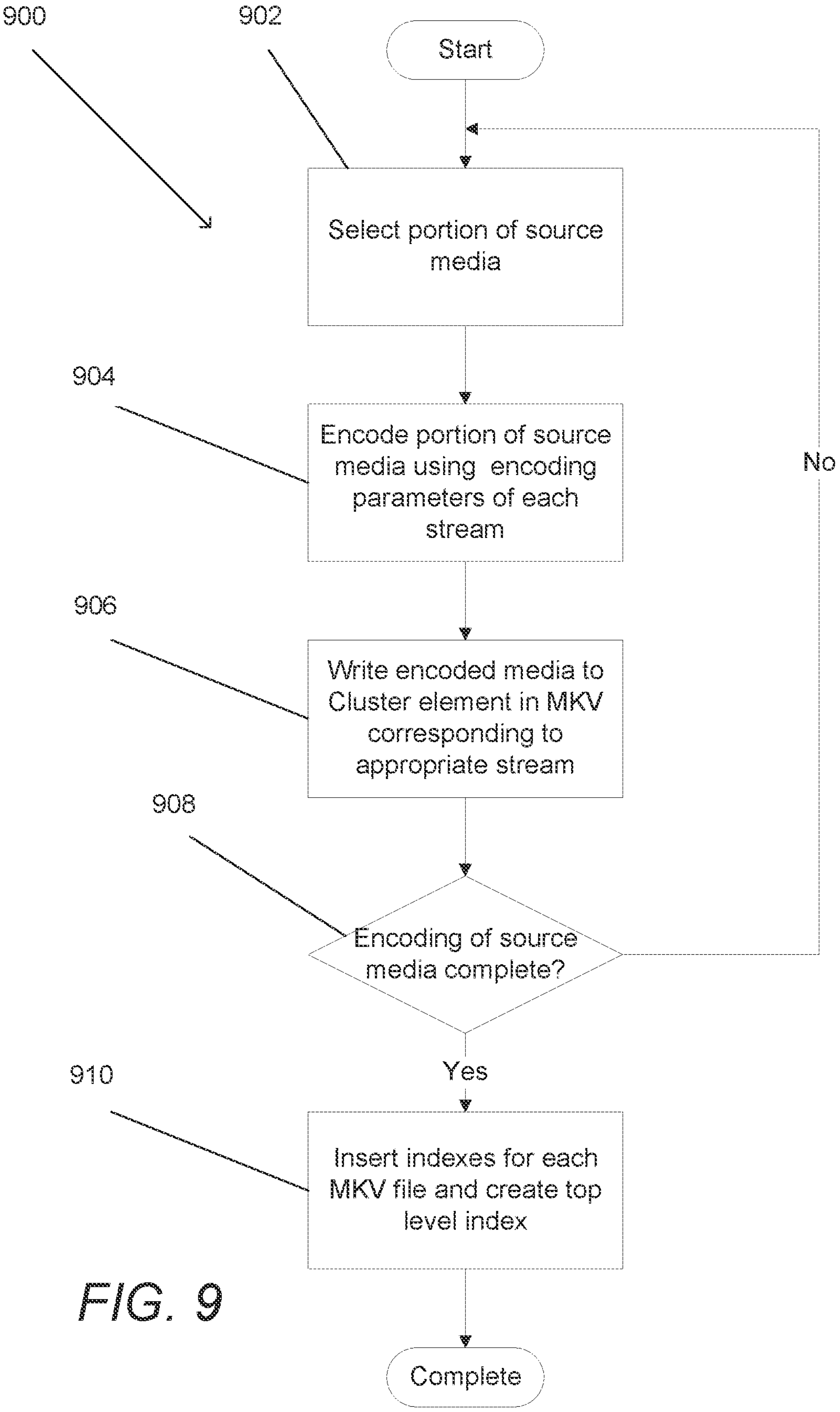
FIG. 9 is a flow chart illustrating a process for encoding source media for adaptive bitrate streaming in accordance with an embodiment of the invention.

A process for encoding source media as a top level index file and a plurality of Matroska container files for use in an adaptive bitrate streaming system in accordance with an embodiment of the invention is illustrated in FIG. 9. The encoding process 900 commences by selecting (902) a first portion of the source media and encoding (904) the source media using the encoding parameters for each stream. When the portion of media is video, then the portion of source video is encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate. In many embodiments, the source media is itself encoded and the encoding process (904) involves transcoding or transrating of the encoded source media according to the encoding parameters of each of the alternative streams supported by the adaptive bitrate streaming system.

Once the source media has been encoded as a set of alternative portions of encoded media, each of the alternative portions of encoded media is inserted (906) into a Cluster element within the Matroska container file corresponding to the stream to which the portion of encoded media belongs. In many embodiments, the encoding process also constructs indexes for each Matroska container file as media is inserted into Cluster elements within the container. Therefore, the process 900 can also include creating a CuePoint element that points to the Cluster element inserted within the Matroska container file. The CuePoint element can be held in a buffer until the source media is completely encoded. Although the above process describes encoding each of the alternative portions of encoded media sequentially in a single pass through the source media, many embodiments of the invention involve performing a separate pass through the source media to encode each of the alternative streams.

Referring back to FIG. 9, the process continues to select (902) and encode (904) portions of the source media and then insert (906) the encoded portions of media into the Matroska container file corresponding to the appropriate stream until the entire source media is encoded for adaptive bitrate streaming (908). At which point, the process can insert an index (910) into the Matroska container for each stream and create a top level index file that indexes each of the encoded streams contained within the Matroska container files. As noted above, the indexes can be created as encoded media and inserted into the Matroska container files so that a CuePoint element indexes each Cluster element within the Mastroska container file. Upon completion of the encoding, each of the CuePoint elements can be included in a Cues element and the Cues element can be inserted into the Matroska container file following the Clusters element.

What is claimed is:

1. A method for encoding source content as a plurality of alternative video streams and adaptively streaming the plurality of alternative video streams, each having a bitrate, the method comprising:

identifying source video content;

identifying a plurality of resolutions for encoding of video content; and for each particular resolution of the plurality of resolutions:

encoding at least a portion of the source video content multiple times to produce multiple different encoded versions, each encoded version using a combination of the particular resolution with a different target bitrate from a plurality of different target bitrates;

evaluating each of the multiple different encoded versions, using an objective quality evaluation method;

selecting the resolution and target bitrate of one of the multiple different encoded versions as a chosen resolution and bitrate combination for at least a portion of an alternative stream from a plurality of alternative streams based on the evaluations of the multiple different encoded versions; and writing the at least a portion of the alternative stream having the chosen resolution and bitrate combination to a video container file.

2. The method of claim 1, further comprising generating entries in a top level index within the video container file, wherein the top level index describes the alternative stream.

3. The method of claim 2, further comprising generating entries in the top level index indicating sizes of a plurality of portions of the alternative stream within the video container file.

4. The method of claim 2, further comprising receiving at least one request for a portion of the alternative stream from one or more playback devices based on the top level index.

5. The method of claim 2, wherein generating entries in the top level index is performed in response to receiving a request for the source video content from one or more playback devices.

6. The method of claim 1, wherein identifying a plurality of resolutions comprises identifying resolutions with target bitrates within a predetermined percentage of a bitrate associated with at least one alternative stream of the plurality of alternative streams.

7. The method of claim 1, wherein both a width and a height of each resolution of the plurality of resolutions have an integer number of pixels.

8. The method of claim 1, wherein each resolution of the plurality of resolutions has a same display aspect ratio and at least two resolutions of the plurality of resolutions have different sample aspect ratios.

9. The method of claim 1, wherein the multiple different target bitrates for each resolution is determined using a formula.

10. The method of claim 1, wherein the multiple different target bitrates of a given resolution is determined using experimentation.

11. A non-transitory machine readable medium containing processor instructions for encoding source content as a plurality of alternative video streams and adaptively streaming the plurality of alternative video streams, each having a bitrate, wherein execution of the instructions by a processor causes the processor to perform a process that comprises:

identifying source video content;

identifying a plurality of resolutions for encoding of video content; and for each particular resolution of the plurality of resolutions:

encoding at least a portion of the source video content multiple times to produce multiple different encoded versions, each encoded version using a combination of the particular resolution with a different target bitrate from a plurality of different target bitrates;

evaluating quality fer each of the multiple different encoded versions using an objective quality evaluation method;

selecting the resolution and target bitrate of one of the multiple different encoded versions as a chosen resolution and bitrate combination for at least a portion of an alternative stream from a plurality of alternative streams based on the evaluations of the multiple different encoded versions; and writing the at least a portion of the alternative stream having the chosen resolution and bitrate combination to a video container file.

12. The non-transitory machine readable medium of claim 11, further comprising generating entries in a top level index within the video container file, wherein the top level index describes the alternative stream.

13. The non-transitory machine readable medium of claim 12, further comprising generating entries in the top level index indicating sizes of a plurality of portions of the alternative stream within the video container file.

14. The non-transitory machine readable medium of claim 12, further comprising receiving at least one request for a portion of the alternative stream from one or more playback devices based on the top level index.

15. The non-transitory machine readable medium of claim 12, wherein generating entries in the top level index is performed in response to receiving a request for the source video content from one or more playback devices.

16. The non-transitory machine readable medium of claim 11, wherein identifying a plurality of resolutions comprises identifying resolutions with target bitrates within a predetermined percentage of a bitrate associated with at least one alternative stream of the plurality of alternative streams.

17. The non-transitory machine readable medium of claim 11, wherein both a width and a height of each resolution of the plurality of resolutions have an integer number of pixels.

18. The non-transitory machine readable medium of claim 11, wherein each resolution of the plurality of resolutions has a same display aspect ratio and at least two resolutions of the plurality of resolutions have different sample aspect ratios.

19. The non-transitory machine readable medium of claim 11, wherein the multiple different target bitrates for each resolution is determined using a formula.

20. The non-transitory machine readable medium of claim 11, wherein the multiple different target bitrates of a given resolution is determined using experimentation.

21. A method for encoding source content as a plurality of alternative video streams and adaptively streaming the plurality of alternative video streams, each having a bitrate, the method comprising:

identifying source video content;

identifying a plurality of resolutions for encoding of video content; and for each particular resolution of the plurality of resolutions:

encoding at least a portion of the source video content multiple times to produce multiple different encoded versions, each encoded version using a combination of the particular resolution with a different target bitrate from a plurality of different target bitrates;

evaluating objective quality for each of the multiple different encoded versions by combining a plurality of different methods of evaluating video data encoded at the target bitrate, where the plurality of different methods of evaluating video data include least one objective quality evaluation method;

selecting, using an objective quality criterion based upon the evaluations of objective quality of the multiple different encoding versions, the resolution and target bitrate of one of the multiple different encoded versions as a chosen resolution and bitrate combination for at least a portion of an alternative stream from a plurality of alternative streams; and writing the at least a portion of the alternative stream having the chosen resolution and bitrate combination to a video container file.

* * * * *